United States Patent
Dillon et al.

(10) Patent No.: US 11,943,635 B2
(45) Date of Patent: *Mar. 26, 2024

(54) METHODS AND APPARATUS FOR FACILITATING CONFIGURATION, TESTING AND/OR DEPLOYMENT OF A WIRELESS SYSTEM INCLUDING A WIRELESS EXTENDER

(71) Applicant: CHARTER COMMUNICATIONS OPERATING, LLC, St. Louis, MO (US)

(72) Inventors: Matthew Dillon, Greenwood Village, CO (US); Taren G. McCullough, Denver, CO (US); Christopher W. Watson, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/392,224

(22) Filed: Aug. 2, 2021

(65) Prior Publication Data
US 2021/0368357 A1    Nov. 25, 2021

Related U.S. Application Data

(63) Continuation of application No. 16/200,629, filed on Nov. 26, 2018, now Pat. No. 11,082,861.

(51) Int. Cl.
*H04W 16/18* (2009.01)
*H04W 16/14* (2009.01)
(Continued)

(52) U.S. Cl.
CPC .......... *H04W 16/18* (2013.01); *H04W 16/14* (2013.01); *H04W 16/26* (2013.01); *H04W 84/12* (2013.01)

(58) Field of Classification Search
CPC ..... H04W 16/18; H04W 16/14; H04W 16/26; H04W 84/12
See application file for complete search history.

(56) References Cited

U.S. PATENT DOCUMENTS 7,184,770 B1 * 2/2007 Narasimhan .......... H04W 16/18
455/67.11
9,807,629 B1 * 10/2017 Varlakov ............... H04W 24/04
(Continued)

*Primary Examiner* — Anh Vu H Ly
*Assistant Examiner* — Hector Reyes
(74) *Attorney, Agent, or Firm* — Straub & Straub; Michael P. Straub; Stephen T. Straub

(57) ABSTRACT

Methods and apparatus for facilitating the deployment of a wireless extender in combination with a base station at a customer premises are described. Support is provided for data rate testing in combination with configuring one or more aspects of the system such as wireless extender and/or base station transmission power level. By using testing a system can be deployed where one or more devices may use transmission power levels which are less than the maximum permitted transmission power level while still supporting an expected data rate corresponding to a subscriber service level in a reliable manner. In various embodiments DFS channel black and/or white lists are generated for each link taking into consideration the determined transmit power to be used for a given link.

20 Claims, 41 Drawing Sheets

(51) Int. Cl.
*H04W 16/26* (2009.01)
*H04W 84/12* (2009.01)

(56) References Cited

U.S. PATENT DOCUMENTS

2018/0310279 A1* 10/2018 Pathak .................. H04W 16/02
2019/0159205 A1* 5/2019 Mercier ................ H04W 28/16
2021/0352671 A1* 11/2021 Dayanandan ....... H04W 72/563

* cited by examiner

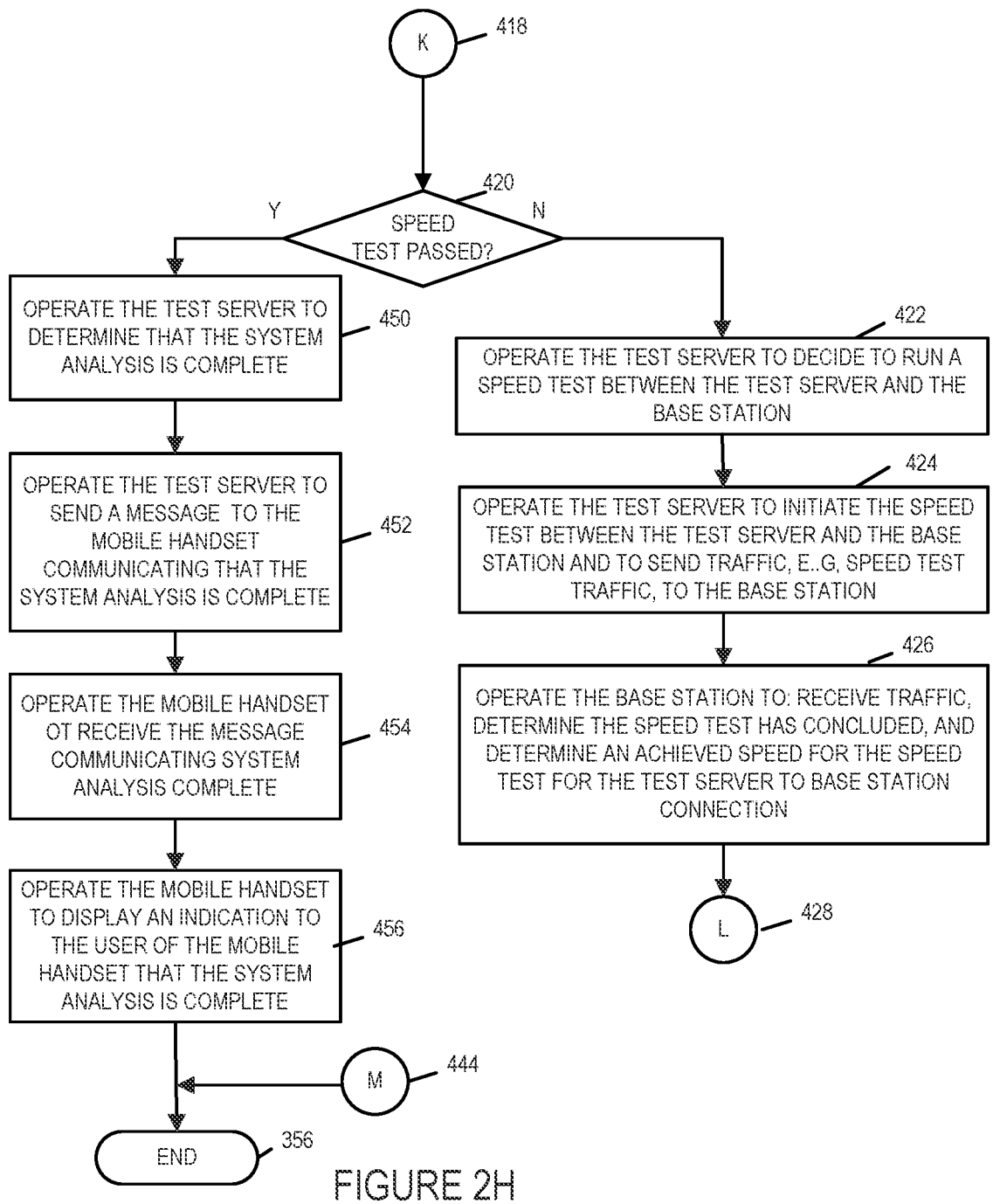

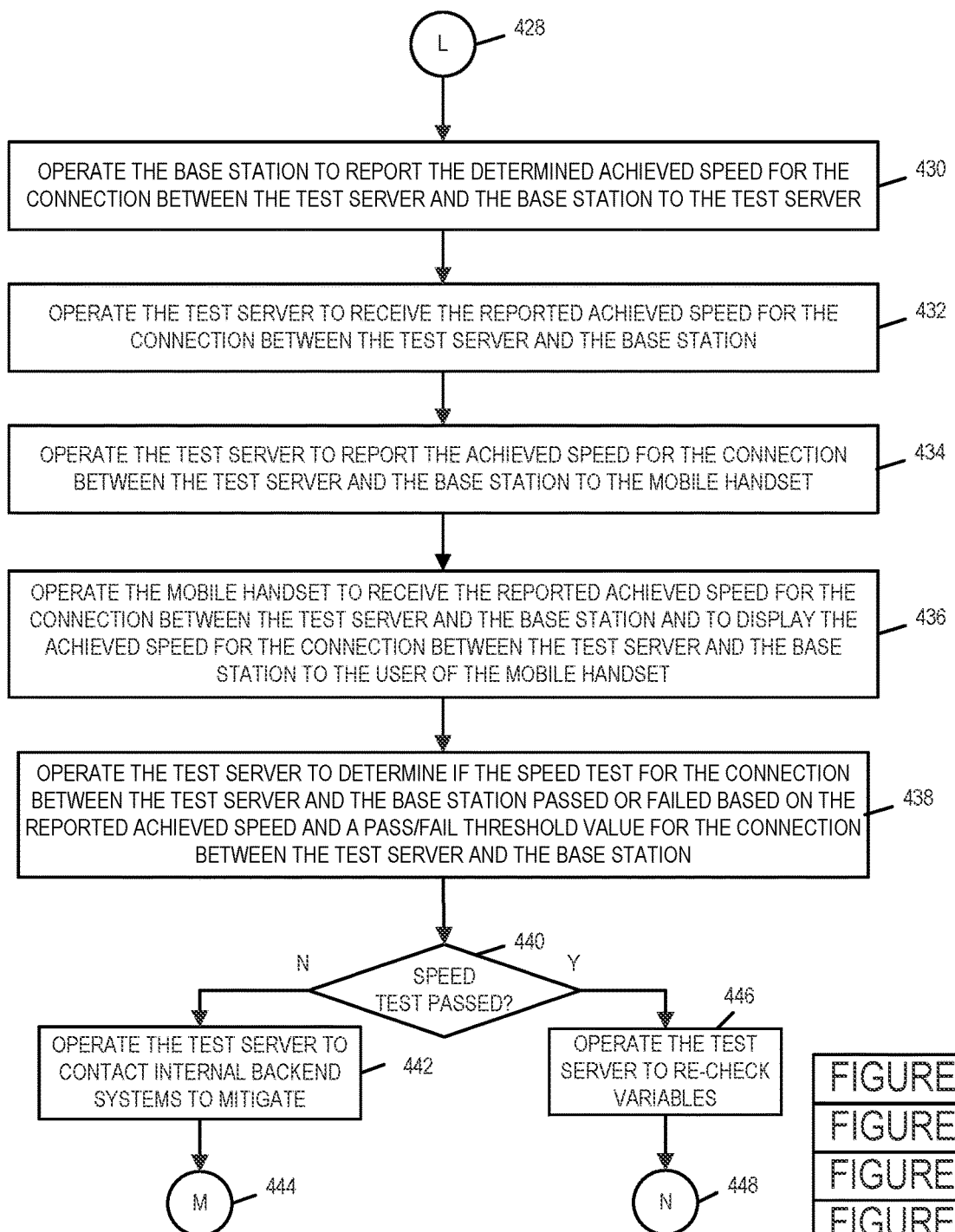

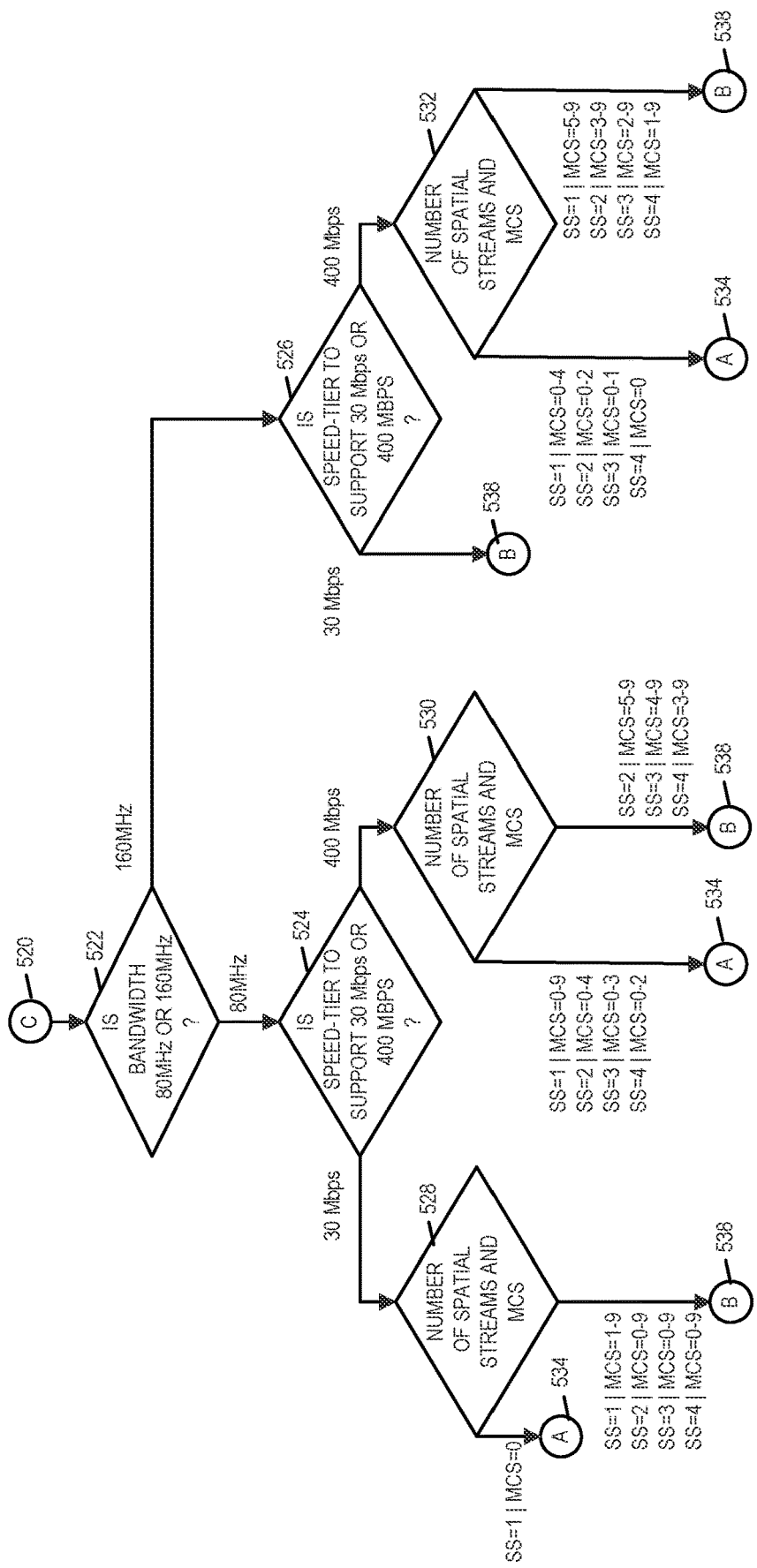

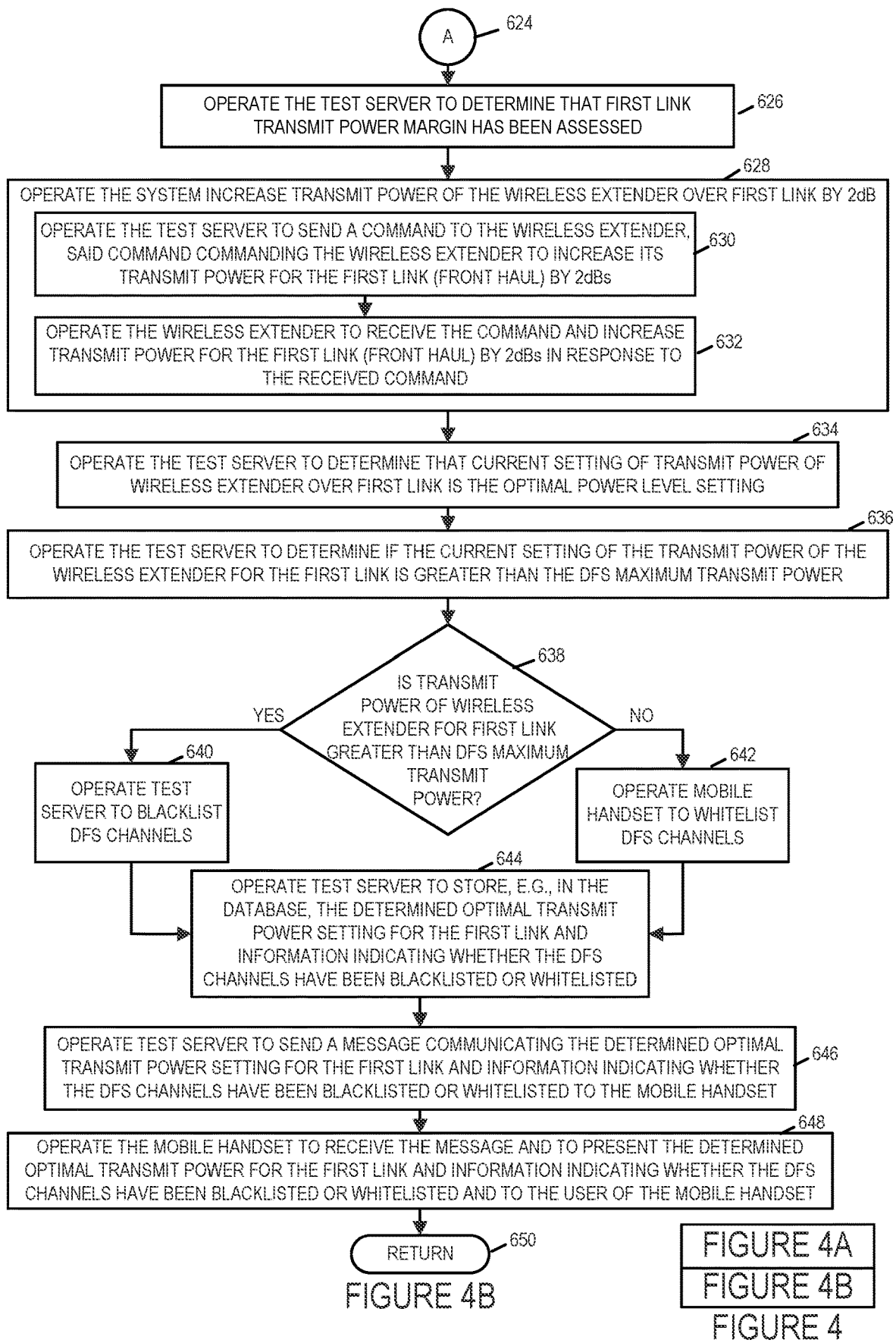

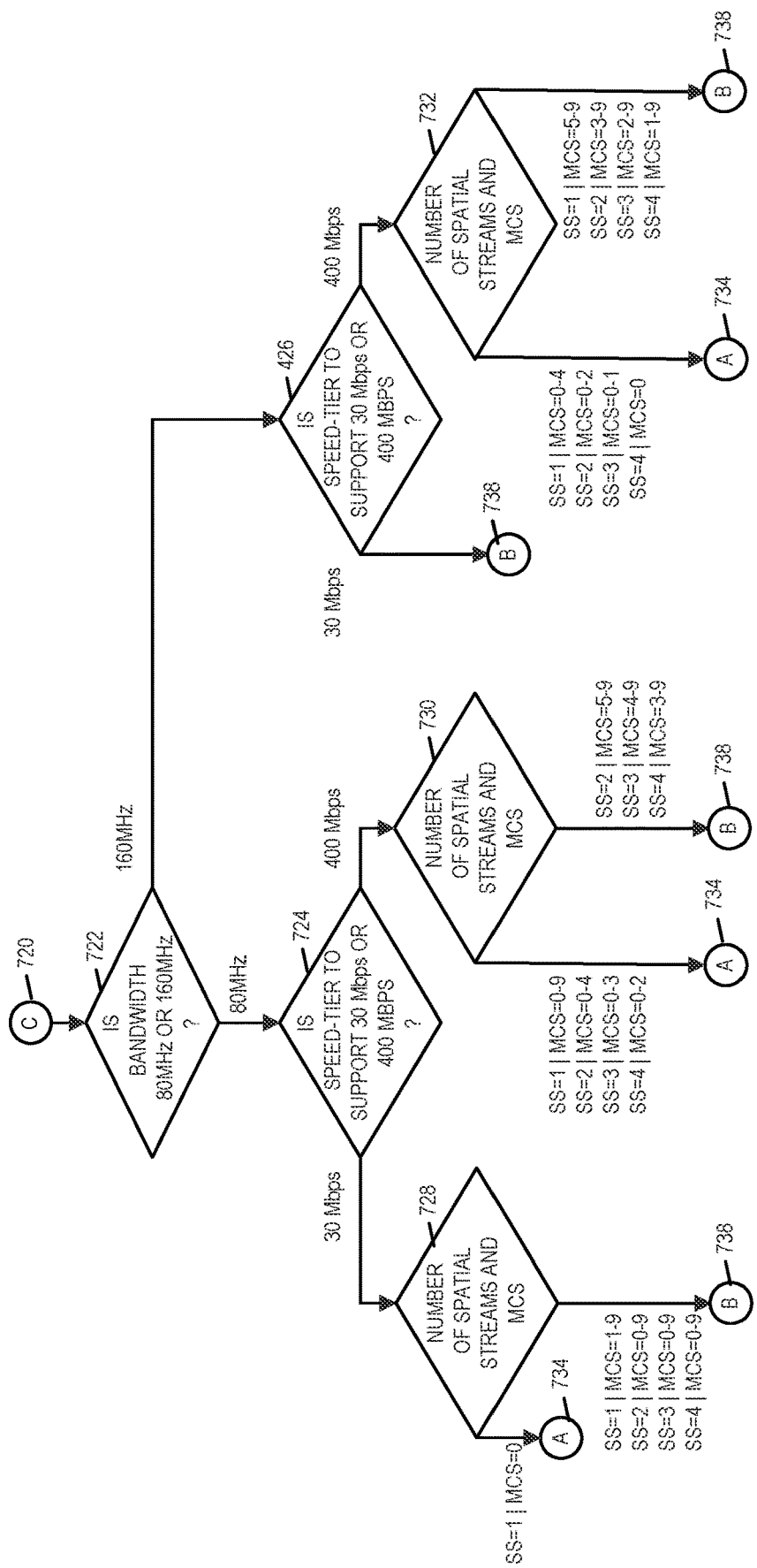

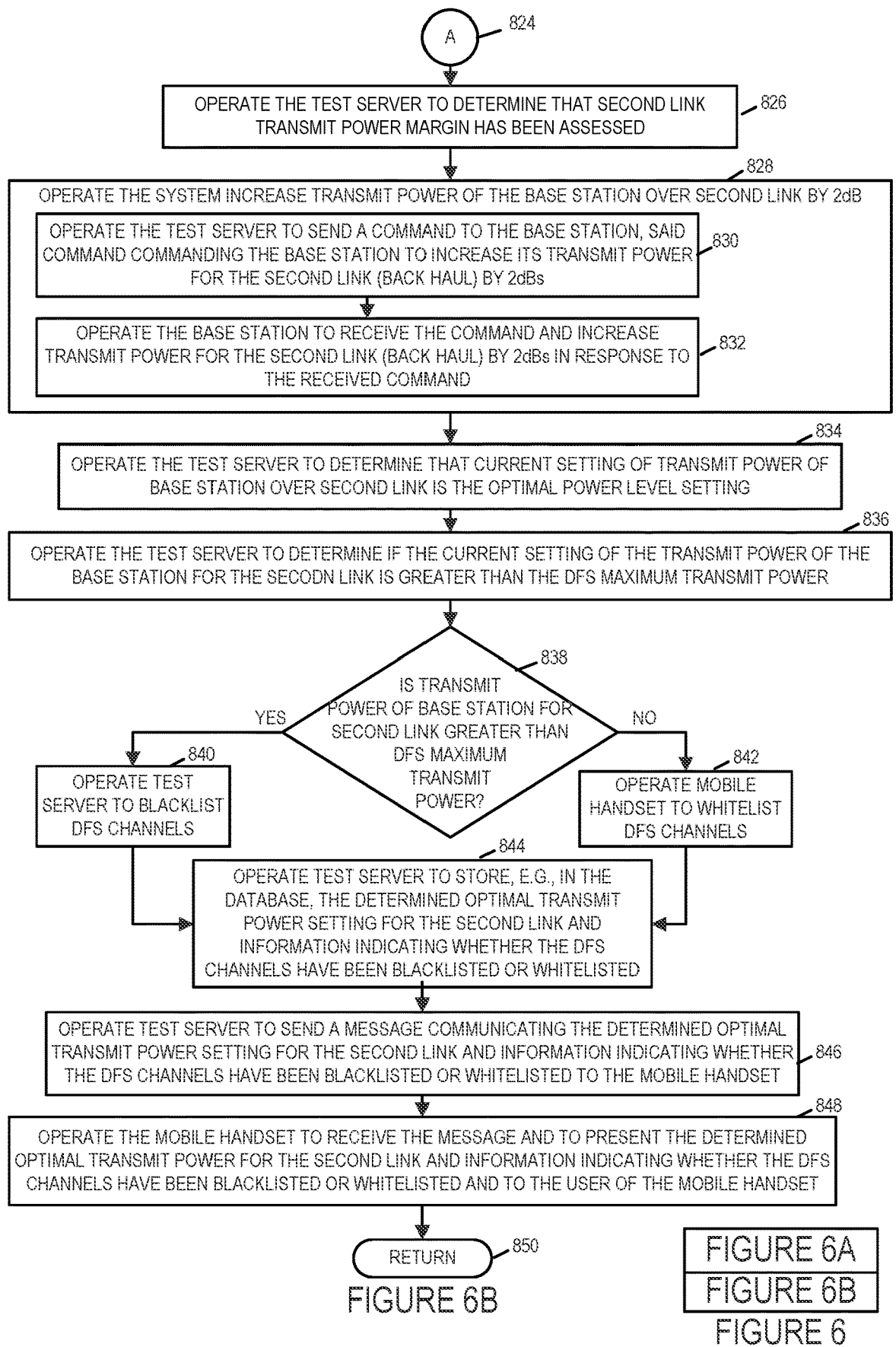

| FIGURE 16A |
| FIGURE 16B |
| FIGURE 16C |
| FIGURE 16D |

METHODS AND APPARATUS FOR FACILITATING CONFIGURATION, TESTING AND/OR DEPLOYMENT OF A WIRELESS SYSTEM INCLUDING A WIRELESS EXTENDER

RELATED APPLICATIONS

The present application is a continuation of U.S. patent application Ser. No. 16/200,629 filed Nov. 26, 2018 which published as U.S. patent publication US 2020-0169894 A1 on May 28, 2020, said patent application and patent publication of the application being hereby expressly incorporated by reference in their entirety.

FIELD

The present application relates to wireless communications methods and apparatus and, more particularly, to methods and apparatus for testing and facilitating deployment of network elements in a system including a wireless extender.

BACKGROUND

Wireless extenders are often used to extend the range of a base station, sometimes referred to as a network access point, at customer premise sites. The placement of a wireless extender is often left to a user with a user being unsure if the placement of an extender will actually support the data rate of a service level to which a user subscribes. Thus, while a user may have a data rate assured to a base station e.g., wireless access point in a user's customer premises, e.g., home, the user is often left unsure whether the data rate will available to devices in the customer premises particularly when a wireless extender is used.

There has been a proliferation of the use of base stations, e.g., WiFi base stations sometimes also referred to as access points, at customer premises sites. However at many locations a WiFi base station does not cover an entire customer premises, e.g., house, with good wireless coverage. One solution is to add one or more WiFi extenders. The WiFi extender communicates back to the WiFi base station over a wireless channel. The extended coverage depends on properly placing the WiFi extender to add coverage, while also being in range of the WiFi base station to ensure back haul performance.

Current approaches to checking whether a wireless extender is suitably placed involves measuring a beacon signal and using a Received Signal Strength Indicator (RSSI)/Signal Strength indicator generated from the measurement of a signal communicated on the link between the WiFi base station and the WiFi extender. If the RSSI/received signal measurement is within a certain threshold, an LED will indicate green/good on the wireless extender in some systems.

With the current art approach to locating a WiFi extender, there is often a transmission power back off issue problem. The RSSI level, which is used to determine green/good is often calculated from a beacon which is transmitted at full power/using a low Modulation and Coding Scheme (MCS) level. The modulation used for data transmissions is often a higher level of that used for the beacon. When using a high MCS to achieve a high data rate, the transmitting device normally uses a lower transmission power than is used for transmitting the beacon. As a result of the use of different coding and modulation as well as transmit power for transmission of data in many cases, an RSSI (Received Signal Strength Indicator) generated from a beacon signal, while providing some information on which to predict a supportable data rate, may not be fully indicative of the true data rate that will be achieved when transmitting data. As a result, a higher then necessary transmission power will often be used in an attempt to ensure that a desired data rate will be supported.

Furthermore, rate vs range performance may vary depending upon one or more of the following: vendor/model/chipset, RSSI level, RF interference level (SINR) for the WiF extender, RF interference level for the WiFi base station, physical path loss, e.g., due to wall, furniture, etc., and physical distance between the WiFi extender and WiFi router. There is no "distance" vs speed that accurately works in all customer premises, e.g., house or office environment. Thus making power transmission decisions in an attempt to support a particular expected data rate based on predictive models as opposed to actual tests of achieved data rates can be somewhat unreliable.

It would be desirable if methods and/or apparatus could be developed to facilitate the deployment and testing of wireless networks at customer premises that would allow for confirmation that a data rate corresponding to a service plan to which a customer subscribes will be available in both the coverage range of a local wireless extender and/or in the direct coverage area of the local base station.

While not necessary for all embodiments, there is also a need for methods and/or apparatus which allow of the deployment and use of a wireless extender in a way that does not result in unnecessary interference to other devices. Often wireless extenders and small base stations at customer premise sites are set to transmit at maximum permitted transmission power levels. While this might seem to be an effective way of gaining maximum coverage in an area, it can often create interference to other devices in nearby customer premises, e.g., apartments and/or business sites. It would be desirable if in some but not necessarily all embodiments methods and apparatus could be developed which would facilitate use of transmission power levels by a wireless extender and/or base station at a customer premise which is lower than the maximum transmission power level but still sufficient to support s service level to which a customer subscribes. That is, it would be desirable if power levels could be intelligently determined and set to support a desired level of service without causing unnecessary interference to other devices in the vicinity of a customer premise where an extender and/or small base station are used.

The use of Dynamic Frequency Selection (DFS) is desirable in at least some embodiments. DFS is a spectrum-sharing mechanism that allows wireless LANs (WLANs) to coexist with radar systems. A DFS capable device automatically selects a frequency that does not interfere with certain radar systems while operating in the 5 GHz band. DFS is a feature of ETSI BRAN HIPERLAN/2 and IEEE Standard 802.11h and uses a power level that is intended to avoid an unsatisfactory level of interference to such systems. In order to limit interference a DFS channel may and often does have a different maximum permitted transmission power level than other channels that maybe used by a base station or wireless extender for a communications link. Different channels may and sometimes do correspond to different frequencies with in some cases a base station or wireless extender being able to select between multiple different channels for a communications link.

It would be desirable if in some but not necessarily all embodiments a base station or wireless extender could use one or more DFS channels in a way that satisfies DFS transmission power level and/or interference constraints.

In view of the above it should be appreciated that there are numerous technical problems relating to satisfying desired data rate transmission levels, controlling transmission power and/or selecting which channels to use when deploying a base station and/or wireless extender in a customer premises. It would be desirable if methods and/or apparatus could be developed which address one or more of the discussed problems.

SUMMARY

Various embodiments are directed to methods and/or apparatus for facilitating the deployment of a wireless extender in combination with a base station at a customer premises. In at least some but not necessarily all embodiments support is provided for data rate testing in combination with configuring one or more aspects of the system such as wireless extender and/or base station transmission power level. By using testing a system can be deployed where one or more devices may use transmission power levels which are less than the maximum permitted transmission power level.

In various embodiments individual links between devices are tested to make sure that they can support a desired data rate, e.g., speed level. The data rate may and sometimes does correspond to a speed tier or service level which is to be provided to the customer. Transmission power levels are determined and automatically set on individual links in a manner that allows the data rate which the customer expects to receive to be supported but, in many cases without the need for maximum transmission power to be used on the link. Transmission power is determined on individual links on a per link basis after determining that a link is capable of supporting the expected data rate.

If a test indicates that an expected data rate, e.g., the data rate for the level of service to which the customer subscribes, can not be supported for an individual link, remedial action is automatically initiated by a network device, e.g., test server, responsible for testing a link. The remedial action can include controlling the transmitting device, e.g., wireless extender or base station, to restrict traffic over the link which is not part of the test, control the transmitting device to change the wireless resources used for the link, e.g., channel, frequency, time or code used for the link being tested and/or initiate movement of the wireless extender, e.g., repeater, when the link between a mobile device in the customer premise and/or link between the base station and/or wireless extender fails to support the expected data rate to be supported.

After remedial action is taken, when needed, the link or links are retested to confirm that the link supports the expected data rate for the level of service to be provided.

In some embodiments testing and, if needed, remediation of the link between the extender and a mobile device in the customer premises is first tested. Upon successful testing, e.g., verification, that the link between the mobile device and extender supports the desired data rate, the link between the base station and wireless extender is tested and remedial action is automatically taken if necessary. Following successful testing of the base station to extender and extender to mobile device links, the link to a core network element between the base station and core network element, e.g., test server, is tested to make sure that full set of individual links which are likely to be used in providing service to a device in the customer's premises can support the expected data rate.

In some embodiments, after successful testing of a link to make sure that it can support the desired data rate, e.g., using the maximum transmit power level, the transmit power level used on the link is decreased and the link retested until it is determined at what transmit power level the link will fail to support the desired data rate, e.g., the data rate for the service level, sometimes called service tier, to which the customer at the customer premise where the devices are located subscribes. This initial failure transmission power level serves as a power level that should be exceeded to insure adequate service on the link being tested. In some embodiments the transmit power level for the link being tested is set to a level a predetermined amount, e.g., 2 dBs, above the initial failure power level with the determined transmit power level being a level at which the desired data rate is archived on the link with a little margin to allow for at least some changes in channel conditions. By determining the power level at which the data level to be supported initially fails to be achieved, a satisfactory power level can be determined via testing which in many cases will be lower than the maximum permitted transmit power for the link. Once the power level is set for a link through the described testing method which is used in some, but not all, embodiments, a check is made as to whether the determined transmit power level for a link exceeds a maximum transmit power level for one or more DFS channels which may optionally be used to implement the link who's transmit power level was determined and set.

If the set transmit power level exceeds a DFS channel maximum transmit power level, the DFS channel is added to a blacklist so that it is not used for the link who's transmit power exceeds the DFS channel's maximum permitted transmit power level.

The transmit power level for the wireless extender to mobile device link and the base station to wireless extender link are set separately depending on the transmit power needed for each link to support the expected data rate. Accordingly, separate blacklists are generated for the wireless extender to mobile device link and base station to wireless extender link. The wireless extender to mobile device link blacklist of DFS channels is stored in the test and configuration server and also communicated to the wireless extender along with the transmission power level to be used for the link to the mobile device. The wireless extender stores this information in memory and uses this configuration and blacklist to configure and control the communications link between the wireless extender and mobile device with transmission on the extender to mobile device link avoiding the channels on the extender to mobile DFS blacklist and transmission being made at the determined extender transmit power level. Optionally a whitelist of DFS channels which can be used for the extender to mobile link is also generated and communicated to the extender which is then able to use the DFS channels on the whitelist for the link to the mobile device.

The base station to wireless extender link blacklist of DFS channels is stored in the test and configuration server and also communicated to the base station at the customer premises along with the transmit power to be used for the base station to wireless extender communications link. The base station stores and uses this configuration and black list to configure and control the communications link between the base station and wireless extender with transmission on the base station to extender link avoiding the channels on the base station to extender DFS black list and transmission being made at the determined base station transmit power level. Optionally a white list of DFS channels which can be used for the base station to extender link is also generated and communicated to the base station which is then able to use the DFS channels on the white list for the link to the wireless extender. DFS channels on the whitelists have a maximum transmit power that is equal to or higher than the transmit power of the link to which the particular whitelist corresponds.

An exemplary method comprises, in some embodiments, operating a test server to send a command to a wireless extender at a first customer premises to perform a speed test on a first link between said wireless extender and a mobile handset, said speed test determining an achieved speed for the first link; operating the test server to determine if the achieved speed for the first link determined by the speed test on the first link between said wireless extender and said mobile handset satisfies a minimum expected communications speed for a first speed tier, said first speed tier being a wireless communications speed level to be supported by said first link; and determining based on the achieved speed for the first link whether or not the first link has been verified to support the first speed tier; in response to determining that the first link does not support the first speed tier, operating the test server to take remedial action and initiate retesting of the first link in an attempt to verify the first link; and in response to determining that the first link supports the first speed tier, operating the test server to determine a power level to be used on the first link.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF TH E FIGURES

FIG. 2H is an eighth part of a flowchart of an exemplary system analysis method in accordance with an exemplary embodiment.

FIG. 2I is a ninth part of a flowchart of an exemplary system analysis method in accordance with an exemplary embodiment.

FIG. 2 comprises the combination of FIG. 2A, FIG. 2B, FIG. 2C, FIG. 2D, FIG. 2E, FIG. 2E, FIG. 2F, FIG. 2G, FIG. 2H and FIG. 2I.

Figure 3A:
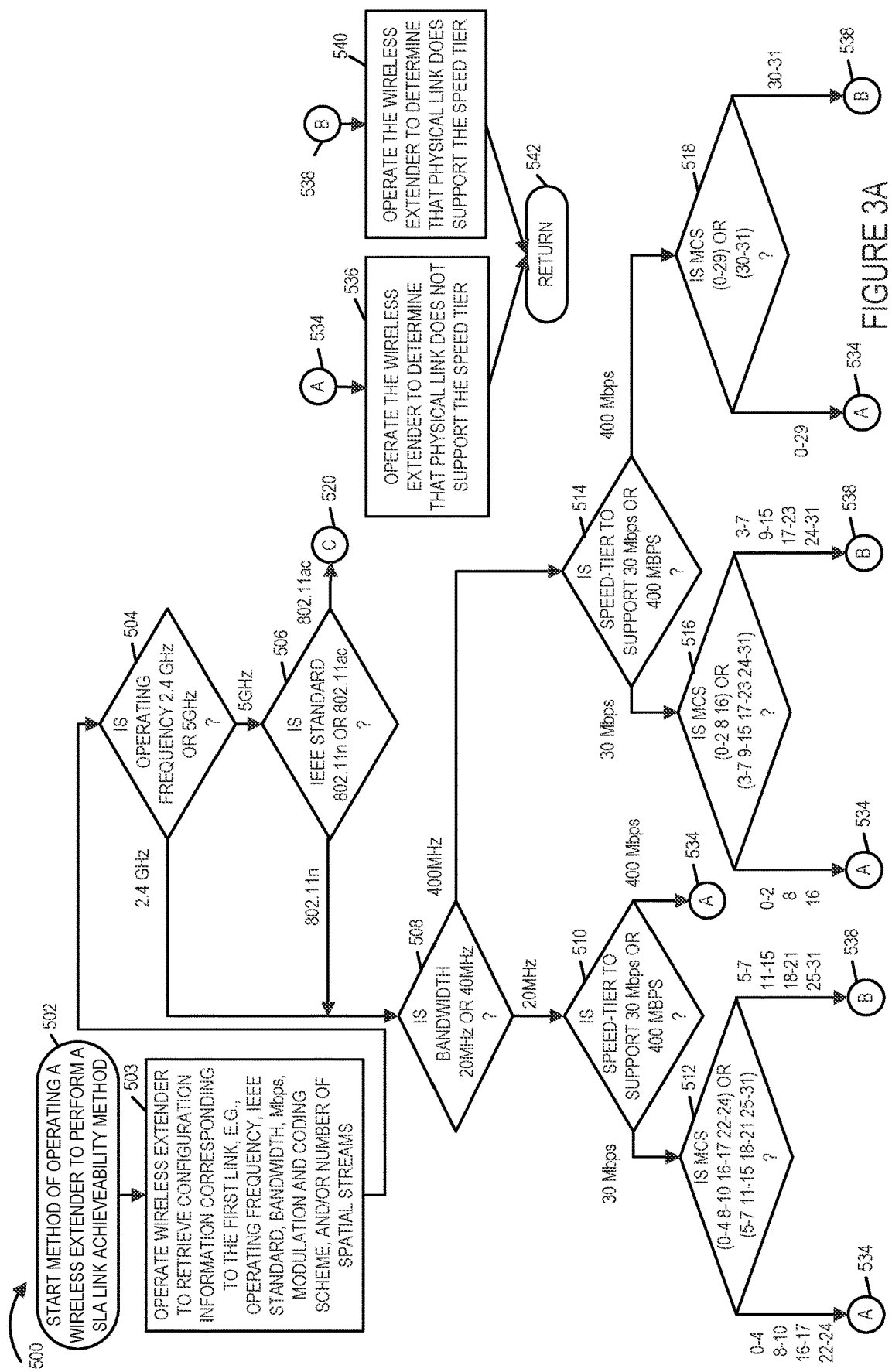

FIG. 3A is a first part of a flowchart of an exemplary method of operating a wireless extender to perform a SLA link achievability method (SLAM) in accordance with an exemplary embodiment.

FIG. 3B is a second part of a flowchart of an exemplary method of operating a wireless extender to perform a SLA link achievability method (SLAM) in accordance with an exemplary embodiment.

FIG. 3 comprises the combination of FIG. 3A and FIG. 3B.

Figure 4A:
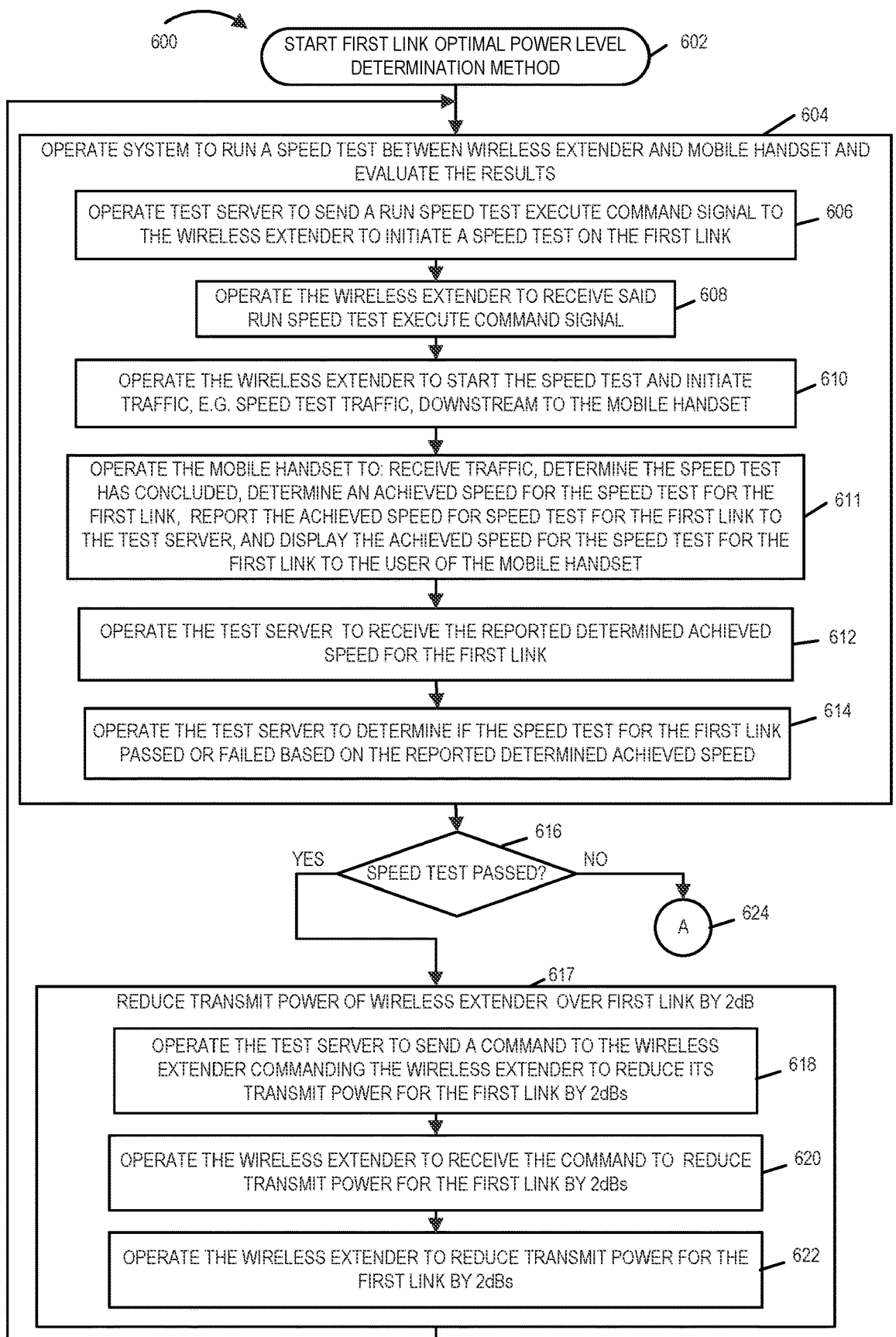

FIG. 4A is a first part of a flowchart of an exemplary method of performing a first link optimal power level determination, in accordance with an exemplary embodiment.

FIG. 4B is a second part of a flowchart of an exemplary method of performing a first link optimal power level determination, in accordance with an exemplary embodiment.

FIG. 4 comprises the combination of FIG. 4A and FIG. 4B.

Figure 5A:
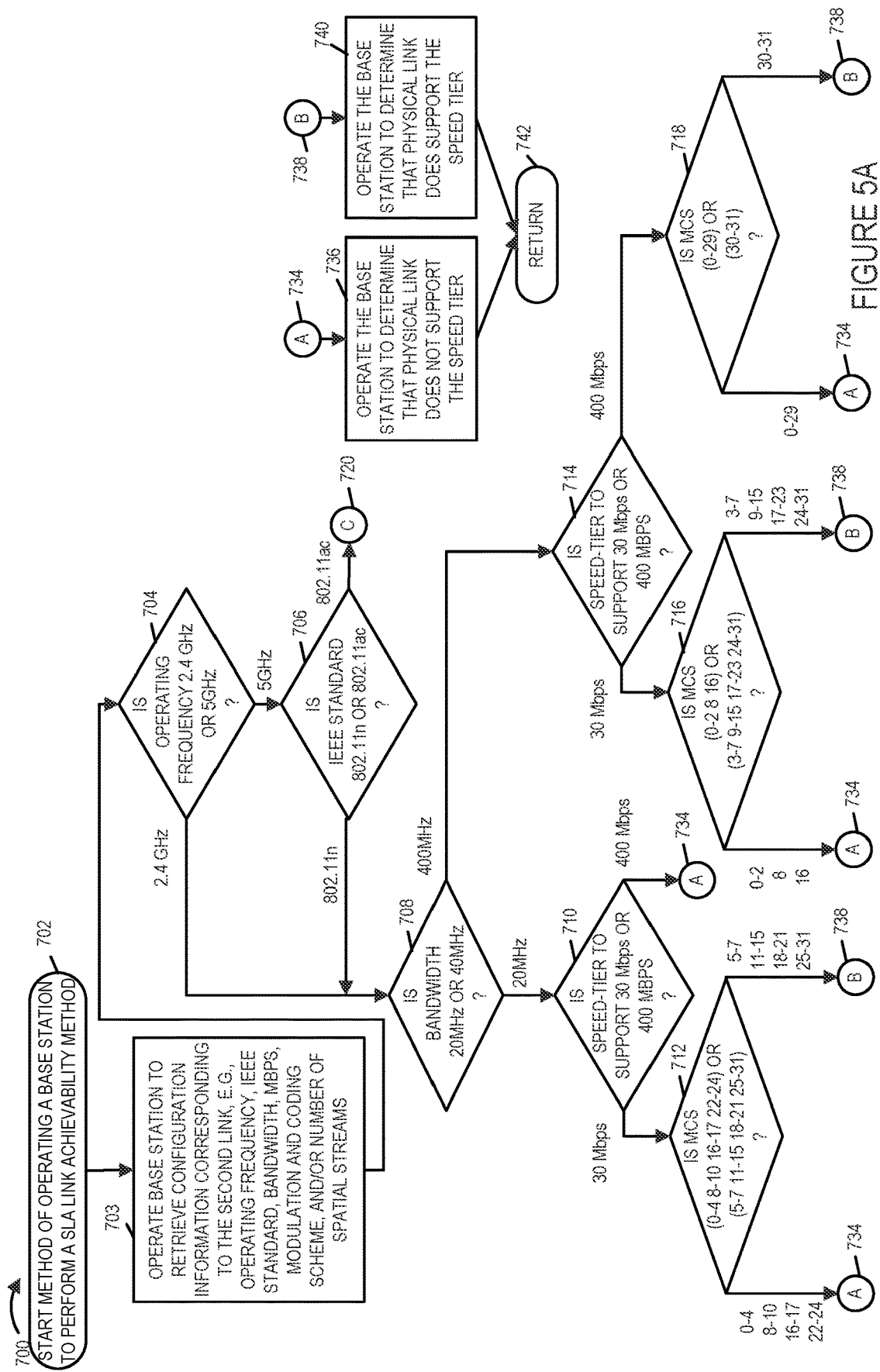

FIG. 5A is a first part of a flowchart of an exemplary method of operating a base station to perform a SLA link achievability method (SLAM) in accordance with an exemplary embodiment.

FIG. 5B is a second part of a flowchart of an exemplary method of operating a base station to perform a SLA link achievability method (SLAM) in accordance with an exemplary embodiment.

FIG. 5 comprises the combination of FIG. 5A and FIG. 5B.

Figure 6A:
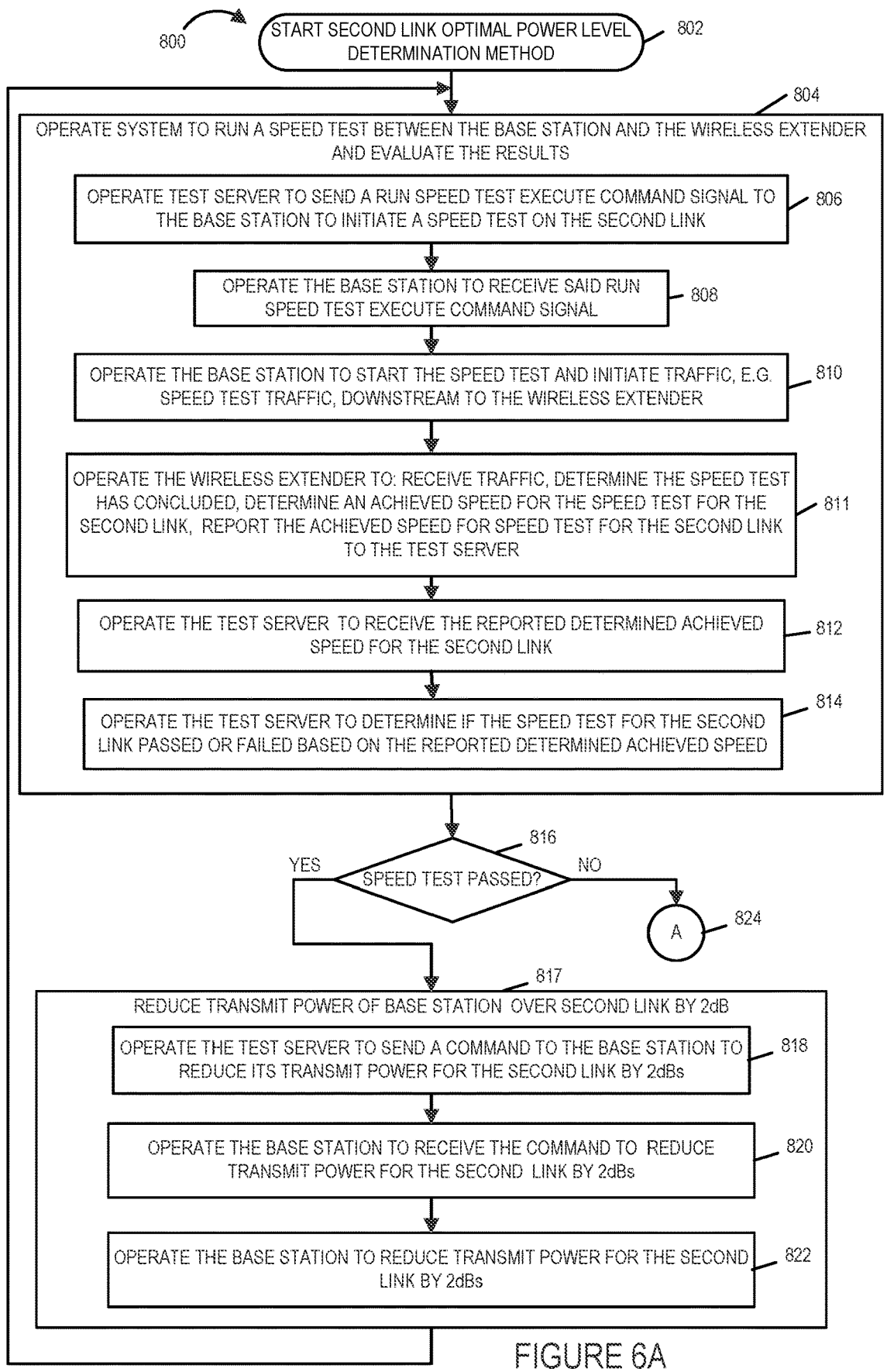

FIG. 6A is a first part of a flowchart of an exemplary method of performing a second link optimal power level determination, in accordance with an exemplary embodiment.

FIG. 6B is a second part of a flowchart of an exemplary method of performing a second link optimal power level determination, in accordance with an exemplary embodiment.

FIG. 6 comprises the combination of FIG. 6A and FIG. 6B.

Figure 7:
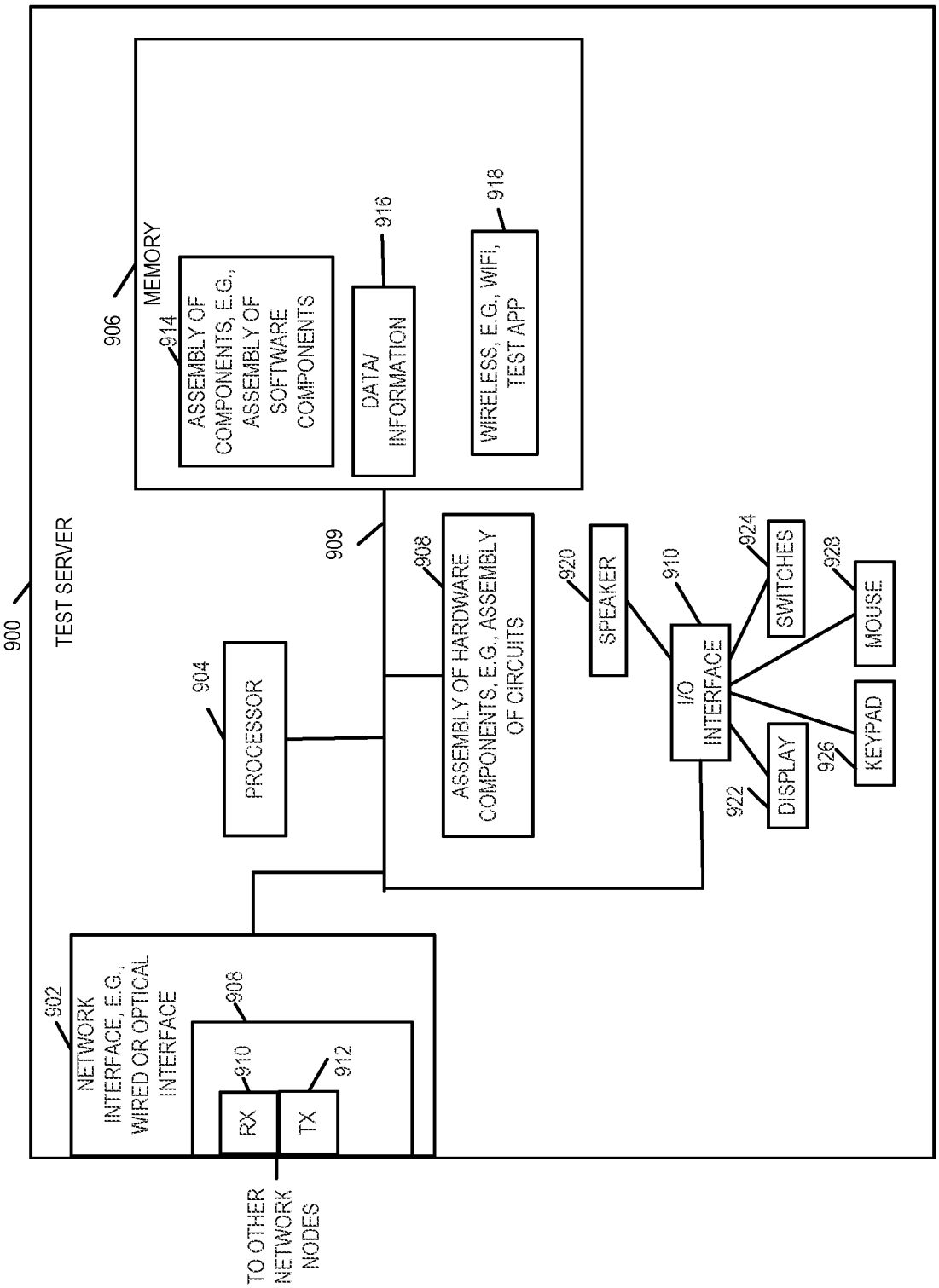

FIG. 7 is a drawing of an exemplary test server in accordance with an exemplary embodiment.

Figure 8:
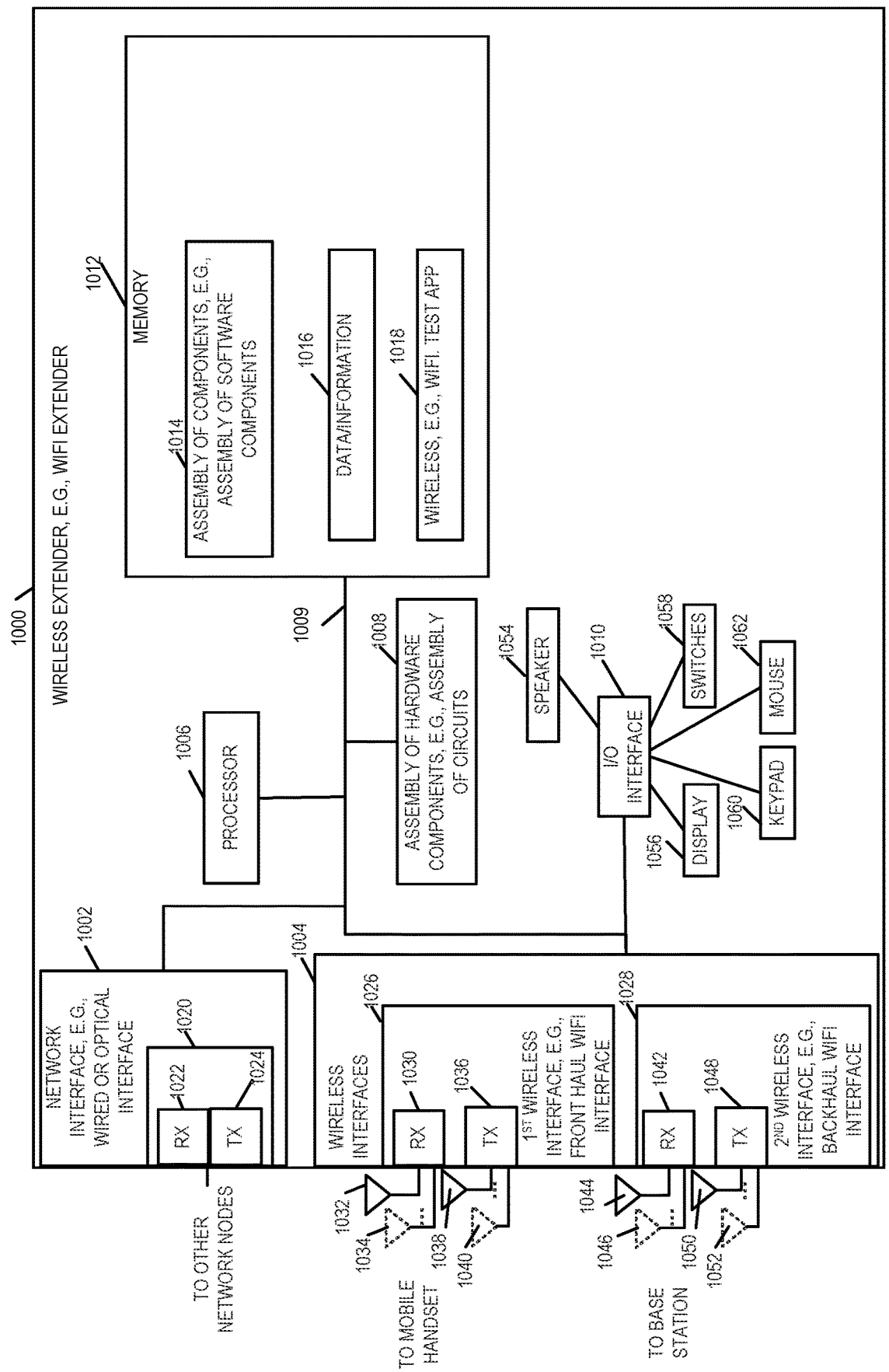

FIG. 8 is a drawing of an exemplary wireless extender, e.g., a WiFi extender, in accordance with an exemplary embodiment.

Figure 9:
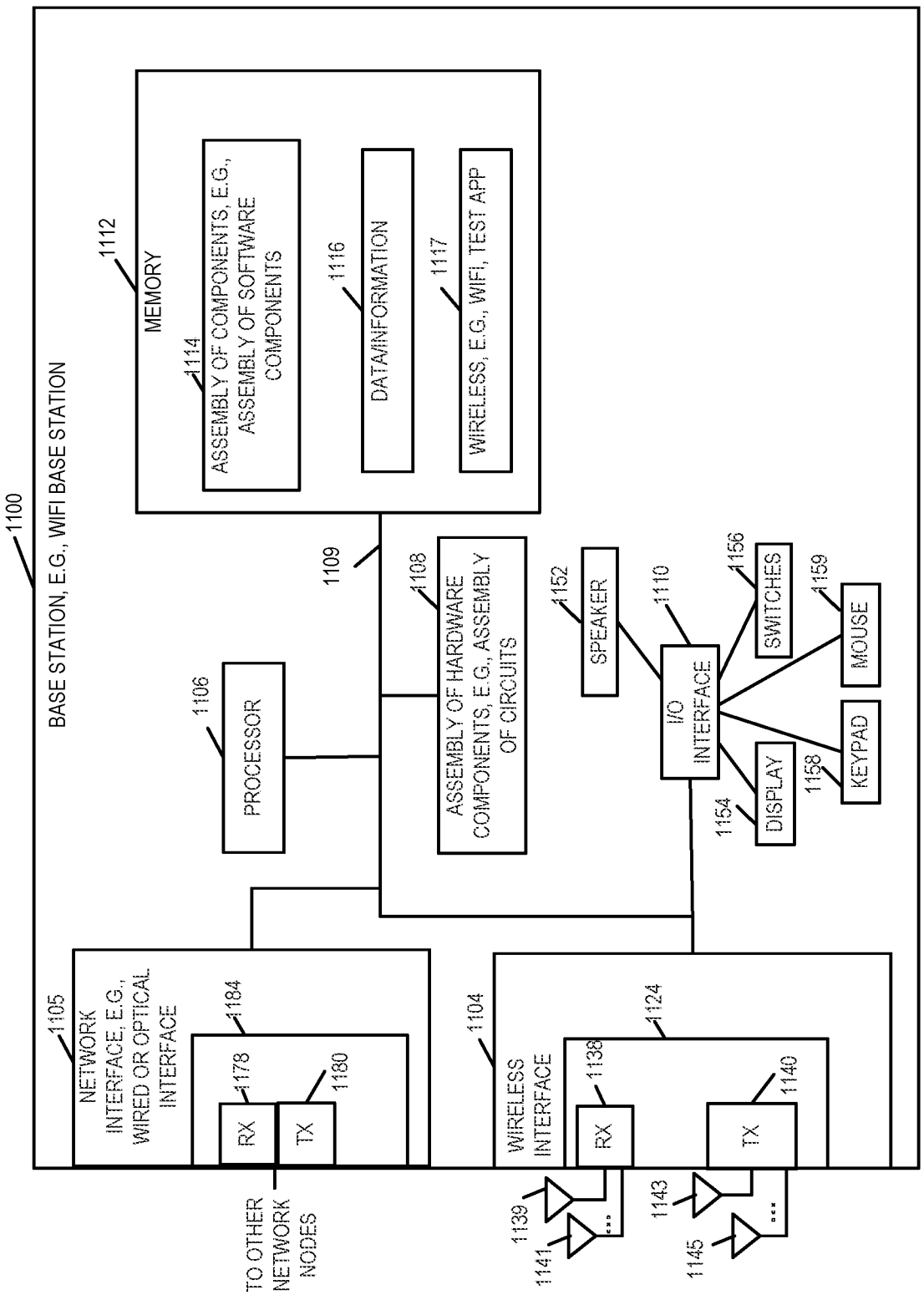

FIG. 9 is a drawing of an exemplary base station, e.g., a WiFi base station, in accordance with an exemplary embodiment.

Figure 10:
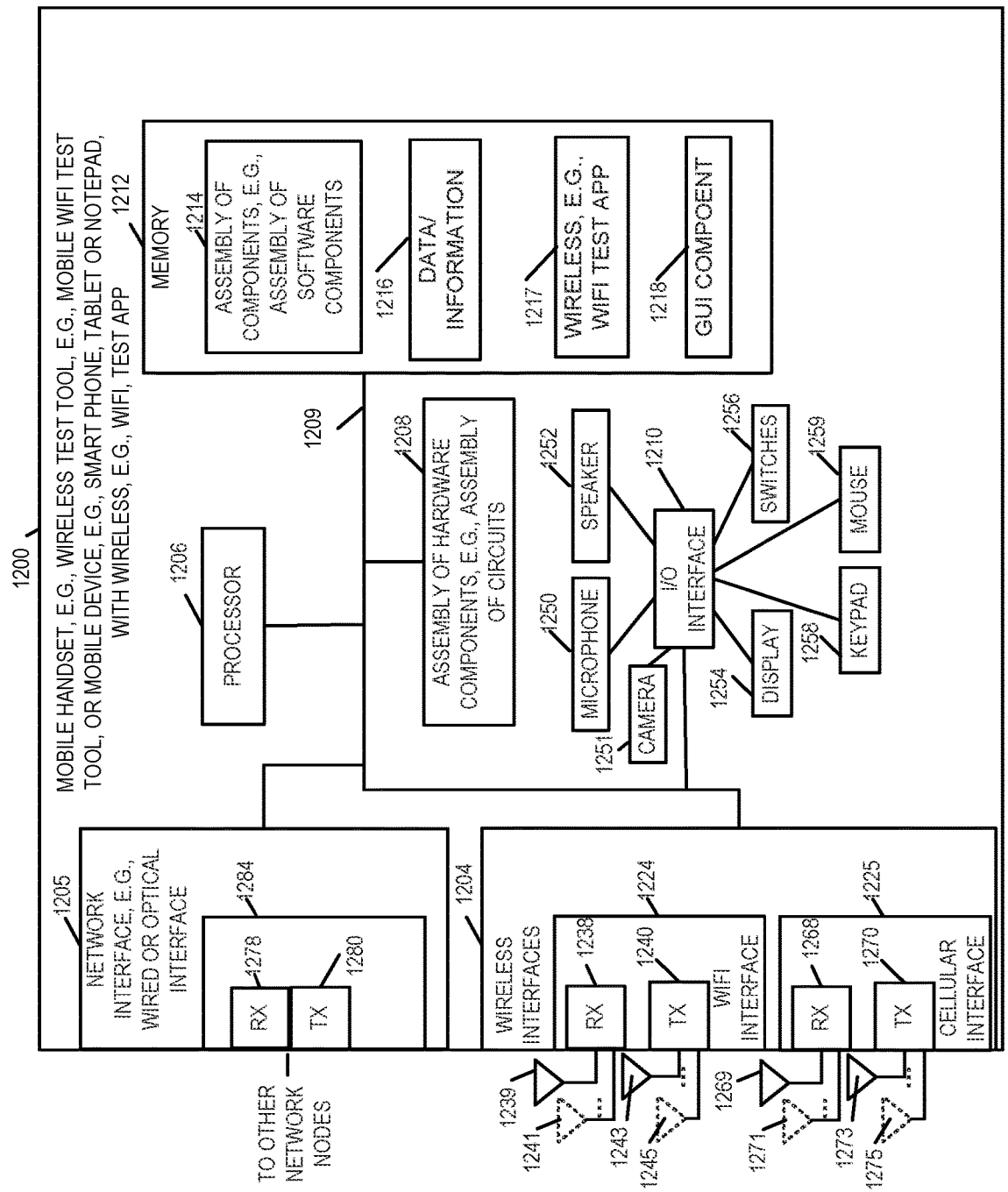

FIG. 10 is a drawing of an exemplary mobile handset, e.g., a mobile wireless test tool, or a mobile device, e.g., a smart phone, wireless tablet or wireless notepad, with a wireless test application (APP), in accordance with an exemplary embodiment.

Figure 11:
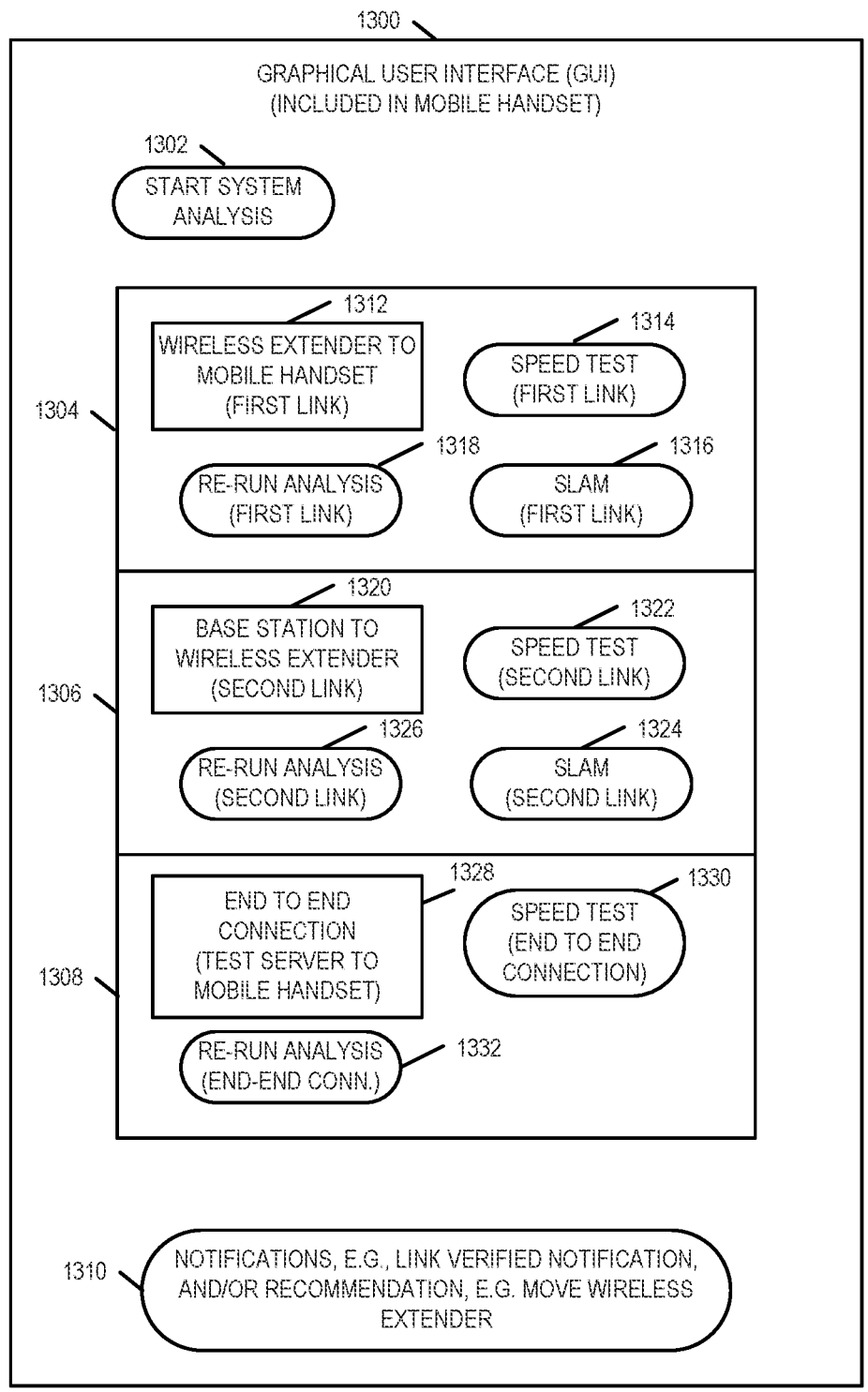

FIG. 11 is a drawing of an exemplary graphical user interface (GUI) included in a mobile handset, in accordance with an exemplary embodiment.

Figure 12A:
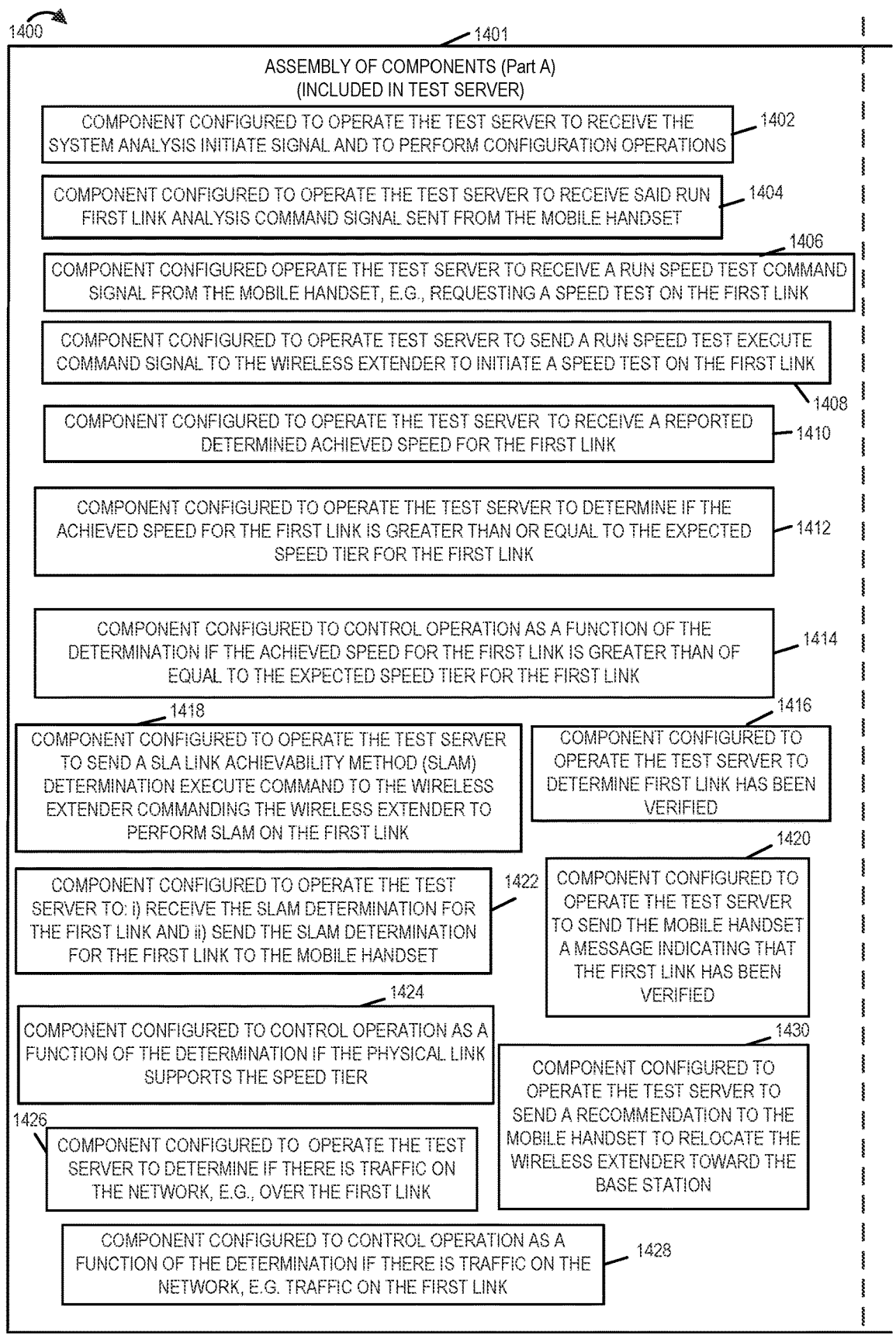

FIG. 12A is a drawing of a first part of an assembly of components which may be including in a test server in accordance with an exemplary embodiment.

Figure 12B:
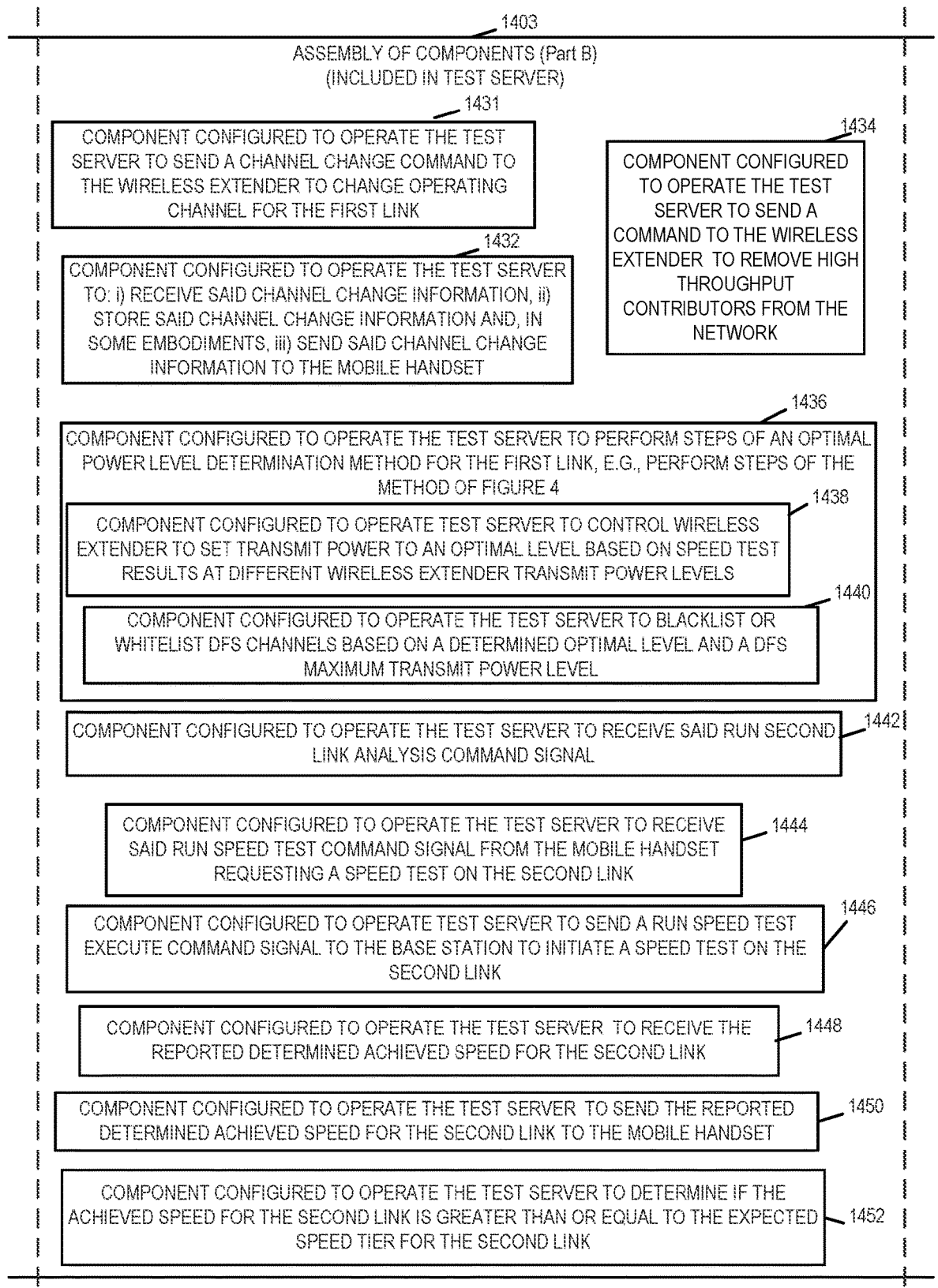

FIG. 12B is a drawing of a second part of an assembly of components which may be including in a test server in accordance with an exemplary embodiment.

Figure 12C:
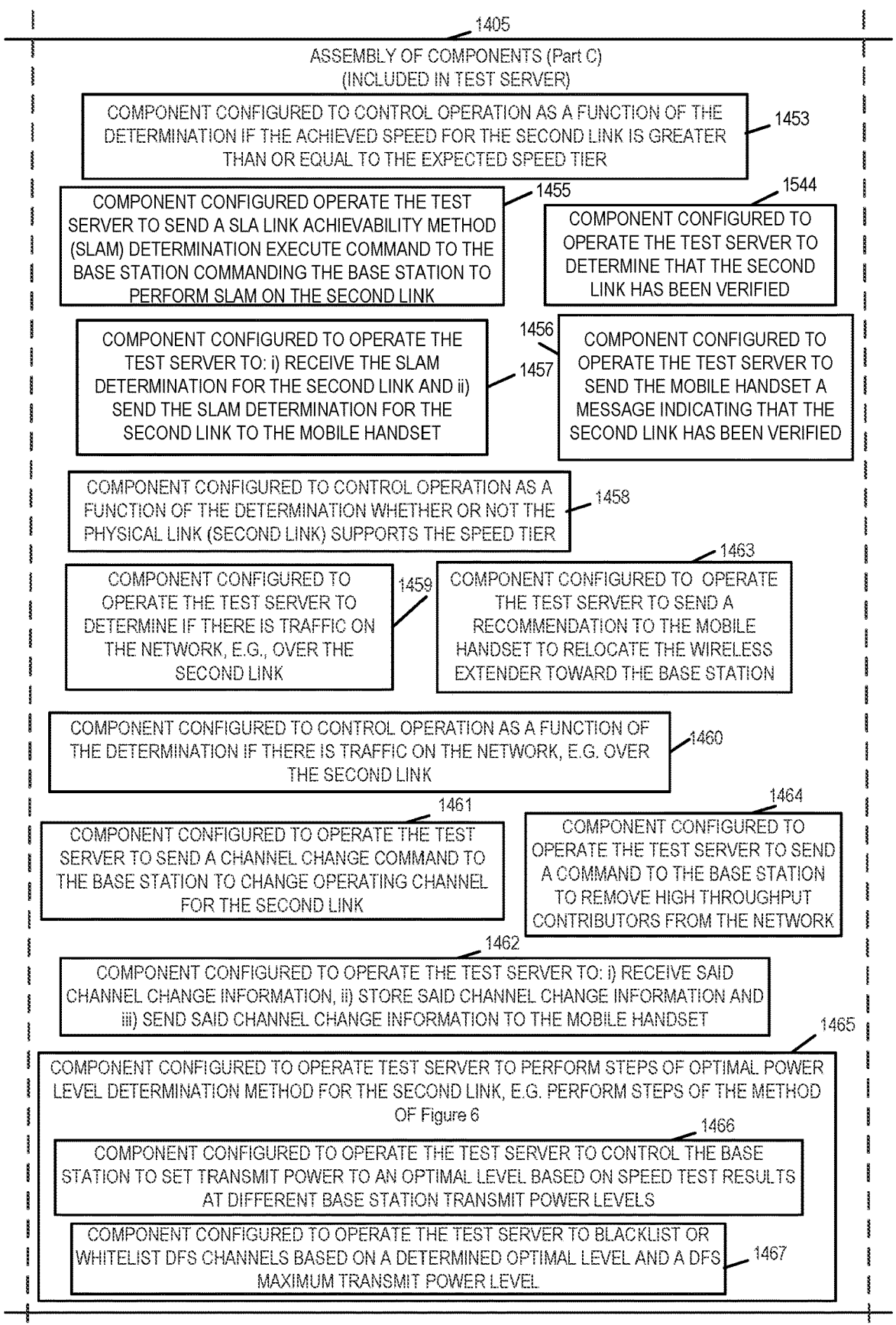

FIG. 12C is a drawing of a third part of an assembly of components which may be including in a test server in accordance with an exemplary embodiment.

Figure 12D:
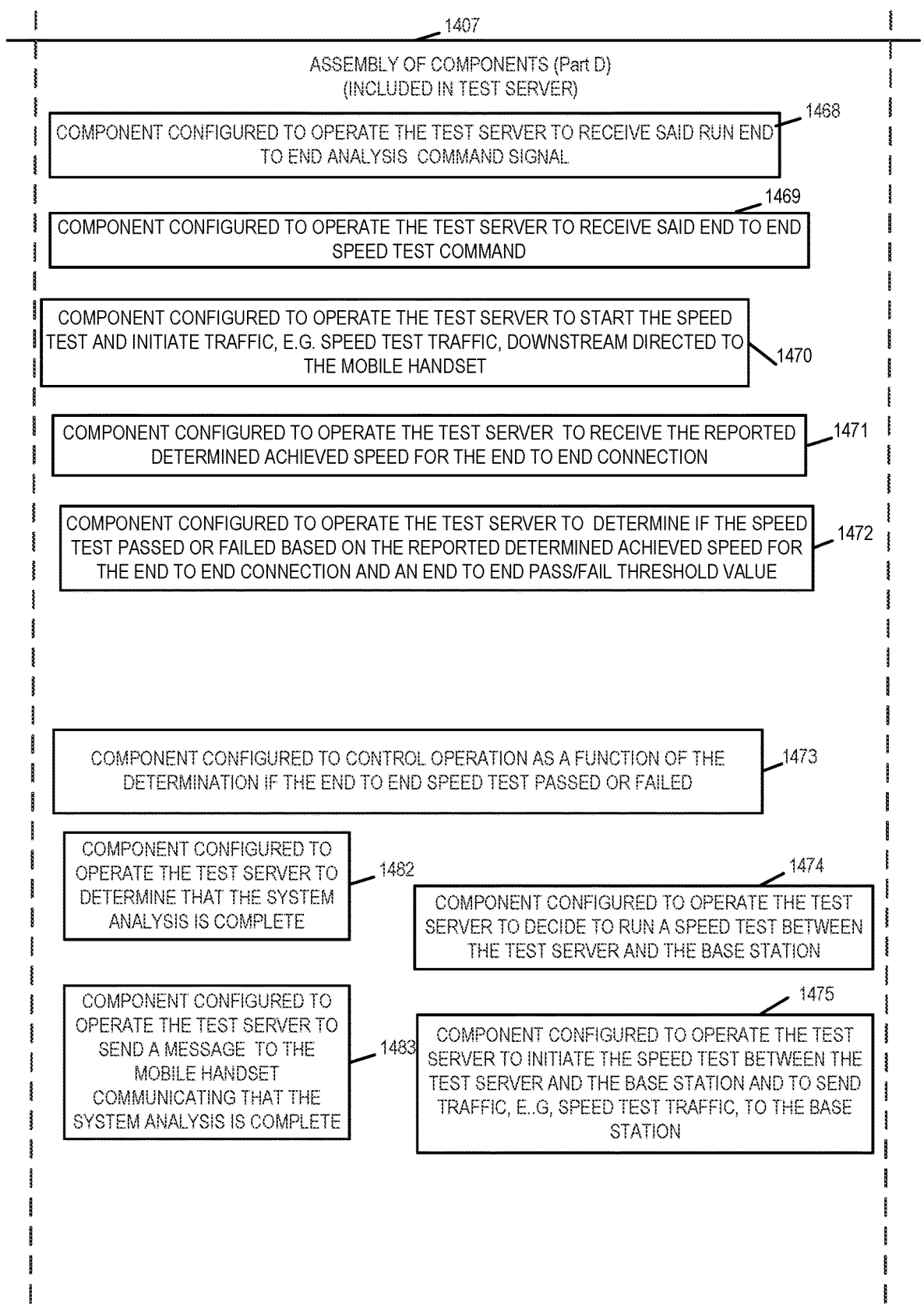

FIG. 12D is a drawing of a fourth part of an assembly of components which may be including in a test server in accordance with an exemplary embodiment.

Figure 12E:
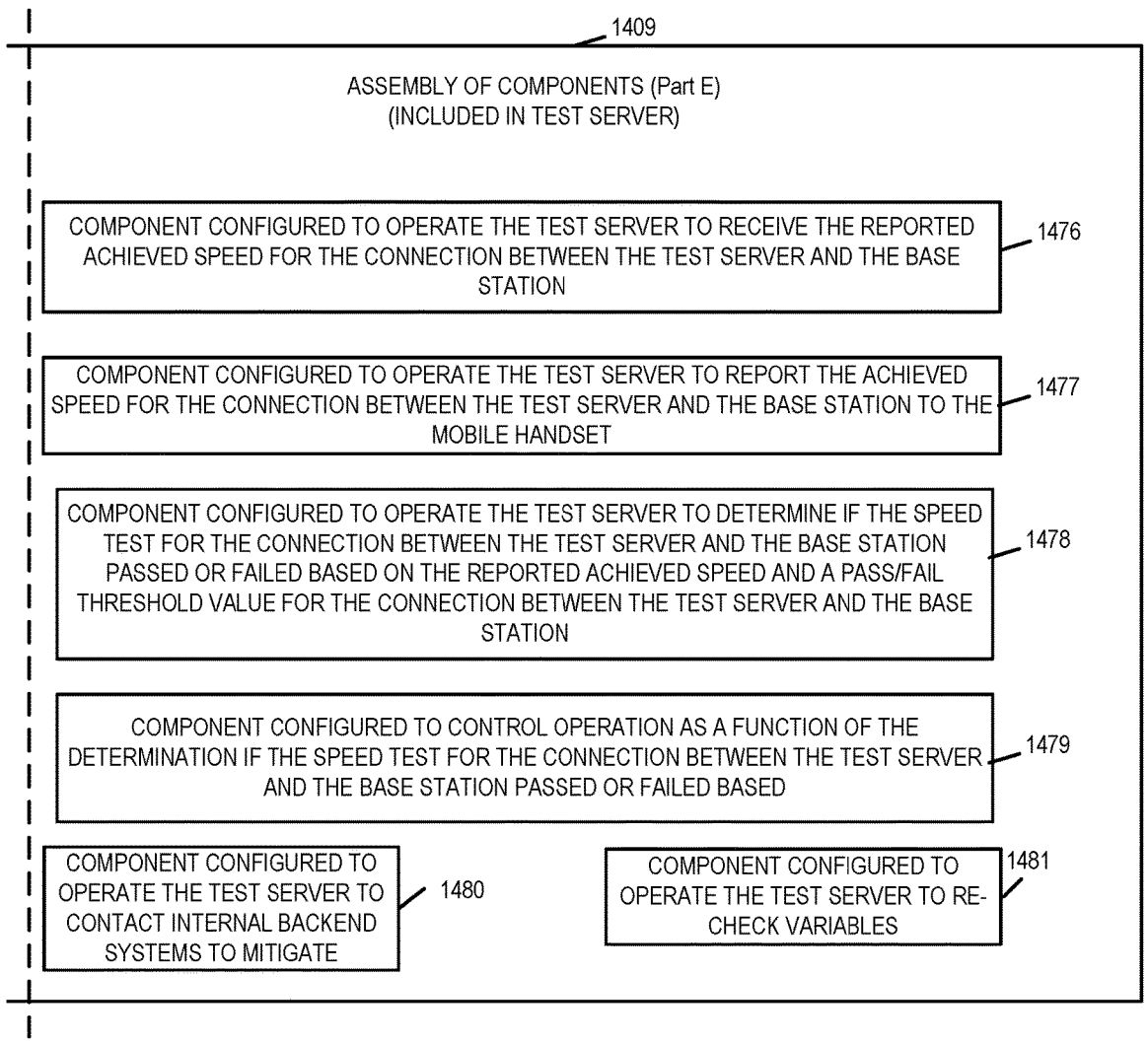

FIG. 12E is a drawing of a fifth part of an assembly of components which may be including in a test server in accordance with an exemplary embodiment.

Figure 12:

FIG. 12 comprises the combination of FIG. 12A, FIG. 12B, FIG. 12C, FIG. 12D and FIG. 12E.

Figure 13:
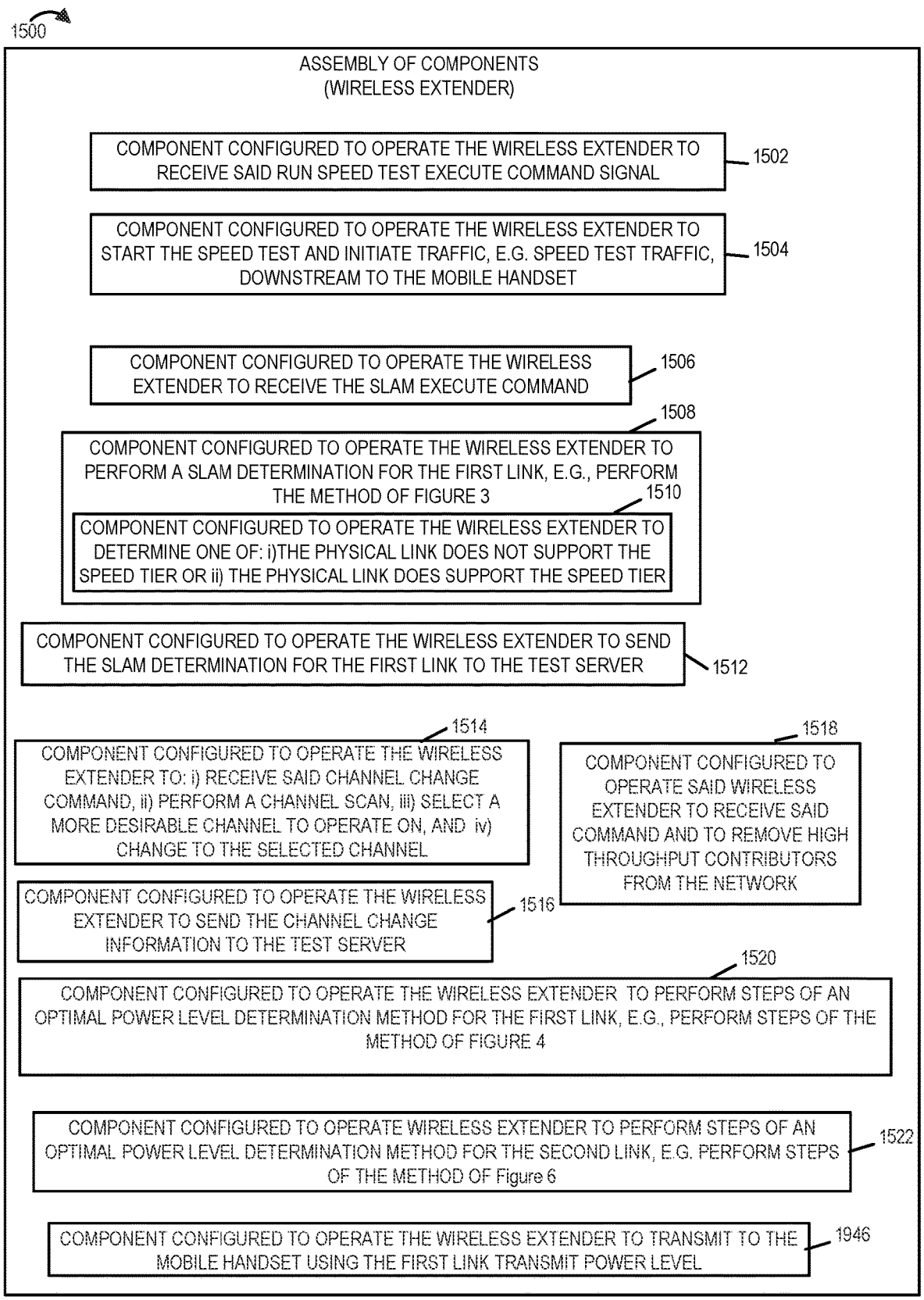

FIG. 13 is drawing of an assembly of components which may be including in a wireless extender, e.g., a WiFi extender, in accordance with an exemplary embodiment.

Figure 14:
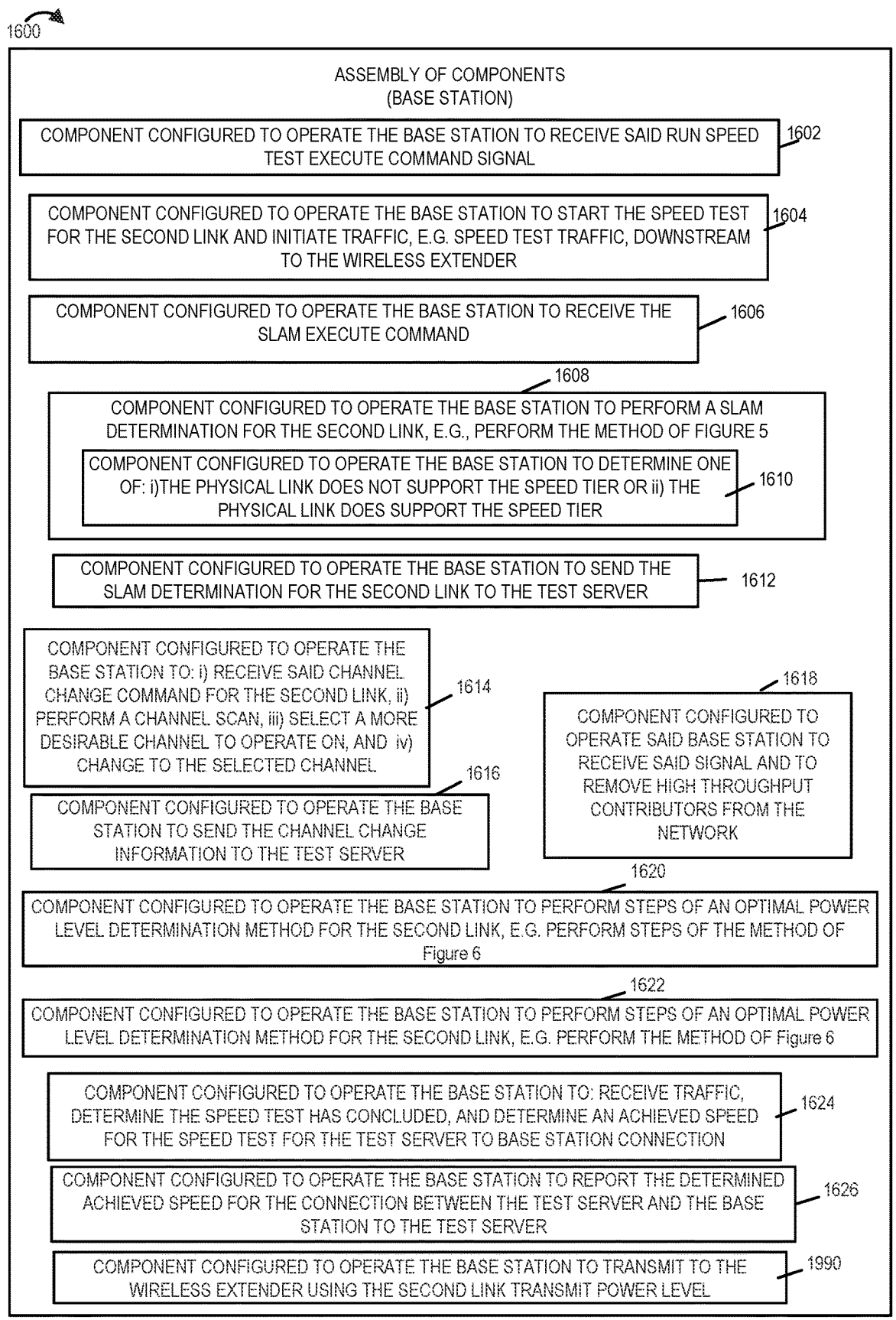

FIG. 14 is drawing of an assembly of components which may be including in a wireless base station, e.g., a WiFi base station, in accordance with an exemplary embodiment.

Figure 15A:
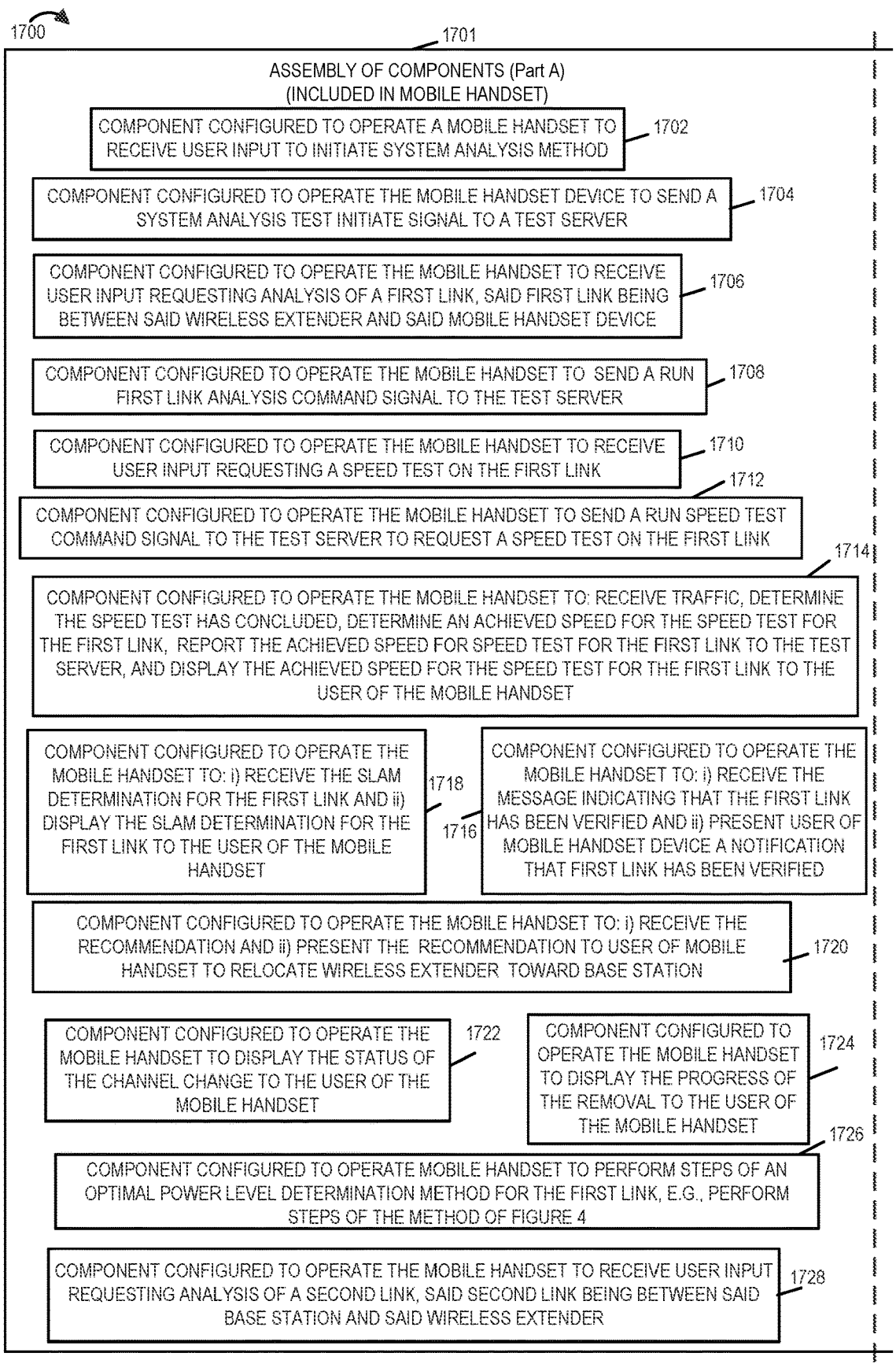

FIG. 15A is a drawing of a first part of an assembly of components which may be including in a mobile handset in accordance with an exemplary embodiment.

Figure 15B:
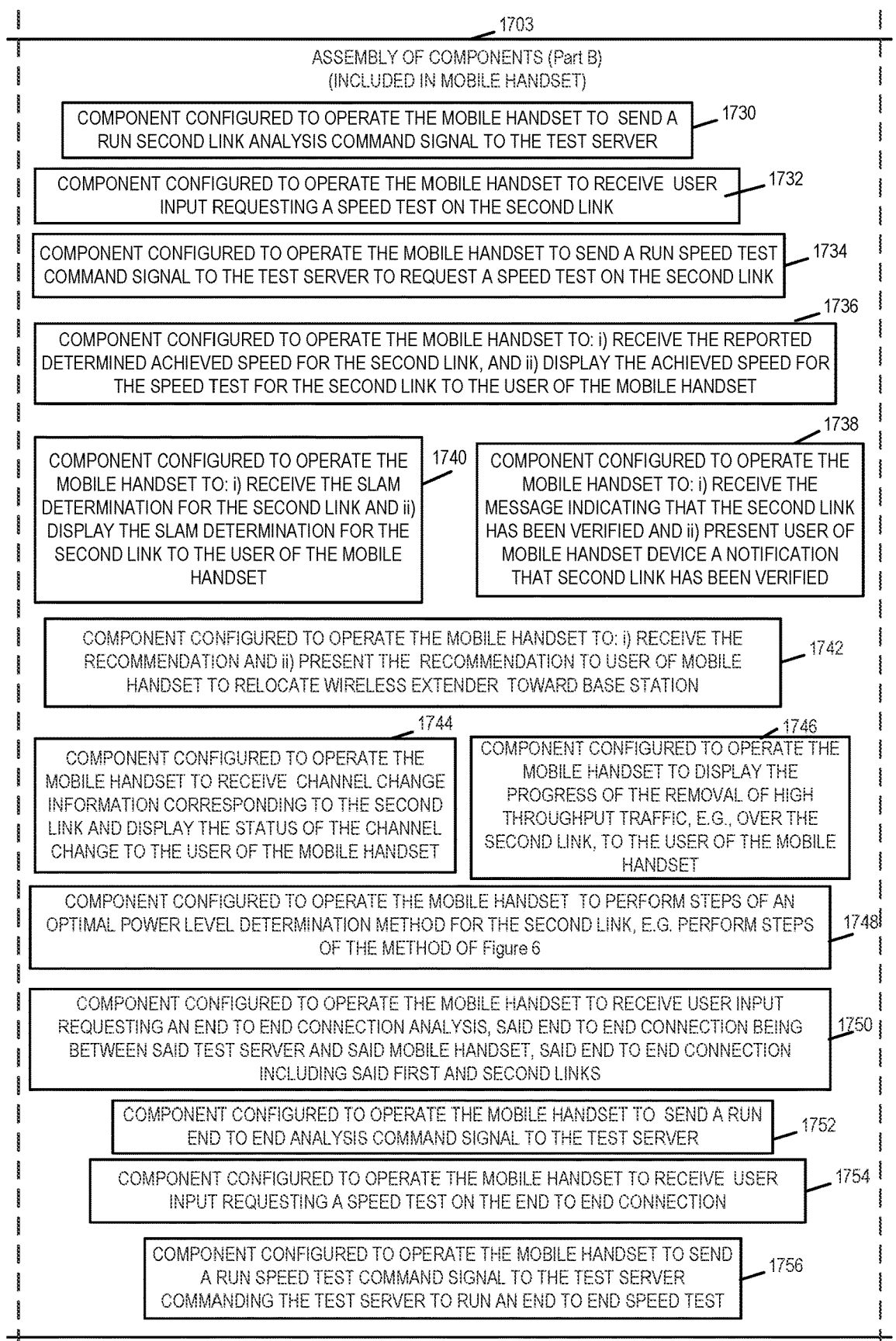

FIG. 15B is a drawing of a second part of an assembly of components which may be including in a mobile handset in accordance with an exemplary embodiment.

Figures 15, 15C:
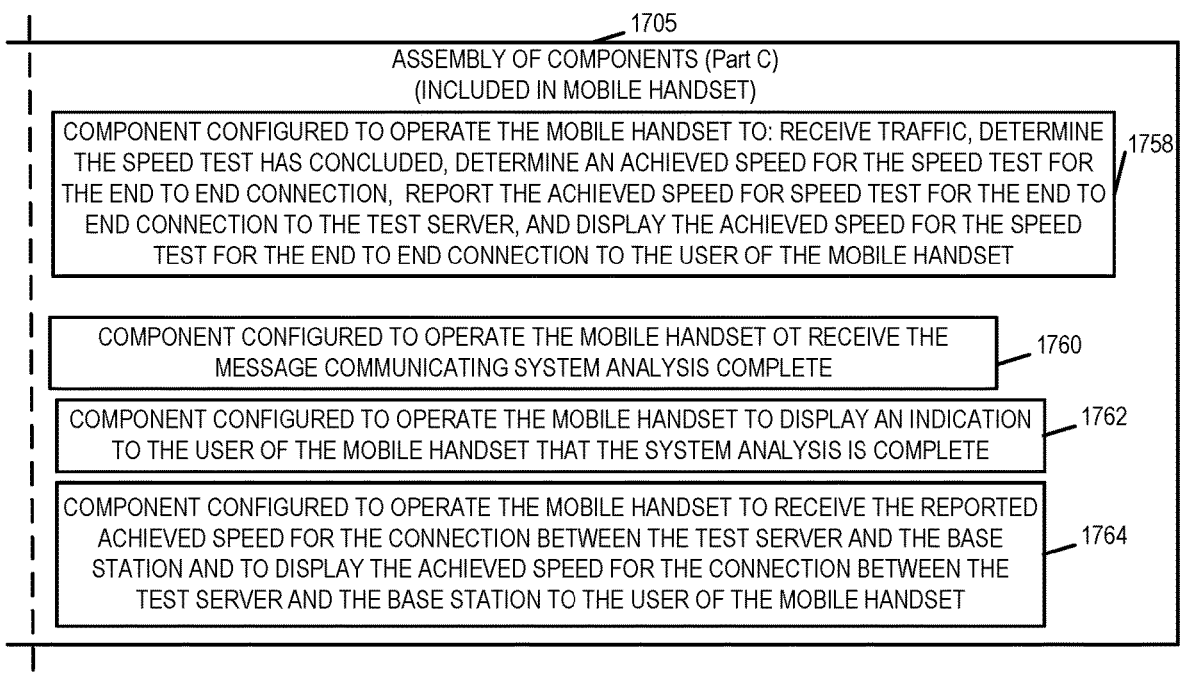

FIG. 15C is a drawing of a third part of an assembly of components which may be including in a mobile handset in accordance with an exemplary embodiment.

FIG. 15 comprises the combination of FIG. 15A, FIG. 15B and FIG. 15C.

Figure 16A:
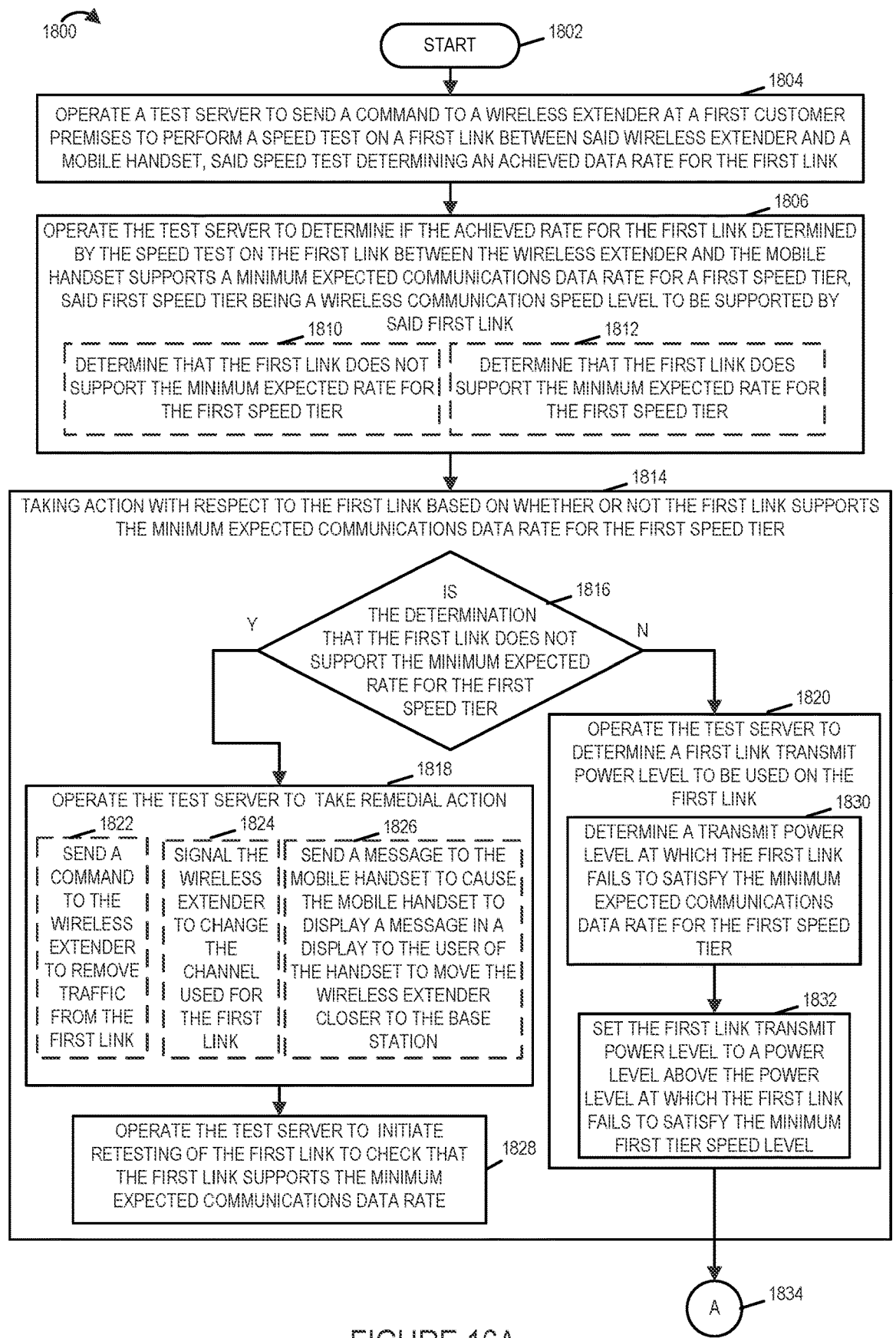

FIG. 16A is a first part of a flowchart of an exemplary method of implementing a communications system in accordance with an exemplary embodiment.

Figure 16B:
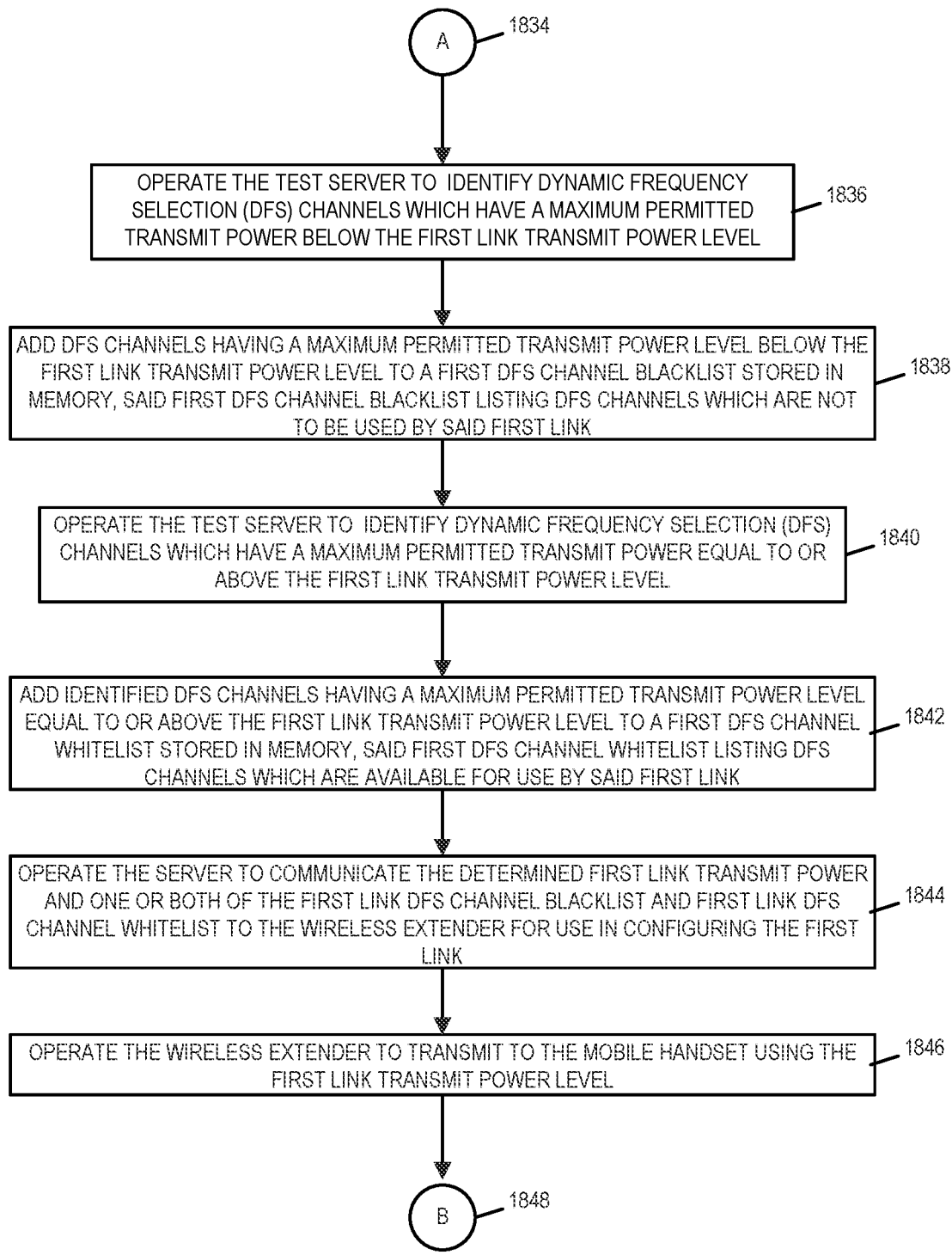

FIG. 16B is a second part of a flowchart of an exemplary method of implementing a communications system in accordance with an exemplary embodiment.

Figure 16C:
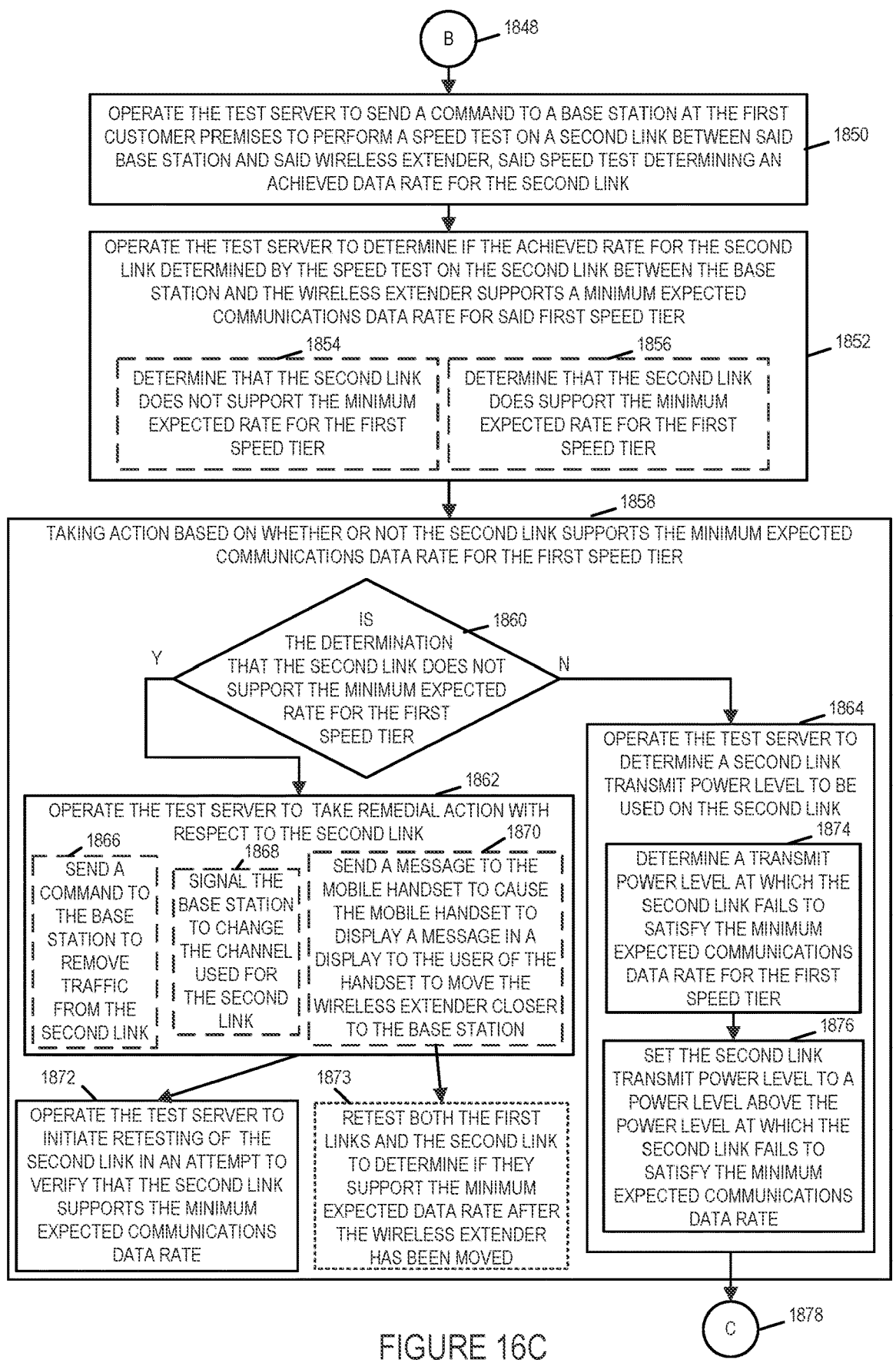

FIG. 16C is a third part of a flowchart of an exemplary method of implementing a communications system in accordance with an exemplary embodiment.

Figures 16, 16D:
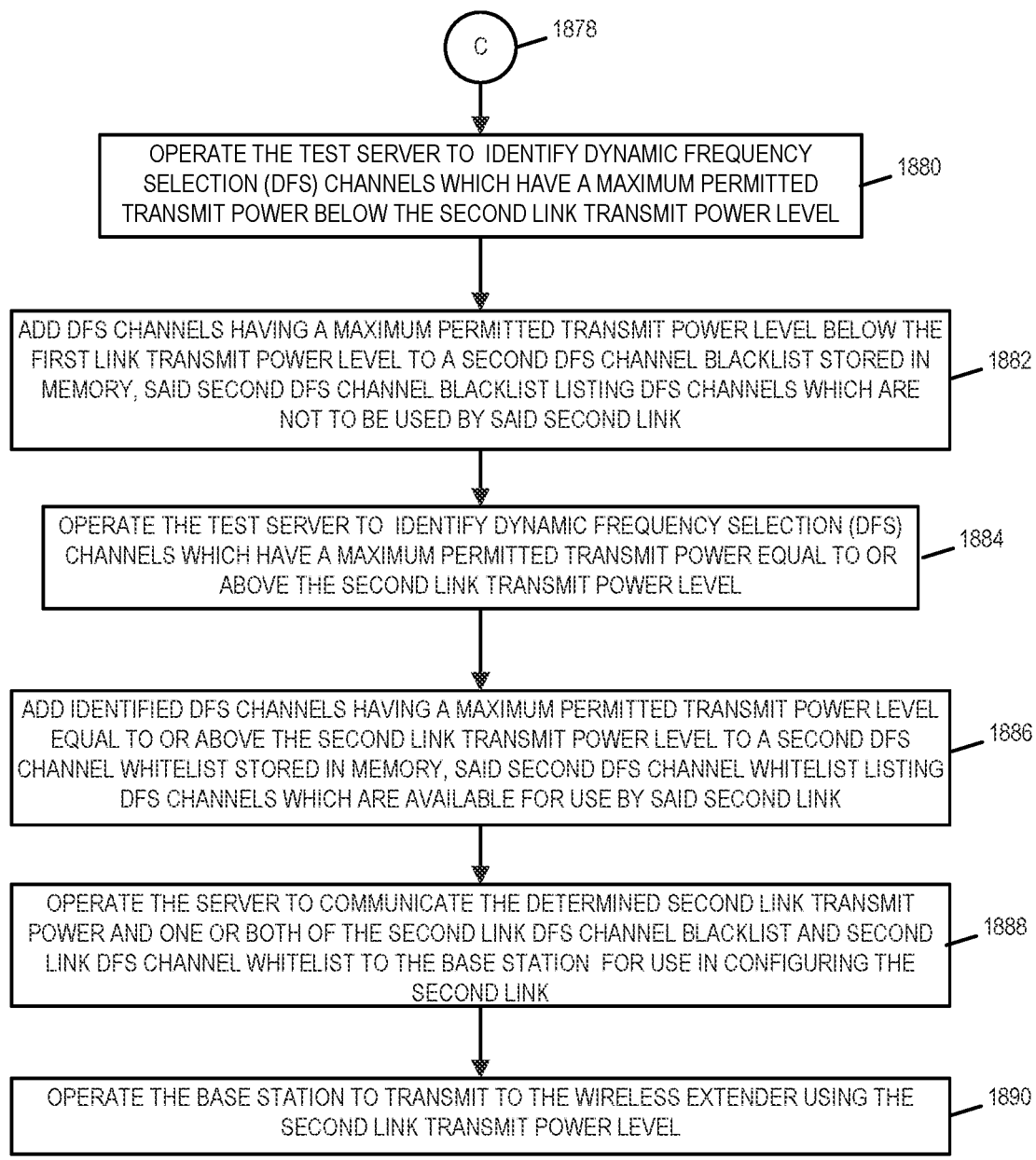

FIG. 16D is a fourth part of a flowchart of an exemplary method of implementing a communications system in accordance with an exemplary embodiment.

FIG. 16 comprises the combination of FIG. 16A, FIG. 16B, FIG. 16C and FIG. 16D.

Figure 17A:
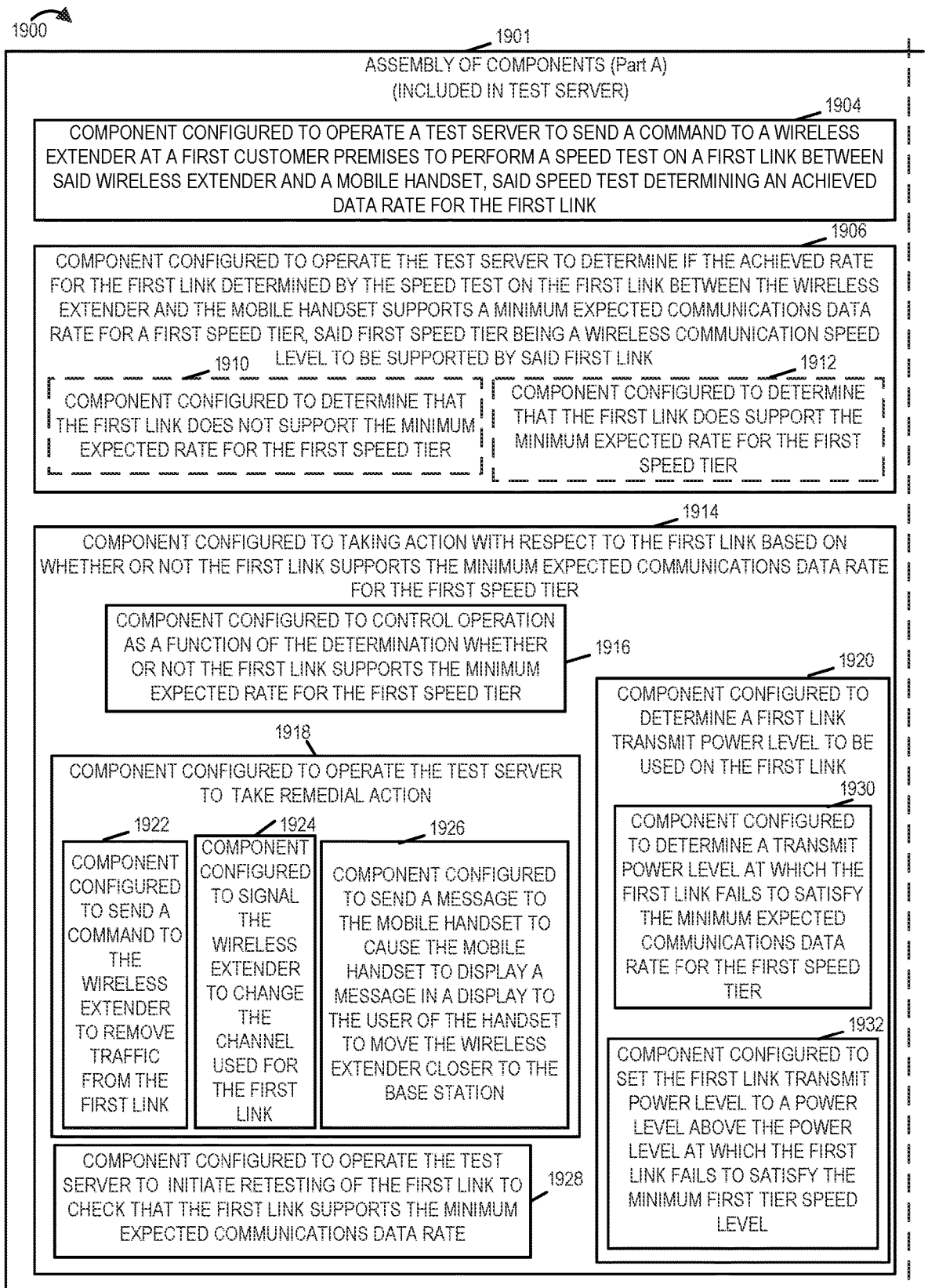

FIG. 17A is a drawing of a first part of an assembly of components which may be including in a test server in accordance with an exemplary embodiment.

Figure 17B:
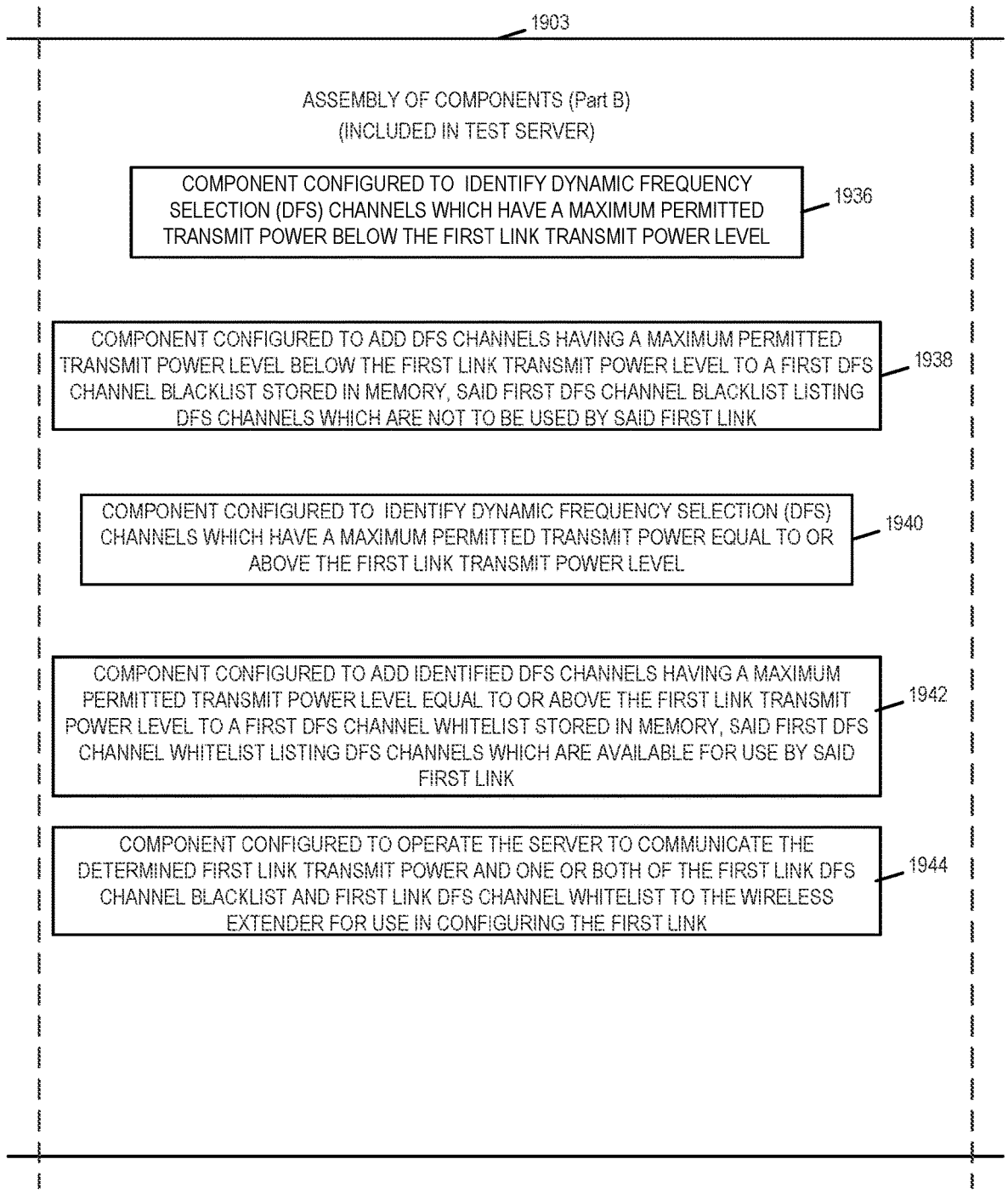

FIG. 17B is a drawing of a second part of an assembly of components which may be including in a test server in accordance with an exemplary embodiment.

Figure 17C:
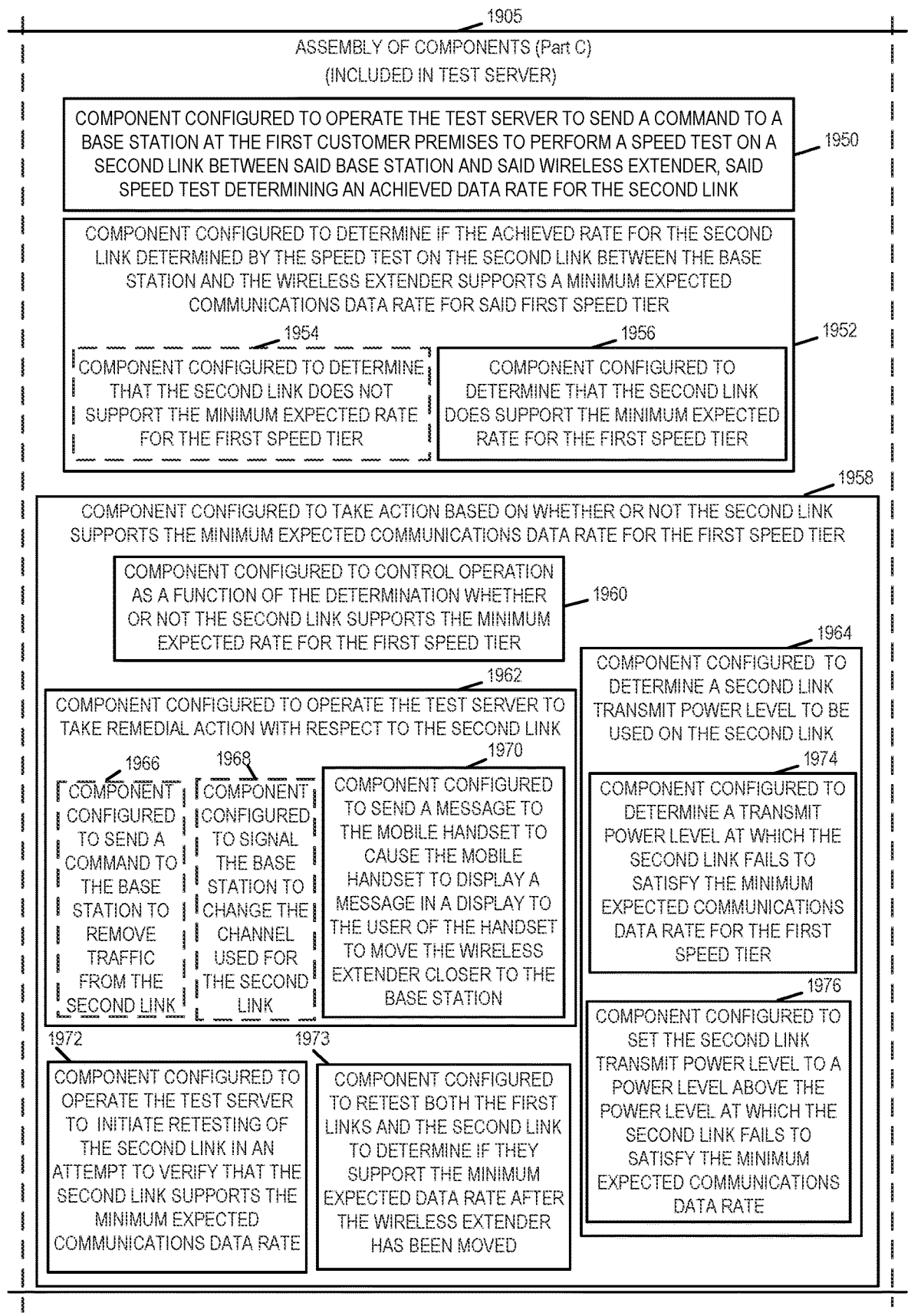

FIG. 17C is a drawing of a third part of an assembly of components which may be including in a test server in accordance with an exemplary embodiment.

Figures 17, 17D:
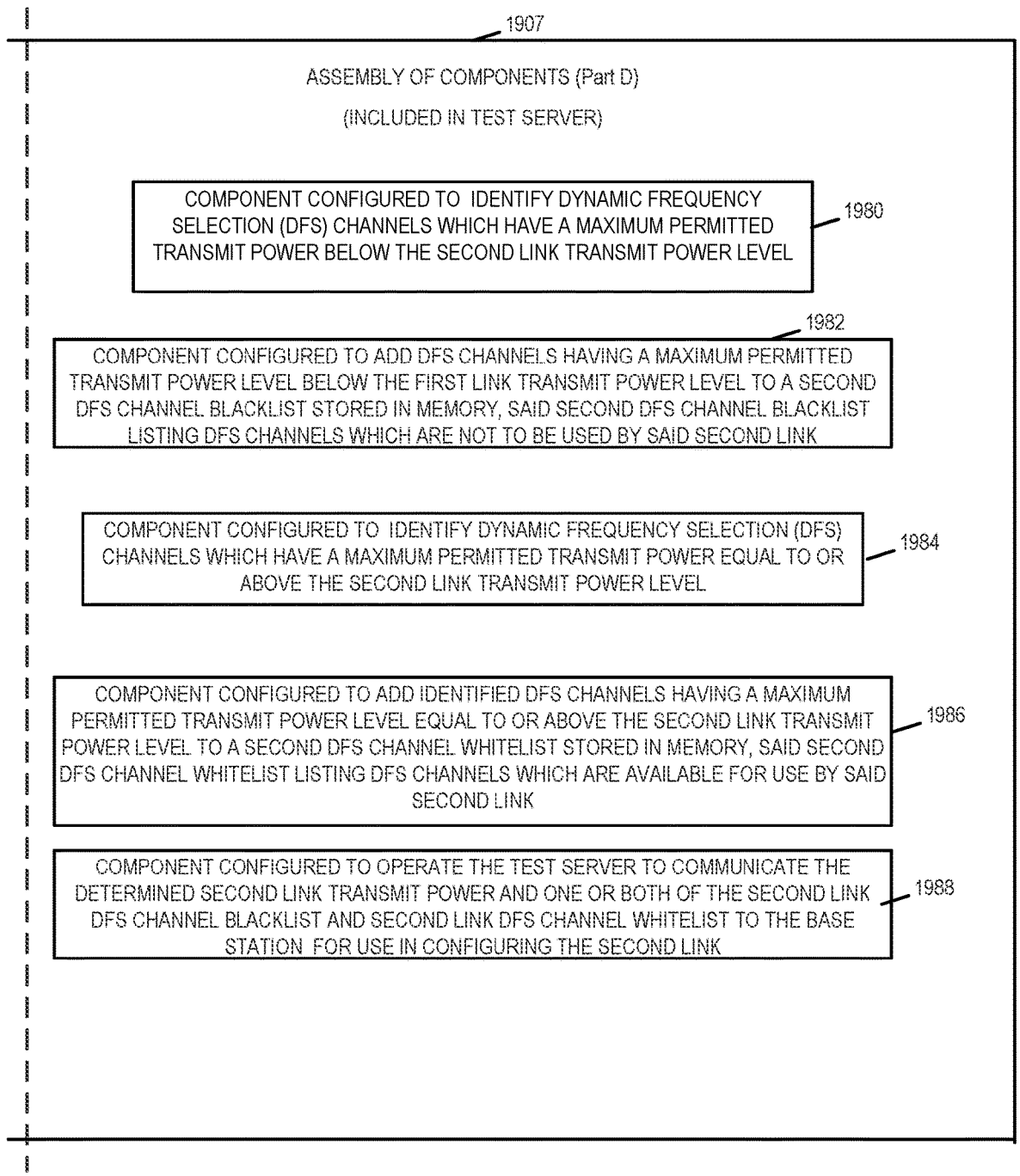

FIG. 17D is a drawing of a fourth part of an assembly of components which may be including in a test server in accordance with an exemplary embodiment.

FIG. 17 comprises the combination of FIG. 17A, FIG. 17B, FIG. 17C and FIG. 17D.

DETAILED DESCRIPTION

Figure 1:
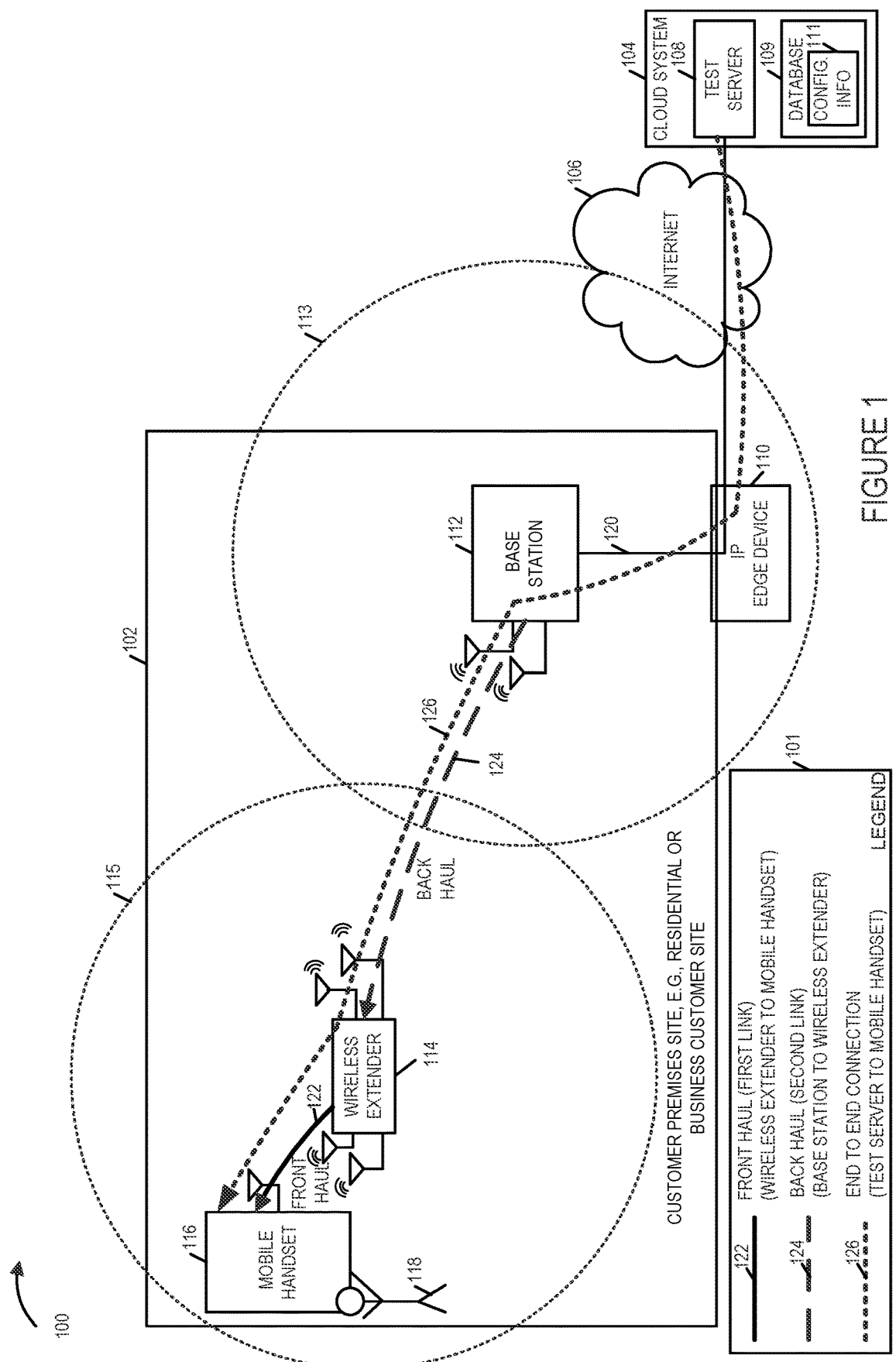
FIG. 1 is a drawing of an exemplary communications system in accordance with an exemplary embodiment.
Figure 2A:
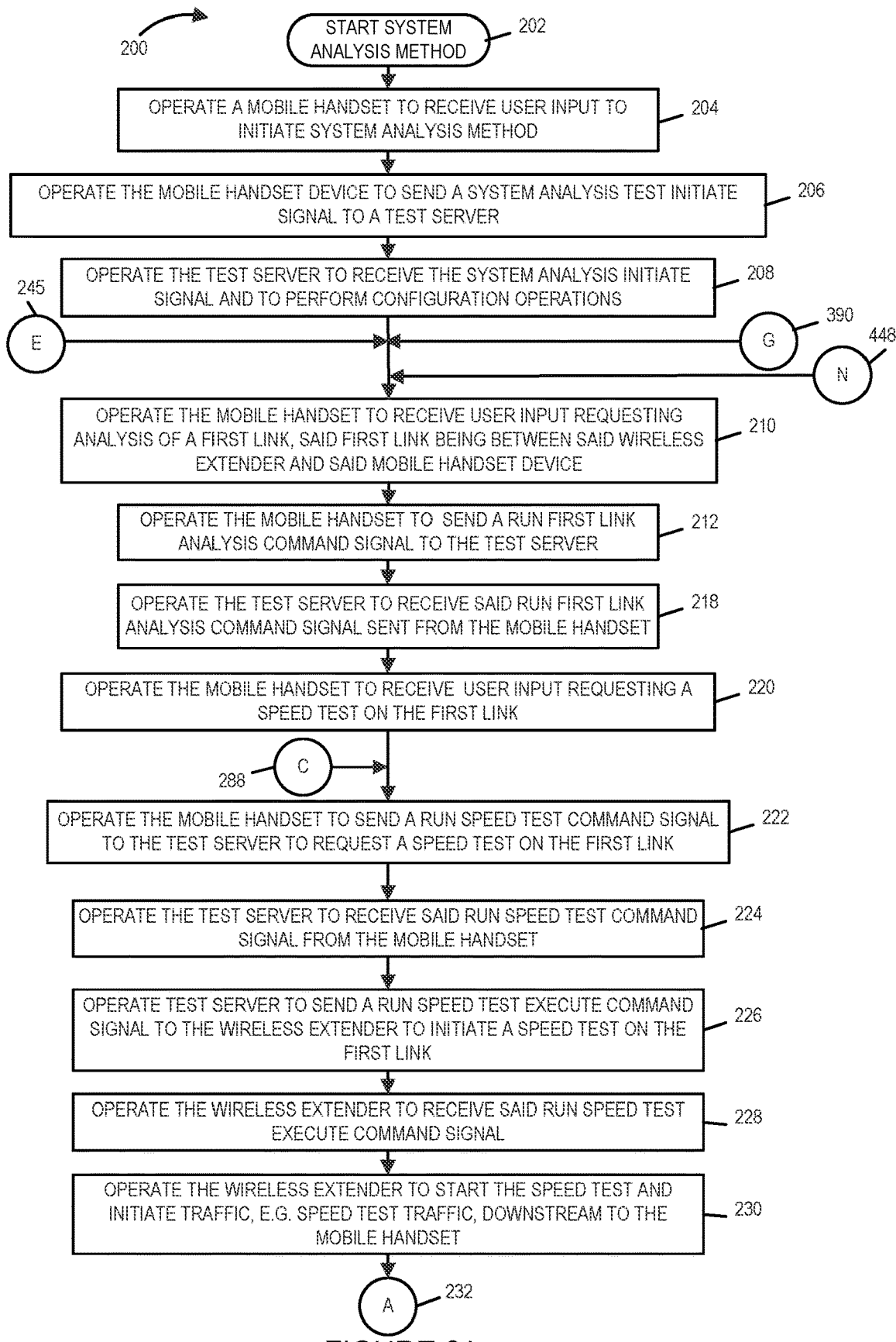
FIG. 2A is a first part of a flowchart of an exemplary system analysis method in accordance with an exemplary embodiment.
Figure 2B:
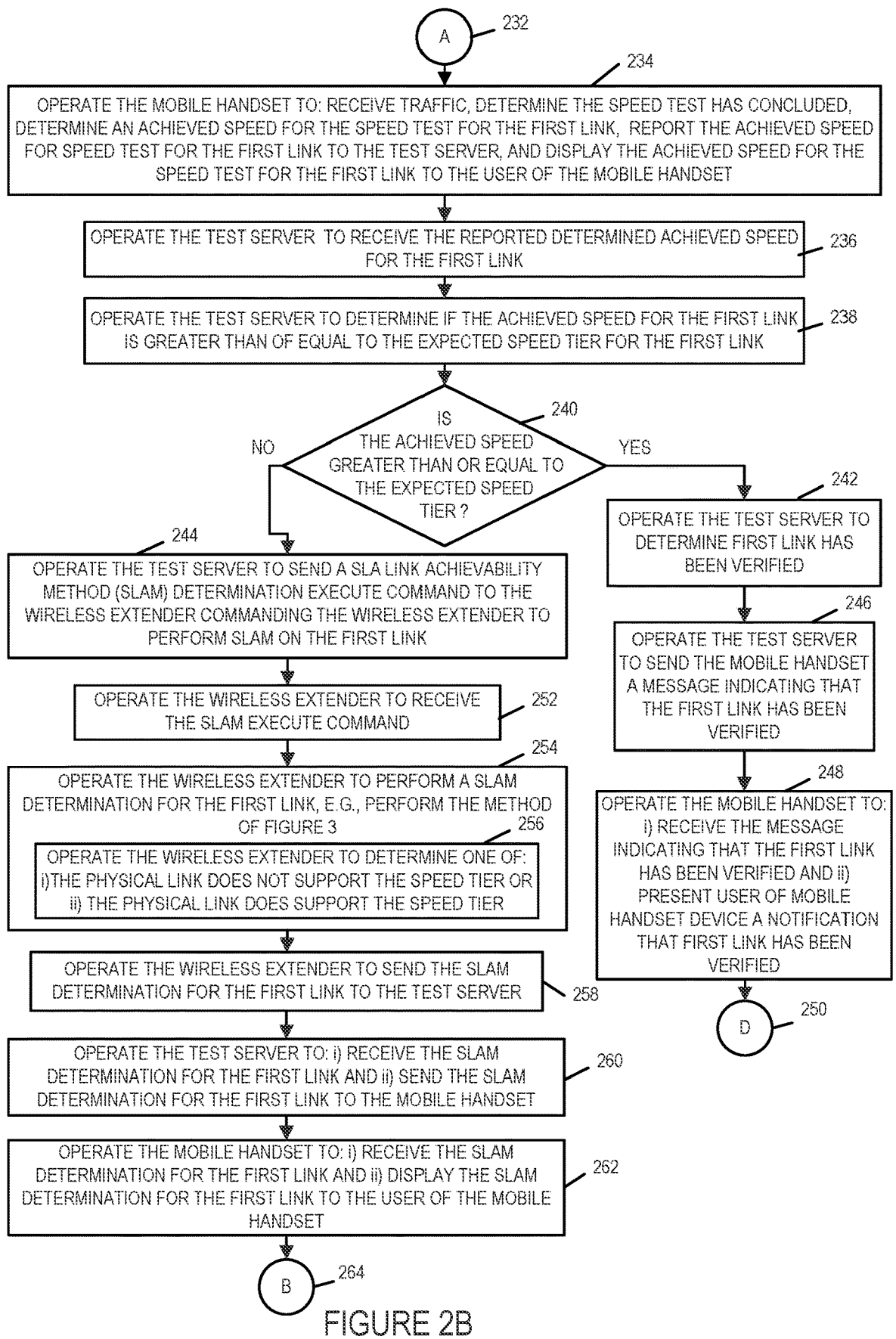
FIG. 2B is a second part of a flowchart of an exemplary system analysis method in accordance with an exemplary embodiment.
Figure 2C:
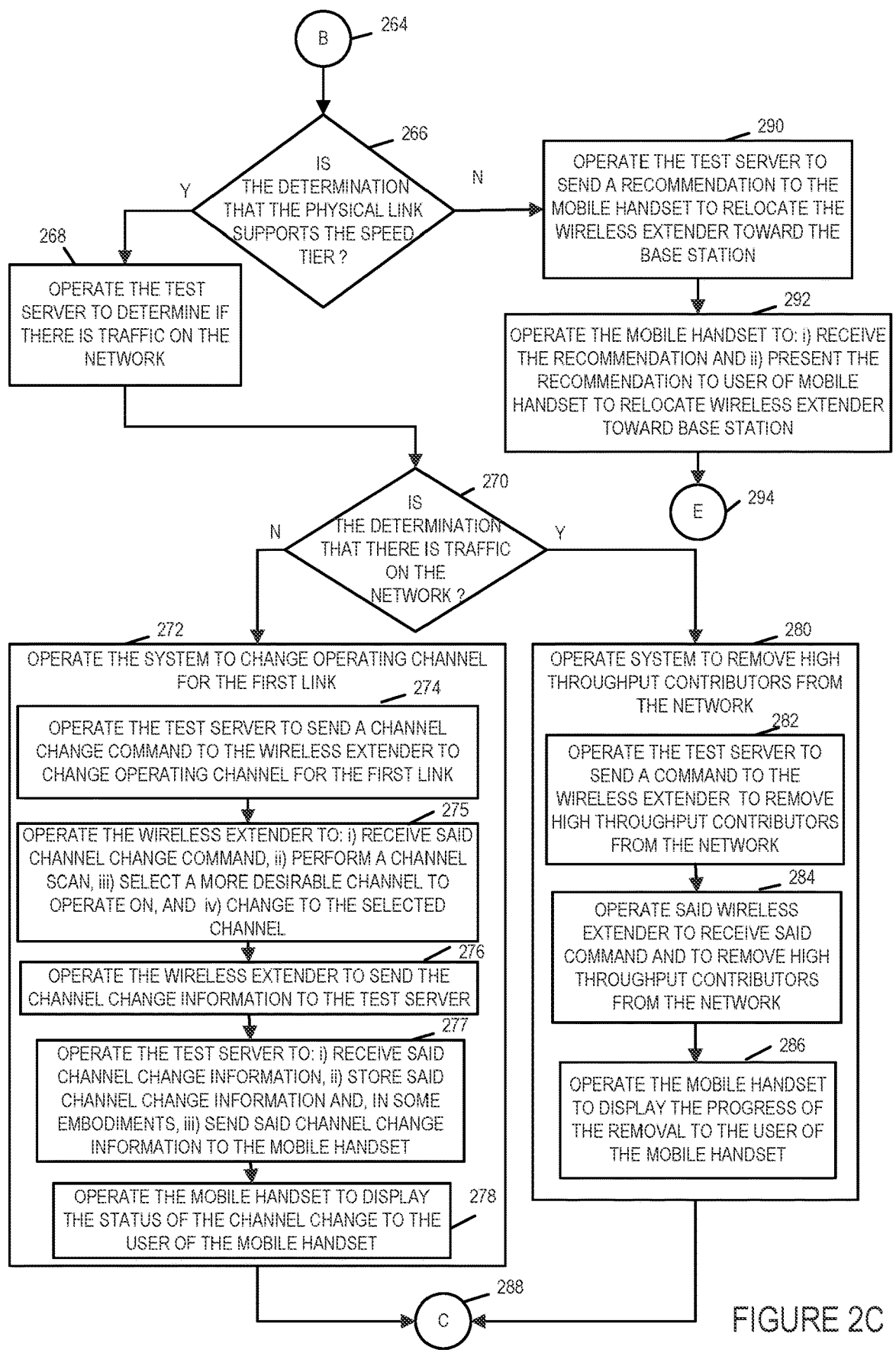
FIG. 2C is a third part of a flowchart of an exemplary system analysis method in accordance with an exemplary embodiment.
Figure 2D:
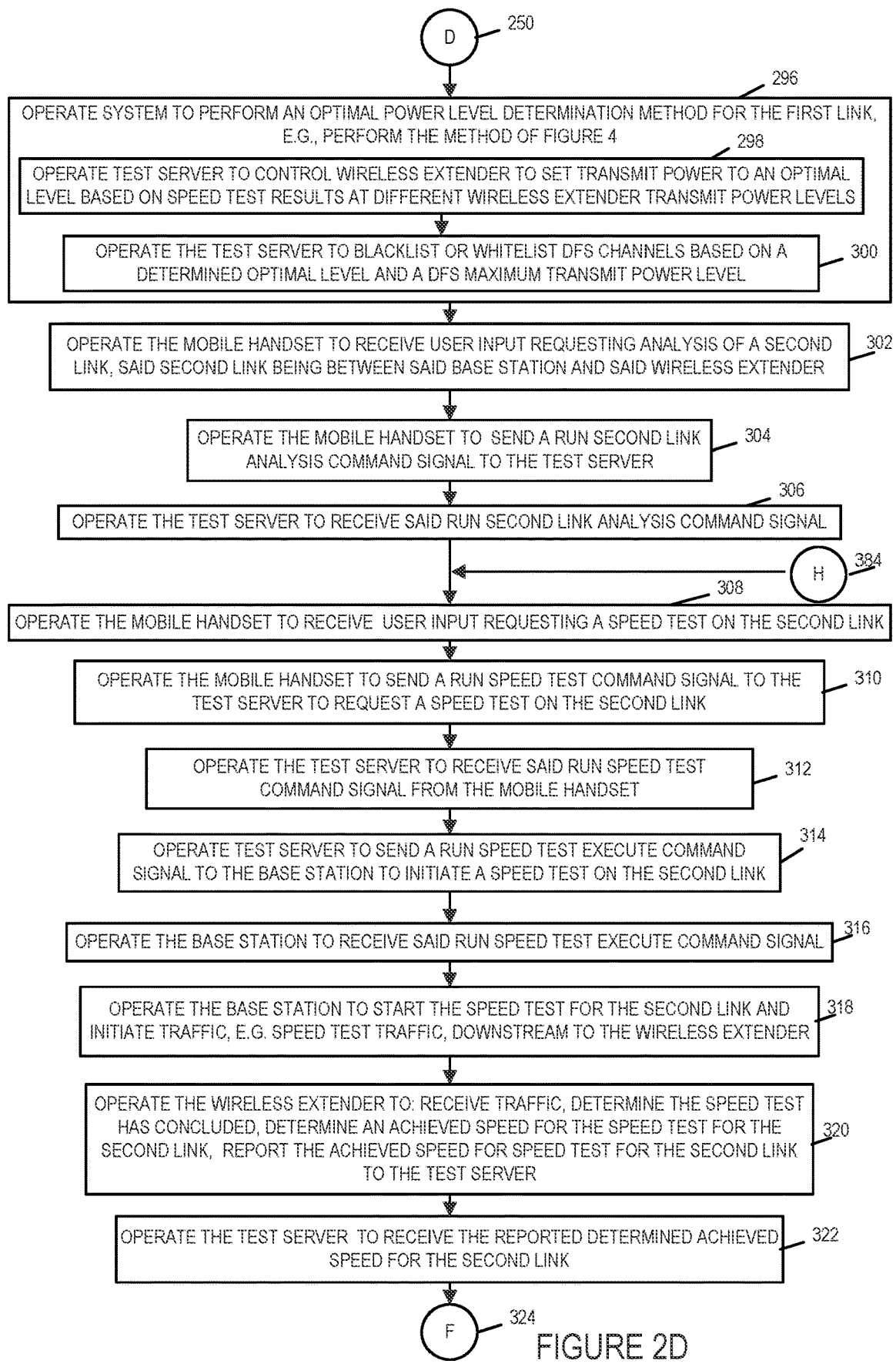
FIG. 2D is a fourth part of a flowchart of an exemplary system analysis method in accordance with an exemplary embodiment.
Figure 2E:
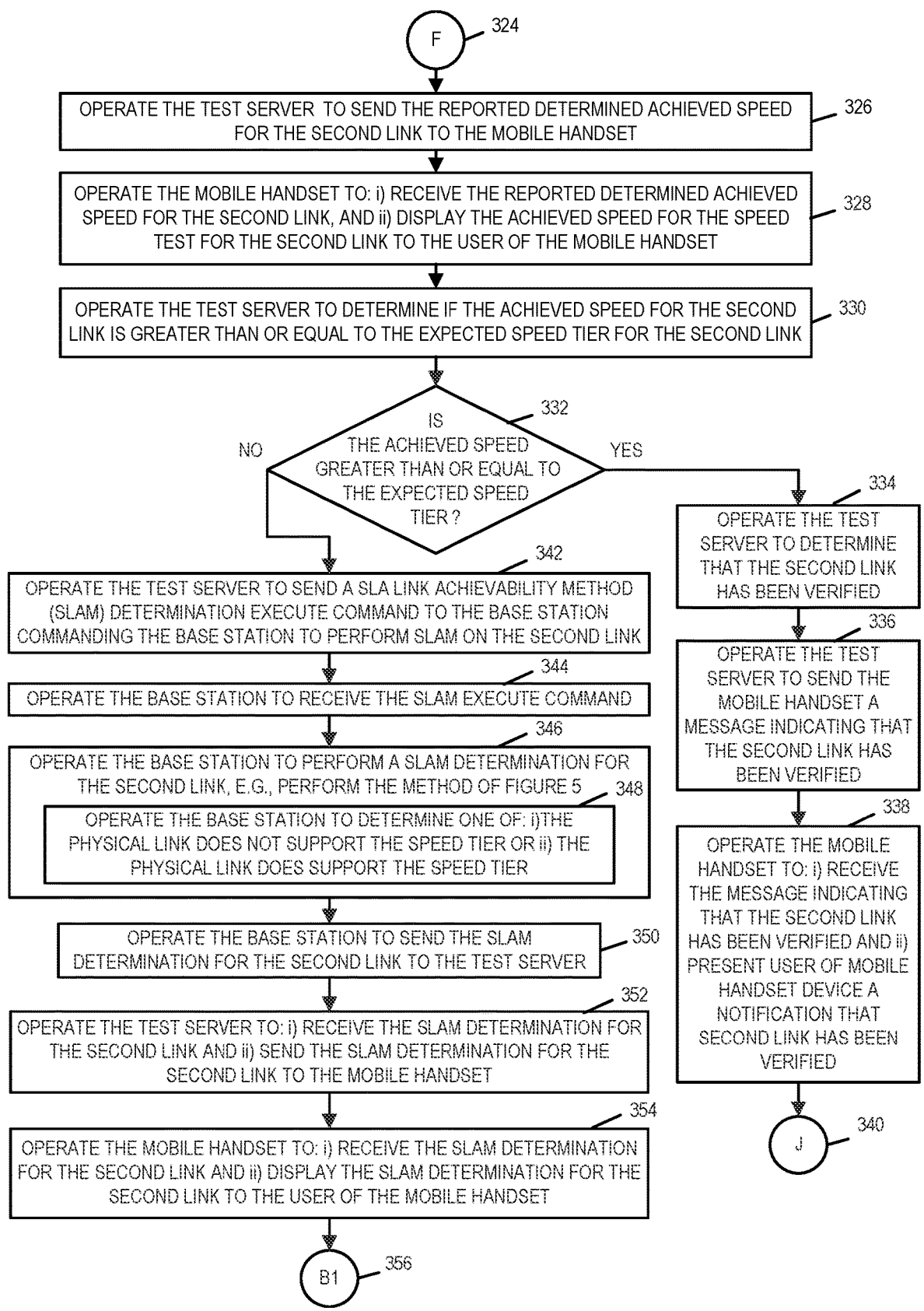
FIG. 2E is a fifth part of a flowchart of an exemplary system analysis method in accordance with an exemplary embodiment.
Figure 2F:
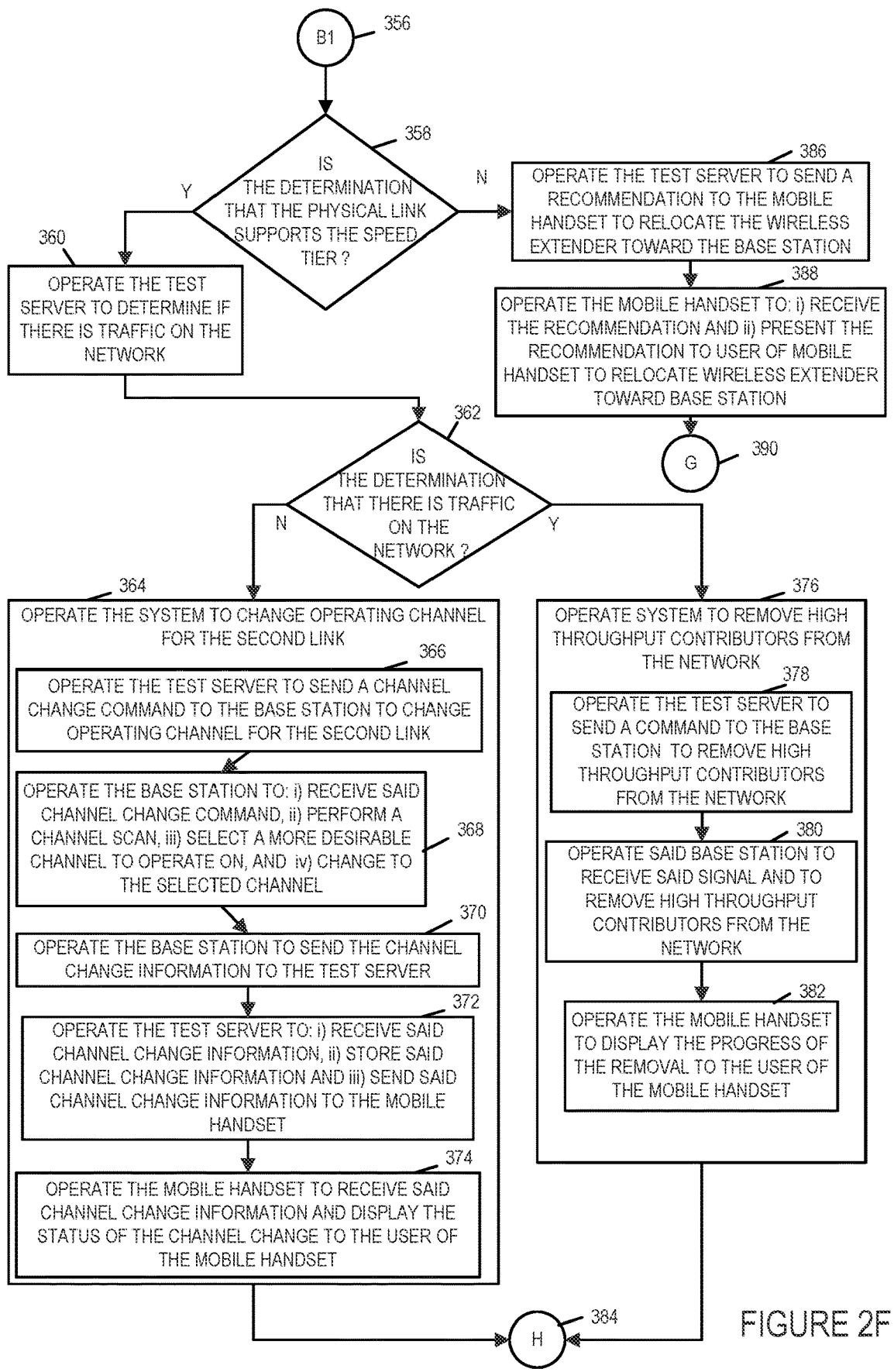
FIG. 2F is a sixth part of a flowchart of an exemplary system analysis method in accordance with an exemplary embodiment.
Figure 2G:
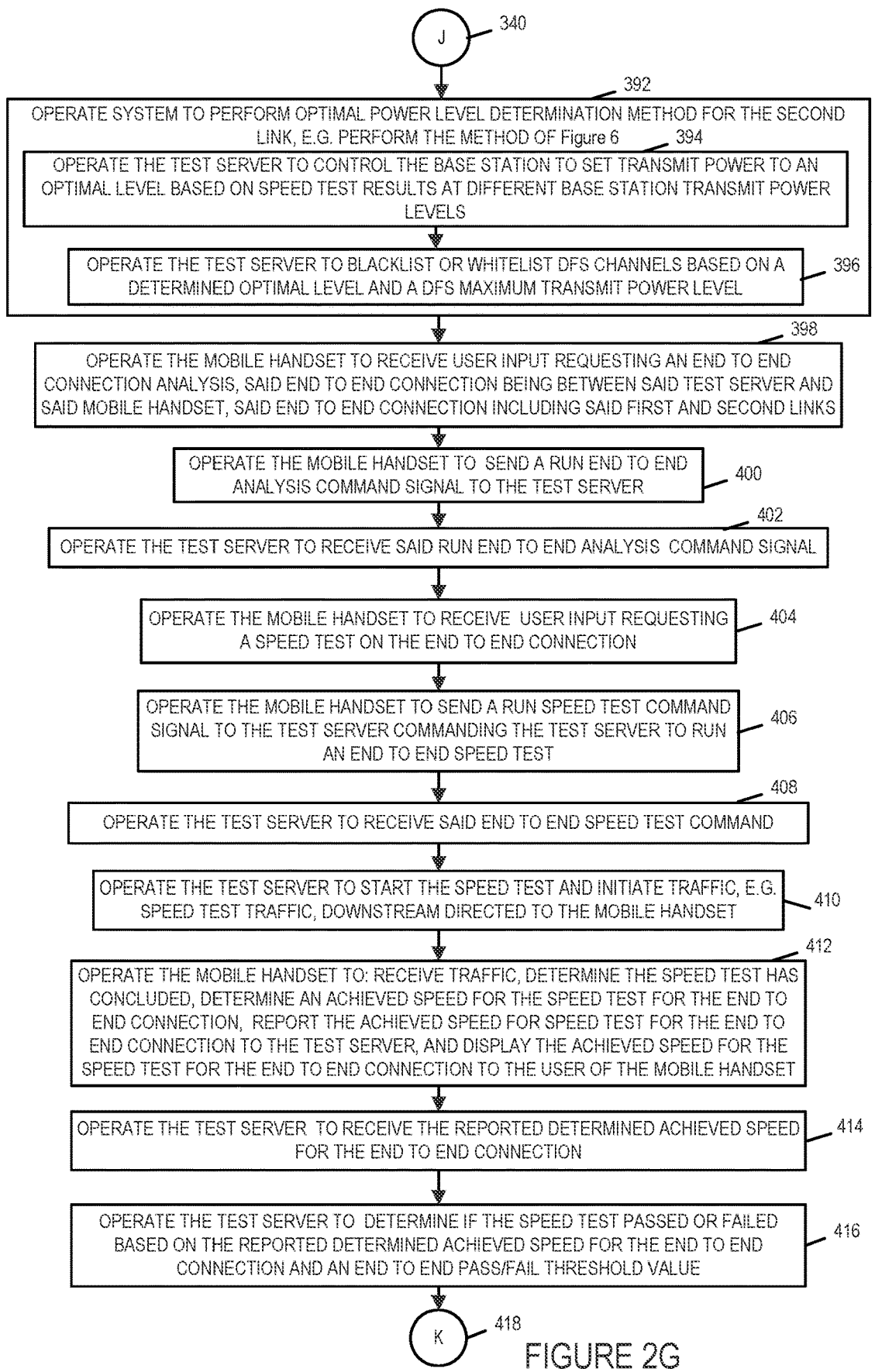
FIG. 2G is a seventh part of a flowchart of an exemplary system analysis method in accordance with an exemplary embodiment.

FIG. 1 is a drawing of an exemplary communications system 100 in accordance with an exemplary embodiment. Exemplary communications system 100 includes a test server 108, a database 109, an IP edge device 110, a base station 112, e.g., a WiFi base station, a wireless extender 114, e.g., a WiFi extender, and a mobile handset 116, e.g., a wireless test tool, e.g., a WiFi test tool, or a mobile device, e.g., a smartphone, wireless tablet, or wireless notepad, including a wireless, e.g., WiFi, test application (APP). The test server 108 and the database 109 are located in a cloud system 104. The database 109 includes stored configuration information 111, e.g., configuration information corresponding to base station 112, wireless extender 112, and/or mobile handset 116 and/or configuration information corresponding to links, e.g., a front haul link between the wireless extender and the mobile handset and a backhaul link between the base station and the wireless extender. Exemplary configuration information includes, e.g., operating frequency, information identifying an IEEE standard being used, bandwidth information, bit rate information, modulation and coding scheme (MCS) information, and/or spatial stream information. The IP edge device 110, the base station 112, and the wireless extender 114 are located at a customer premises site 102, e.g., a residential or business customer site. The mobile handset 116, which is held by user 118, e.g., a technician, is currently located within the customer premises 102, e.g., near an edge of the customer premises 102.

Base station 112 has a wireless coverage area represented by circle 113. Wireless extender has a wireless coverage area represented by dotted circle 115. The wireless extender 114 is placed to extend the wireless coverage area for the customer premises beyond the wireless coverage area of the base station 112. The final determined placement of the wireless extender 114 at the customer premises 102 is based on testing performed using the mobile handset 116, test server 108, base station 112 and wireless extender. In various embodiments, a determined transmit power level of the wireless extender 114 and/or a determined transmit power level of the base station 112 is based on testing performed using the mobile handset 116, test server 108, base station 112 and wireless extender 114.

Although only one wireless extender 114 is shown in FIG. 1, it should be appreciated that customer premises s102 may, and sometimes does, include multiple wireless extenders 114, e.g., so that wireless coverage may be available throughout the entire customer premises 102.

System 100 includes a connection 120 between base station 120 and test server 108, which traverses IP edge device 110, e.g., a router, and Internet 106. Legend 102 indicates that heavy solid line 122 represents a front haul link which is between wireless extender 114 and mobile handset 116. The front haul link 122 is sometimes referred to a first link. Legend 102 indicates that heavy dashed line 124 represents a back haul link which is base station 102 and wireless extender 114. The back haul link 124 is sometimes referred to a second link. Legend 102 indicates that heavy dotted line 126 represents an end to end connection between test server 108 and mobile handset 116. End to end connection 126 traverses the Internet 106, IP edge device 110, base station 112, and wireless extender 114. End to end connection 126 includes backhaul link (second link) 124 and front haul link (first link) 122.

Mobile handset 116, e.g., including a graphical user interface (GUI), serves an input device 116 for user 118, e.g., a technician, to issue commands to perform various tests, and a display device, e.g., to display test results and/or recommendations to the user. Exemplary input test commands include, e.g., start system test, start first link testing, perform a rate test on the first link, perform a SLA link achievability (SLAM) determination for the first link, start second link testing, perform a rate test on the second link, perform a SLA link achievability (SLAM) determination for the second link, start end to end connection test, and perform a rate test for the end to end connection. Exemplary displayed test results include, e.g., an achieved rate for the first link, a SLAM determination for the first link, a determined optimal transmit power level for the first link, an indication that the first link has been verified, an achieved rate for the second link, a SLAM determination for the second link, a determined optimal transmit power level for the second link, an indication that the second link has been verified, a determined rate for the end to end connection, an indication that the end to end connection test has passed or failed. Exemplary recommendations include, e.g., a recommendation to move the wireless extender closer to the base station, a recommendation to move the extender to a particular location at the customer premises, a recommendation to proceed with the testing, a recommendation to repeat a test, a recommendation to add additional wireless extenders to the customer premises, etc. Other exemplary displayed information communicated to the user of mobile handset 116 include, e.g., test process, channel change information, an indication that Dynamic Frequency Selection (DFS) channels have been blacklisted or whitelisted, and an indication that a problem has been detected or is suspected with backend systems. Mobile handset 116 also determines an achieved rate for a rate test performed for the first link and reports the results to the test server 108.

Test Server 108 commands the base station 112 and the wireless extender 114 to perform various tests and/or evaluations, e.g., in response to a received request from mobile handset 116 and/or in accordance with steps of an automated testing method. Test server 108 further receives results from mobile handset 116, wireless extender 114, and base station 112. Test server 108 evaluates the received results and makes determinations, e.g., did a particular test pass or fail, what action should be taken, etc. Test server 108 further sends command signals to the wireless extender 114 and base station 112 to implement determined actions, e.g., change a transmission power level, remove high throughput traffic, change channels, etc.

Wireless extender 114, under the control of test server 108, performs operations, e.g., initiates a first link rate test and sends signals used in the first link rate test, changes a transmission power level for the first link, performs a SLAM determination for the first link, changes channels for the first link, measures rate for the second link and reports achieved rate for the second link. Base station 112, under the control of test server 108, performs operations, e.g., initiates a second link rate test and sends signals used in the second link rate test, changes a transmission power level for the second link, performs a SLAM determination for the second link, and changes channels for the second link.

FIG. 2, comprising the combination of FIG. 2A, FIG. 2B, FIG. 2C, FIG. 2D, FIG. 2E, FIG. 2E, FIG. 2F, FIG. 2G, FIG. 2H and FIG. 2I, is a flowchart 200 of an exemplary system analysis method, e.g., a method of operating a communications system to perform system analysis and system configuration in accordance with an exemplary embodiment. The exemplary system is, e.g., system 100 of FIG. 1. Operation start in step 202 in which the system is powered on and initialized. Operation proceeds from step 202 to step 204.

In step 204 a mobile handset, e.g., mobile handset 116, receives user input to initiate the system analysis method. For example, mobile handset 116 detects that user 118 has depressed start system analysis button 1320 on the graphical user interface 1300 of display 1254, e.g., a touchscreen display, of mobile handset 116. Operation proceeds from step 204 to step 206.

In step 206 the mobile handset sends a system analysis test initiate signal to a test server, e.g., test server 108 of cloud system 104. Operation proceeds from step 206 to step 208. Operation proceeds from step 206 to step 208.

In step 208 the test server receives the system analysis initiate signal and performs configurations operations, e.g., configuration the system for the system analysis. Operation proceeds from step 208 to step 210.

In step 210 the mobile handset receives user input requesting analysis of a first link, said first link being between a wireless extender, e.g., wireless extender 114, and the mobile handset. For example, the mobile handset 116 detects that user 118 has depressed wireless extender to mobile handset (first link) button 1312 on the first link portion 1304 of the graphical user interface 1300 of display 1254 of mobile handset 116. The first link is, e.g., front haul link 122 between wireless extender 114 and mobile handset 116. Operation proceeds from step 210 to step 212.

In step 212 the mobile handset sends a run first link analysis command signal to the test server. Operation proceeds from step 212 to step 218. In step 218 the test server receives said run first link analysis command signal send from the mobile handset and performs configuration operations for the first link analysis. Operation proceeds from step 218 to step 220.

In step 220 the mobile handset receives user input requesting a speed test on the first link. For example, the mobile handset 116 detects that user 118 has depressed speed test (first link) button 1314 on the first link portion 1304 of the graphical user interface 1300 of display 1254 of mobile handset 116. Operation proceeds from step 220 to step 222.

In step 222 the mobile handset sends a run speed test command signal to the test server to request a speed test on the first link. Operation proceeds from step 222 to step 224. In step 224 the test server receives the run speed test command signal from the mobile handset. Operation proceeds from step 224 to step 226.

In step 226 the test server sends a run speed test execute command signal to the wireless extender to initiate a speed test on the first link. Operation proceeds from step 226 to step 228.

In step 228 the wireless extender receives said run speed test execute command signal. Operation proceeds from step 228 to step 230. In step 230 the wireless extender starts the speed tests and initiates traffic, e.g., speed test traffic, downstream to the mobile handset. Operation proceeds from step 230, via connecting node A 232, to step 234.

In step 234 the mobile handset: receives traffic, e.g. speed test traffic, processes the received traffic, e.g., performing speed test measurements, determines that the speed test has concluded, determines an achieved speed for the speed test for the first link, reports the achieved speed for the speed test for the first link to the test server, and displays, e.g., on display 1254, the achieved speed to the speed test for the first link to the user of the mobile handset. Operation proceeds from step 234 to step 236.

In step 236 the test server receives the reported achieved speed for the first link. Operation proceeds from step 236 to step 238. In step 238 the test server determines if the achieved speed for the first link is greater than or equal to the expected speed tier for the first link. Operation proceeds from step 238 to step 240. In step 240 if the achieved speed for the first link is greater than or equal to the expected speed tier, then operation proceeds from step 240 to step 242; otherwise operation proceeds from step 240 to step 244.

In step 240 the test server determines that the first link has been verified. Operation proceeds from step 242 to step 246, in which the test server sends the mobile handset a messing indicating that the first link has been verified. Operation proceeds from step 246 to step 248. In step 248 the mobile handset: i) receives the message indicating that the first link has been verified; and ii) presents the user of the mobile handset device a notification that the first link has been verified. Operation proceeds from step 248, via connecting node D 250 to step 296.

Returning to step 244, in step 244 the test server sends a SLA link achievability method (SLAM) determination execute command to the wireless extender commanding the wireless extender to perform SLAM on the first link. Operation proceeds from step 244 to step 252. In step 252 the wireless extender receives the SLAM execute command. Operation proceeds from step 252 to step 254. In step 254 the wireless extender performs a SLAM determination for the first link, e.g., the wireless extender performs the method of FIG. 3. Step 254 includes step 256, in which the wireless extender determines one of: i) the physical link does not support the speed tier or ii) the physical link does support the speed tier. Operation proceeds from step 254 to step 258. In step 258 the wireless extender sends the SLAM determination for the first link to the test server. Operation proceeds from step 258 to step 260. In step 260 the test server: i) receives the SLAM determination for the first link and ii) sends the SLAM determination for the first link to the mobile handset. Operation proceeds from step 260 to step 262. In step 262 the mobile handset: i) receives the SLAM determination for the first link and ii) displays the SLAM determination for the first link to the user of the mobile handset. Operation proceeds from step 262, via connecting node B 264 to step 266.

In step 266 if the determination is that the physical link does support the speed tier, then operation proceeds from step 266 to step 268; otherwise operation proceeds from step 266 to step 290. In step 268, the test server determines if there is traffic on the network. Operation proceeds from step 268 to step 270. In step 270, if the determination of step 268 is that there is traffic on the network, then operation proceeds from step 268 to step 280; otherwise, operation proceeds from step 270 to step 272.

In step 272, the system is operated to change the operating channel for the first link. Step 272 includes steps 274, 275, 276, 277 and 278. In step 274 the test server sends a channel change command to the wireless extender to change the operating channel for the first link. Operation proceeds from step 274 to step 275. In step 275 the wireless extender: i) receives said channel change command; ii) performs a channel scan; iii) selects a more desirable channel to operate on; and iv) changes to the selected channel. Operation proceeds from step 275 to step 276. In step 276 the test server: i) receives said channel change information; ii) stores said channel change information, and, in some embodiments, sends said channel change information to the mobile handset. Operation proceeds from step 277 to step 278. In step 278 the mobile handset displays the status of the channel change to the user of the mobile handset. Operation proceeds from step 272, via connecting node C288, to step 222, in which the mobile handset sends a run speed test command signal to the test server to run a speed test on the first link, the first link now using a different operating channel.

Returning to step 280, in step 280 the system is operated to remover high throughput traffic contributors from the network. Step 280 includes steps 282, 284 and 286. In step 282 the test server sends a command to the wireless extender to remove high throughput contributors from the network. Operation proceeds from step 282 to step 284. In step 284 the wireless extender receives said command and, in response to the command, the wireless extender removes high throughput contributors from the network. Operation proceeds from step 284 to step 286. In step 286 the mobile handset displays the progress of the removal of the high throughput contributors to the user of the mobile handset. Operation proceeds from step 280, via connecting node C 288, to step 228 in which the mobile handset sends a run speed test command signal to the test server to request a speed test on the first link, with the traffic on the network having been reduced by the removal of the high throughput contributors.

Returning to step 290, in step 290 the test server sends a recommendation to the mobile handset to relocate the wireless extender toward the base station. Operation proceeds from step 290 to step 292. In step 292 the mobile handset receives the recommendation to relocate the wireless extender, and in response, the mobile handset presents the recommendation to the user of the mobile handset to relocate the wireless extender toward the base station. In some embodiments, the recommendation includes coordinates of a new recommended position of the wireless extender. In some embodiments, the recommendation includes a recommended distance to move to the move the wireless extender and a recommended direction to move the wireless extender. Operation proceeds from step 292, via connecting node E 294, to step 210, in which the mobile handset receive user input requesting analysis of the first link, following the repositioning of the wireless extender, by the user of the mobile handset, in accordance with the recommendation.

Returning to step 296, in step 296 the system is operated to perform an optimal power level determination method for the first link, e.g., the system is operated to perform the method of FIG. 4. Step 296 includes step 298 and step 300. In step 298 the test server is operated to control the wireless extender to set transmit power, e.g., for its transmissions over the first link, to an optimal level based on speed test results corresponding to speed tests for the first link which are performed at different wireless extender transmit power levels. Operation proceeds from step 298 to step 300. In step 300 the test server blacklists or whitelists DFS channels based on the determined optimal level and a DFS maximum transmit power level.

Operation proceeds from step 296 to step 302. In step 302 the mobile handset receives user input requesting analysis of a second link, said second link being between said base station and said wireless extender. Operation proceeds from step 302 to step 304. In step 304 the mobile handset sends a run second link analysis command signal to the test server. Operation proceeds from step 304 to step 306, in which the test server receives the run second link analysis command signal. Operation proceeds from step 306 to step 308. In step 308 the mobile handset receives user input requesting a speed test on the second link. Operation proceeds from step 308 to step 310. In step 310 the mobile handset sends a run speed test command signal to the test server to request a speed test on the second link. Operation proceeds from step 310 to step 312. In step 312 the test server receives the command signal requesting the speed test on the second link. Operation proceeds from step 312 to step 314. In step 314 the test server sends a run speed test execute command signal to the base station to initiate a speed test on the second link. Operation proceeds from step 314 to step 316. In step 316, the base station receives said run speed test execute command signal, and in step 318 the base station starts the speed test for the second link and initiates traffic, e.g., speed test traffic, downstream to the wireless extender. Operation proceeds from step 318 to step 320. In step 320 the wireless extender is operated to: receive traffic, determine speed on the second link based on received traffic, determine the speed test has concluded, determine an achieved speed fro the speed test for the second link, and report the achieved speed for the speed test for the second link to the test server. Operation proceeds from step 320 to step 322.

In step 322 the test server receives the reported achieved speed for the second link. Operation proceeds from step 322, via connecting node F 324, to step 326. In step 326 the test server sends the reported determined achieved speed for the second link to the mobile handset. Operation proceeds from step 326 to step 328. In step 328 the mobile handset is operated to: i) receive the reported determined achieved speed for the speed test for the second link and ii) display the achieved speed for the second link to the user of the mobile handset. Operation proceeds from step 328 to step 330. In step 330 the test server determines if the achieved speed for the second link is greater than or equal to the expected speed tier for the second link. Operation proceeds from step 330 to step 332.

In step 332 if the achieved speed for the second link is greater than or equal to the expected speed tier for the second link, then operation proceeds from step 332 to step 334; otherwise, operation proceeds from step 332 to step 342.

In step 334, the test server determines that the second link has been verified. Operation proceeds from step 334 to step 336. In step 336 the test server sends the mobile handset a message indicating that the second link has been verified. Operation proceeds from step 336 to step 338. In step 338 the mobile handset is operated to: i) receive the message indicating that the second link has been verified and ii) present the user of the mobile handset a notification that the second link has been verified. Operation proceeds from step 338, via connecting node J340 to step 392.

Returning to step 342, in step 342 the test server sends a SLA link achievability method (SLAM) determination execute command to the base station commanding the base station to perform SLAM on the second link. Operation proceeds from step 342 to step 344. In step 344 the base station receives the SLAM execute command. Operation proceeds from step 344 to step 346. In step 346 the base station performs a SLAM determination for the second link, e.g., the base station performs the method of FIG. 5. Step 346 includes step 348, in which the base station determines one of: i) the physical link does not support the speed tier or ii) the physical link does support the speed tier. Operation proceeds from step 346 to step 350. In step 350 the base station sends the SLAM determination for the second link to the test server. Operation proceeds from step 350 to step 352. In step 352 the test server: i) receives the SLAM determination for the second link and ii) sends the SLAM determination for the second link to the mobile handset. Operation proceeds from step 352 to step 354. In step 354 the mobile handset: i) receives the SLAM determination for the second link and ii) displays the SLAM determination for the second link to the user of the mobile handset. Operation proceeds from step 354, via connecting node B1 356 to step 358.

In step 358 if the determination is that the physical link does support the speed tier, then operation proceeds from step 358 to step 386; otherwise, operation proceeds from step 358 to step 360. In step 360, the test server determines if there is traffic on the network. Operation proceeds from step 360 to step 362. In step 362, if the determination of step 360 is that there is traffic on the network, then operation proceeds from step 362 to step 376; otherwise, operation proceeds from step 362 to step 364.

In step 364, the system is operated to change the operating channel for the second link. Step 364 includes steps 366, 368, 370, 372 and 374. In step 366 the test server sends a channel change command to the base station to change the operating channel for the second link. Operation proceeds from step 366 to step 368. In step 368 the base station: i) receives said channel change command; ii) performs a channel scan; iii) selects a more desirable channel to operate on; and iv) changes to the selected channel. Operation proceeds from step 368 to step 370. In step 370 the base station: i) receives said channel change information; ii) stores said channel change information, and sends said channel change information to the mobile handset. Operation proceeds from step 372 to step 374. In step 374 the mobile handset displays the status of the channel change to the user of the mobile handset. Operation proceeds from step 374, via connecting node H 384, to step 308, in which the mobile handset sends a run speed test command signal to the test server to run a speed test on the second link, the second link now using a different operating channel.

Returning to step 376, in step 376 the system is operated to remove high throughput traffic contributors from the network. Step 376 includes steps 378, 380 and 382. In step 378 the test server sends a command to the base station to remove high throughput contributors from the network. Operation proceeds from step 378 to step 380. In step 380 the base station receives said command and, in response to the command, the base station removes high throughput contributors from the network. Operation proceeds from step 380 to step 382. In step 382 the mobile handset displays the progress of the removal of the high throughput contributors to the user of the mobile handset. Operation proceeds from step 376, via connecting node H 384, to step 308 in which the mobile handset sends a run speed test command signal to the test server to request a speed test on the second link, with the traffic on the network having been reduced by the removal of the high throughput contributors.

Returning to step 386, in step 386 the test server sends a recommendation to the mobile handset to relocate the wireless extender toward the base station. Operation proceeds from step 386 to step 388. In step 388 the mobile handset receives the recommendation to relocate the wireless extender, and in response, the mobile handset presents the recommendation to the user of the mobile handset to relocate the wireless extender toward the base station. In some embodiments, the recommendation includes coordinates of a new recommended position of the wireless extender. In some embodiments, the recommendation includes a recommended distance to move to the move the wireless extender and a recommended direction to move the wireless extender. Operation proceeds from step 388, via connecting node G 390, to step 210, in which the mobile handset receives user input requesting analysis of the first link, following the repositioning of the wireless extender, by the user of the mobile handset, in accordance with the recommendation.

Returning to step 392, in step 392 the system is operated to perform an optimal power level determination method for the second link, e.g., the system is operated to perform the method of FIG. 6. Step 392 includes step 394 and step 396. In step 394 the test server is operated to control the base station to set transmit power, e.g., for its transmissions over the first second, to an optimal level based on speed test results corresponding to speed tests for the second link which are performed at different base station transmit power levels. Operation proceeds from step 394 to step 396. In step 396 the test server blacklists or whitelists DFS channels based on the determined optimal level for the second link and a DFS maximum transmit power level. Operation proceeds from step 392 to step 398.

In step 398 the mobile handset receives user input requesting an end to end connection analysis, said end to end connection being between said test server and said mobile handset, said end to end connection including said first and second links. Operation proceeds from step 398 to step 400. In step 400 the mobile handset sends a run end to end analysis command signal to the test server. Operation proceeds from step 400 to step 402. In step 402 the test server receives the run end to end analysis command signal. Operation proceeds from step 402 to step 404. In step 404 the mobile handset receives user input request a speed test on the end to end connection. Operation proceeds from step 404 to step 406. In step 406 the mobile handset sends a run speed test command signal to the test server commanding the test server to run an end to end speed test. Operation proceeds from step 406 to step 408, In step 408 the test server receives the end to end speed test command signal, and in step 410 the test server starts the speed test and initiates traffic, e.g., speed test traffic, downstream directed to the mobile handset. Operation proceeds from step 410 to step 412. In step 412 the mobile handset is operated to: receive traffic, determine a speed for the received traffic, determine that the speed test has concluded, determine an achieved speed to the end to end connection, report the achieved speed for the speed test for the end to end connection to the test server, and display the achieved speed for the speed test for the end to end connection to the user of the mobile handset. Operation proceeds from step 412 to step 414. In step 414 the test server receives the reported determined achieved speed for the end to end connection. Operation proceeds from step 414 to step 416.

In step 416 the test server determines if the speed test passed or failed based on the reported determined achieved speed for the end to end connection and an end to end pass/fail threshold value. Operation proceeds from step 416, via connecting node K 418, to step 420. In step 420, if the speed test for the end to end connection passed, then operation proceeds from step 420 to step 450; otherwise, operation proceeds from step 420 to step 422.

In step 422 the test server decides to run a speed test between the test server and the base station. Operation proceeds from step 422 to step 424. In step 424 the test server initiates the speed test between the test server and the base station, and the test server sends traffic, e.g., speed test traffic, to the base station. Operation proceeds from step 424 to step 426. In step 426 the base station is operated to: receive traffic, determine a speed based on received traffic, determine that the speed test has concluded, and determine an achieved speed for the speed test for the test server to base station connection. Operation proceeds from step 426, via connecting node L 428 to step 430. In step 430 the base station reports the determined achieved speed for the connection between the test server and the base station. Operation proceeds from step 420 to step 432. In step 432 the test server receives the reported achieved speed for the connection between the test server and the station. Operation proceeds from step 432 to step 434. In step 434 the test server reports the achieved speed for the connection between the test server and the base station to the mobile handset. Operation proceeds from step 434 to step 436. In step 436 the mobile handset receives the reported achieved speed for the connection between the test server and the base station and displays the achieved speed for the connection between the test server and the base station to the user of the mobile handset. Operation proceeds from step 436 to step 438. In step 438 the test server determines if the speed test for the connection between the test server and the base station passed or failed based on the reported achieved speed and a pass/fail threshold value for the connection between the test server and the base station. Operation proceeds from step 438 to step 440. In step 440 if the speed test between the test server and the base station passed, then operation proceeds from step 440 to step 446; other wise operation proceeds from step 440 to step 442, in which the test server is operated to contact internal backend systems to mitigate. Operation proceeds from step 442, via connecting node M 444, to end step 356.

Returning to step 446, in step 446 the test server is operated to re-check variables. Operation proceeds from step 446, via connecting node N 448, to step 219, in which the mobile handset receives user input requesting analysis of the first link, following completion of the variable re-check.

Returning to step 450, in step 450 the test server determines that system analysis is complete. Operation proceeds from step 450 to step 452. In step 452 the test server sends a message to the mobile handset analysis is complete. Operation proceeds from step 452 to step 454. In step 454, the mobile handset receives the message communicating that system analysis is completes, and in step 456, the mobile handset displays an indication to the user of the mobile handset that the system analysis is complete. Operation proceeds from step 456 to end step 356.

FIG. 3, comprising the combination of FIG. 3A and FIG. 3B, is a flowchart 500 of an exemplary method of operating a wireless extender to perform a SLA link achievability method (SLAM) in accordance with an exemplary embodiment. Operation starts in step 502 and proceeds to step 503. In step 503 the wireless extender retrieves, e.g., from memory within the wireless extender and/or from an external database, e.g., database 109 in cloud system 104, configuration information corresponding to the first link, e.g., operating frequency for the first link, information indicating the IEEE standard being used for the first link, bandwidth for the first link, modulation and coding scheme (MCS) for the first link, and/or number of spatial streams (SS) for the first link. In step 502 the wireless extender further retrieves SLA information corresponding to the customer premises at which the wireless extender is to be located, e.g., the bit rate, e.g. Mbps rate, the speed tier is to support. Operation proceeds from step 503 to step 504. In step 504 the wireless extender determines if the operating frequency for the first link is 2.4 GHZ or 5 GHz. If the wireless extender determines that the operating frequency for the first link is 2.4 GHZ, then operation proceeds from step 504 to step 508; however, if the wireless extender determines that the operating frequency for the first link is 5 GHz, then operation proceeds from step 504 to step 506. In step 506 the wireless extender determines if the IEEE standard being used is 802.11n or 802.11ac. If the determination that IEEE standard is 802.11n, then operation proceeds from step 506 to step 508. However, if the determination is that the IEEE standard is 802.11ac, then operation proceeds from step 506, via connecting node C 520 to step 522.

In step 508, the wireless extender determines if the bandwidth for the first link is 20 MHz or 40 MHz. If the wireless extender determines that the bandwidth for the first link is 20 MHz, then operation proceeds from step 508 to step 510; however, if the wireless extender determines that the bandwidth for the first link is 40 MHz, then operation proceeds from step 508 to step 514.

In step 510 the wireless extender determines if the speed tier for the first link is to support 30 Mbps or 400 Mbps, e.g., based on the SLA for the customer premises. If the wireless extender determines that the speed tier is to support a bit rate of 30 Mbps, then operation proceeds from step 510 to step 512; however, if the wireless extender determines that the speed tier is to support 400 Mbps, then operation proceeds from step 510, via connecting node A 534 to step 536.

In step 512, the wireless extender determines if the modulation and coding scheme (MCS) is within the set of {0-4, 8-10, 16-17, 22-24) or within the set of {5-7, 11-15, 18-21, 25-31}. If the wireless extender determines that the MCS is one of {0-4, 8-10, 16-17, 22-24}, then operation proceeds from step 512, via connecting node A 534 to step 536; however, if the wireless extender determines that the MCS is one of {5-7, 11-15, 18-21, 25-31}, then operation proceeds from step 512, via connecting node B 538 to step 540.

In step 514 the wireless extender determines if the speed tier is to support 30 Mbps or 400 Mbps, e.g., based on the SLA for the customer premises. If the wireless extender determines that the speed tier is to support a bit rate of 30 Mbps, then operation proceeds from step 514 to step 516; however, if the wireless extender determines that the speed tier is to support 400 Mbps, then operation proceeds from step 514, to step 518.

In step 516, the wireless extender determines if the modulation and coding scheme (MCS) is within the set of {0-2, 8, 16) or within the set of {3-7, 9-15, 17-23, 24-31}. If the wireless extender determines that the MCS is one of {0-2, 8, 16}, then operation proceeds from step 512, via connecting node A 534 to step 536; however, if the wireless extender determines that the MCS is one of {3-7, 9-15, 17-23, 24-31}, then operation proceeds from step 512, via connecting node B 538 to step 540.

In step 518, the wireless extender determines if the modulation and coding scheme (MCS) is within the set of {0-29) or within the set of {30-31}. If the wireless extender determines that the MCS is one of {0-29}, then operation proceeds from step 512, via connecting node A 534 to step 536; however, if the wireless extender determines that the MCS is one of {30-31}, then operation proceeds from step 518, via connecting node B 538 to step 540.

Returning to step 522, in step 522, the wireless extender determines if the bandwidth for the first link is 80 MHz or 160 MHz. If the wireless extender determines that the bandwidth for the first link is 80 MHz, then operation proceeds from step 522 to step 524; however, if the wireless extender determines that the bandwidth for the first link is 160 MHz, then operation proceeds from step 522 to step 526.

In step 524 the wireless extender determines if the speed tier is to support 30 Mbps or 400 Mbps, e.g., based on the SLA for the customer premises. If the wireless extender determines that the speed tier is to support a bit rate of 30 Mbps, then operation proceeds from step 524 to step 528; however, if the wireless extender determines that the speed tier is to support 400 Mbps, then operation proceeds from step 524 to step 530.

In step 528, the wireless extender determines if the number of spatial streams (SS) and the modulation and coding scheme (MCS) is within the set of {SS=1|MCS=0) or within the set of {SS=1|MCS=1-9, SS=2|MCS=0-9, SS=3|MCS=0-9, SS=4|MCS=0-9}. If the wireless extender determines that the SS and MCS is one of {SS=1|MCS=0}, then operation proceeds from step 528, via connecting node A 534 to step 536; however, if the wireless extender determines that the SS and MCS is one of {SS=1|MCS=1-9, SS=2|MCS=0-9, SS=3|MCS=0-9, SS=4|MCS=0-9}, then operation proceeds from step 528, via connecting node B 538 to step 540.

In step 530, the wireless extender determines if the number of spatial streams (SS) and the modulation and coding scheme (MCS) is within the set of {SS=1|MCS=0-9, SS=2|MCS=0-4, SS=3|MCS=0-3, SS=4|MCS=0-2) or within the set of {SS=2|MCS=5-9, SS=3|MCS=4-9, SS=4|MCS=3-9}. If the wireless extender determines that the SS and MCS is one of {SS=1|MCS=0-9, SS=2|MCS=0-4, SS=3|MCS=0-3, SS=4|MCS=0-2}, then operation proceeds from step 530, via connecting node A 534 to step 536; however, if the wireless extender determines that the SS and MCS is one of SS=2|MCS=5-9, SS=3|MCS=4-9, SS=4|MCS=3-9}, then operation proceeds from step 530, via connecting node B 538 to step 540.

In step 526 the wireless extender determines if the speed tier is to support 30 Mbps or 400 Mbps, e.g., based on the SLA for the customer premises. If the wireless extender determines that the speed tier is to support a bit rate of 30 Mbps, then operation proceeds from step 526, via connecting node B 538 to step 540; however, if the wireless extender determines that the speed tier is to support 400 Mbps, then operation proceeds from step 526 to step 532.

In step 532, the wireless extender determines if the number of spatial streams (SS) and the modulation and coding scheme (MCS) is within the set of {SS=1|MCS=0-4, SS=2|MCS=0-2, SS=3|MCS=0-1, SS=4|MCS=0} or within the set of {SS=1|MCS=5-9, SS=2|MCS=3-9, SS=3|MCS=2-9, SS=4|MCS=1-9}. If the wireless extender determines that the SS and MCS is one of {SS=1|MCS=0-4, SS=2|MCS=0-2, SS=3|MCS=0-1, SS=4|MCS=0}, then operation proceeds from step 532, via connecting node A 534 to step 536; however, if the wireless extender determines that the SS and MCS is one of {SS=1|MCS=5-9, SS=2|MCS=3-9, SS=3|MCS=2-9, SS=4|MCS=1-9}, then operation proceeds from step 532, via connecting node B 538 to step 540.

In step 536 the wireless extender determines that the physical link does not support the speed tier. Alternatively, in step 540, the wireless extender determines that the physical link does support the speed tier. Operation proceeds from step 536 or step 540 to return step 542, and the determination whether or not the physical link supports the speed tier is reported from the wireless extender to the test server.

FIG. 4, comprising the combination of FIG. 4A and FIG. 4B, is a flowchart 600 of an exemplary method of performing a first link optimal power level determination, in accordance with an exemplary embodiment. Operation starts in step 602 and proceeds to step 604. In step 604 the system is operated run a speed test between the wireless extender and the mobile handset and to evaluate the results. Step 604 includes steps 606, 608, 610, 611, 612 and 614. In step 606 the test server sends a run speed test execute command signal to the wireless extender to initiate a speed test on the first link. Operation proceeds from step 606 to step 608. In step 608 the wireless extender receives the run speed test execute command signal and in step 610 the wireless extender starts the speed test and initiates traffic, e.g., speed test traffic, downstream to the mobile handset. Operation proceeds from step 610 to step 611. In step 611 the mobile handset is operated to: receive traffic, determine a speed based on received traffic, determine the speed test has concluded, determine an achieved speed for the speed test for the first link, report the achieved speed fort he speed test for the first link to the test server, and display the achieved speed for the speed test for the first link to the user of the mobile handset. Operation proceeds from step 611 to step 612.

In step 612 the test server receives the reported determined achieved speed for the first link and in step 614 the test server determines if the speed test for the first link passed or failed based on the reported determined achieved speed. Operation proceeds from step 604 to step 616.

In step 616 if the speed test, performed in step 604, passed then operation proceeds from step 616 to step 617; otherwise, operation proceeds from step 616, via connecting node A 624 to step 626.

In step 617, the system is operated to reduce the transmit power of the wireless extender over first link by 2 dB. Step 617 includes steps 618, 620 and 622. In step 618 the test server sends a command to the wireless extender commanding the wireless extender to reduce its transmit power for the first link by 2 dBs. Operation proceeds from step 620 to step 622. In step 622 the wireless extender reduces its transmit power for the first link by 2 dBs. Operation proceeds from step 617 to the input of step 604, in which the system is operated to run another speed test between the wireless extender and the mobile handset, at reduced power with respect to the last speed test, and to evaluate the results.

Returning to step 626, in step 626 the test server determines that the first link transmit power margin has been assessed. Operation proceeds from step 626 to step 628. In step 628 the system is operated to increase the transmit power of the wireless extender over first link by 2 dBs. Step 628 includes step 630 and step 632. In step 630 the test server sends a command to the wireless extender, said command commanding the wireless extender to increase its transmit power for the first link (front haul) by 2 dBs. Operation proceeds from step 630 to step 632. In step 632 the wireless extender receives the command and increases transmit power for the first link (front haul) by 2 dBs in response to the received command. Operation proceeds from step 628 to step 634.

In step 634 the test server determines that current setting of transmit power of wireless extender over first link is the optimal power setting. Operation proceeds from step 634 to step 636, in which the test server determines if the current setting of the transmit power of the wireless extender for the first link is greater than the DFS maximum transmit power. Operation proceeds from step 636 to step 638. In step 638, if the transmit power of the wireless extender for the first link is greater than DFS maximum transmit power, then operation proceeds from step 638 to step 640; in which the test server blacklists DFS channels. In step 638, if the transmit power of the wireless extender for the first link is not greater than DFS maximum transmit power, then operation proceeds from step 638 to step 642; in which the test server whitelists DFS channels. Operation proceeds from step 640 or step 642 to step 644.

In step 644 the test server stores, e.g., in a database in a cloud system, the determined optimal transmit power setting for the first link and information indicating whether the DFS channels have been blacklisted or whitelisted. Operation proceeds from step 644 to step 646.

In step 646 the test server sends a message communicating the determined optimal transmit power setting for the first link and information indicating whether the DFS channels have been blacklisted or whitelisted to the mobile handset. Operation proceeds from step 646 to step 648.

In step 648 the mobile handset receives the message and presents the determined optimal transmit power for the first link and the information indicating if the DFS channels have been blacklisted or whitelisted to the user of the mobile handset. Operation proceeds from step 648 to return step 650.

FIG. 5, comprising the combination of FIG. 5A and FIG. 5B, is a flowchart 700 of an exemplary method of operating a base station to perform a SLA link achievability method (SLAM) in accordance with an exemplary embodiment. Operation starts in step 702 and proceeds to step 703. In step 703 the base station retrieves, e.g., from memory within the base station and/or from an external database, e.g., database 109 in cloud system 104, configuration information corresponding to the second link, e.g., operating frequency for the second link, information indicating the IEEE standard being used for the second link, bandwidth for the second link, modulation and coding scheme (MCS) for the second link, and/or number of spatial streams (SS) for the second link. In step 702 the base station further retrieves SLA information corresponding the customer premises at which the base station is located, e.g., bit rate, e.g., the Mbps rate, the speed tier is to support. Operation proceeds from step 703 to step 704. In step 704 the base station determines if the operating frequency for the second link is 2.4 GHZ or 5 GHz. If the base station determines that the operating frequency for the second link is 2.4 GHZ, then operation proceeds from step 704 to step 708; however, if the base station determines that the operating frequency for the second link is 5 GHz, then operation proceeds from step 704 to step 706. In step 706 the base station determines if the IEEE standard being used is 802.11n or 802.11ac. If the determination that IEEE standard is 802.11n, then operation proceeds from step 706 to step 708. However, if the determination is that the IEEE standard is 802.11ac, then operation proceeds from step 706, via connecting node C 720 to step 722.

In step 708, the base station determines if the bandwidth for the second link is 20 MHz or 40 MHz. If the base station determines that the bandwidth for the second link is 20 MHz, then operation proceeds from step 708 to step 710; however, if the base station determines that the bandwidth for the second link is 40 MHz, then operation proceeds from step 708 to step 714.

In step 710 the base station determines if the speed tier for the second link is to support 30 Mbps or 400 Mbps, e.g., based on the SLA for the customer premises. If the base station determines that the speed tier is to support a bit rate of 30 Mbps, then operation proceeds from step 710 to step 712; however, if the base station determines that the speed tier is to support 400 Mbps, then operation proceeds from step 710, via connecting node A 734 to step 736.

In step 712, the base station determines if the modulation and coding scheme (MCS) is within the set of {0-4, 8-10, 16-17, 22-24) or within the set of {5-7, 11-15, 18-21, 25-31}. If the base station determines that the MCS is one of {0-4, 8-10, 16-17, 22-24}, then operation proceeds from step 712, via connecting node A 734 to step 736; however, if the base station determines that the MCS is one of {5-7, 11-15, 18-21, 25-31}, then operation proceeds from step 712, via connecting node B 738 to step 740.

In step 714 the base station determines if the speed tier is to support 30 Mbps or 400 Mbps, e.g., based on the SLA for the customer premises. If the base station determines that the speed tier is to support a bit rate of 30 Mbps, then operation proceeds from step 714 to step 716; however, if the base station determines that the speed tier is to support 400 Mbps, then operation proceeds from step 714, to step 718.

In step 716, the base station determines if the modulation and coding scheme (MCS) is within the set of {0-2, 8, 16} or within the set of {3-7, 9-15, 17-23, 24-31}. If the base station determines that the MCS is one of {0-2, 8, 16}, then operation proceeds from step 712, via connecting node A 734 to step 736; however, if the base station determines that the MCS is one of {3-7, 9-15, 17-23, 24-31}, then operation proceeds from step 712, via connecting node B 738 to step 740.

In step 718, the base station determines if the modulation and coding scheme (MCS) is within the set of {0-29) or within the set of {30-31}. If the base station determines that the MCS is one of {0-29}, then operation proceeds from step 712, via connecting node A 734 to step 736; however, if the base station determines that the MCS is one of {30-31}, then operation proceeds from step 718, via connecting node B 738 to step 740.

Returning to step 722, in step 722, the base station determines if the bandwidth for the second link is 80 MHz or 160 MHz. If the base station determines that the bandwidth for the second link is 80 MHz, then operation proceeds from step 722 to step 724; however, if the base station determines that the bandwidth for the second link is 160 MHz, then operation proceeds from step 722 to step 726.

In step 724 the base station determines if the speed tier is to support 30 Mbps or 400 Mbps, e.g., based on the SLA for the customer premises. If the base station determines that the speed tier is to support a bit rate of 30 Mbps, then operation proceeds from step 724 to step 728; however, if the base station determines that the speed tier is to support 400 Mbps, then operation proceeds from step 724 to step 730.

In step 728, the base station determines if the number of spatial streams (SS) and the modulation and coding scheme (MCS) is within the set of {SS=1|MCS=0) or within the set of {SS=1|MCS=1-9, SS=2|MCS=0-9, SS=3|MCS=0-9, SS=4|MCS=0-9}. If the base station determines that the SS and MCS is one of {SS=1|MCS=0}, then operation proceeds from step 728, via connecting node A 734 to step 736; however, if the base station determines that the SS and MCS is one of {SS=1|MCS=1-9, SS=2|MCS=0-9, SS=3|MCS=0-9, SS=4|MCS=0-9}, then operation proceeds from step 728, via connecting node B 738 to step 740.

In step 730, the base station determines if the number of spatial streams (SS) and the modulation and coding scheme (MCS) is within the set of {SS=1|MCS=0-9, SS=2|MCS=0-4, SS=3|MCS=0-3, SS=4|MCS=0-2) or within the set of {SS=2|MCS=5-9, SS=3|MCS=4-9, SS=4|MCS=3-9}. If the base station determines that the SS and MCS is one of {SS=1|MCS=0-9, SS=2|MCS=0-4, SS=3|MCS=0-3, SS=4|MCS=0-2}, then operation proceeds from step 730, via connecting node A 734 to step 736; however, if the base station determines that the SS and MCS is one of SS=2|MCS=5-9, SS=3|MCS=4-9, SS=4|MCS=3-9}, then operation proceeds from step 730, via connecting node B 738 to step 740.

In step 726 the base station determines if the speed tier is to support 30 Mbps or 400 Mbps, e.g., based on the SLA for the customer premises. If the base station determines that the speed tier is to support a bit rate of 30 Mbps, then operation proceeds from step 726, via connecting node B 738 to step 740; however, if the base station determines that the speed tier is to support 400 Mbps, then operation proceeds from step 726 to step 732.

In step 732, the base station determines if the number of spatial streams (SS) and the modulation and coding scheme (MCS) is within the set of {SS=1|MCS=0-4, SS=2|MCS=0-2, SS=3|MCS=0-1, SS=4|MCS=0} or within the set of {SS=1|MCS=5-9, SS=2|MCS=3-9, SS=3|MCS=2-9, SS=4|MCS=1-9}. If the base station determines that the SS and MCS is one of {SS=1|MCS=0-4, SS=2|MCS=0-2, SS=3|MCS=0-1, SS=4|MCS=0}, then operation proceeds from step 732, via connecting node A 734 to step 736; however, if the base station determines that the SS and MCS is one of {SS=1|MCS=5-9, SS=2|MCS=3-9, SS=3|MCS=2-9, SS=4|MCS=1-9}, then operation proceeds from step 732, via connecting node B 738 to step 740.

In step 736 the base station determines that the physical link does not support the speed tier. Alternatively, in step 740, the base station determines that the physical link does support the speed tier. Operation proceeds from step 736 or step 740 to return step 742, and the determination whether or not the physical link supports the speed tier is reported from the base station to the test server.

FIG. 6, comprising the combination of FIG. 6A and FIG. 6B, is a flowchart 800 of an exemplary method of performing a second link optimal power level determination, in accordance with an exemplary embodiment. Operation starts in step 802 and proceeds to step 804. In step 804 the system is operated run a speed test between the base station and the wireless extender and to evaluate the results. Step 804 includes steps 806, 808, 810, 811, 812 and 814. In step 806 the test server sends a run speed test execute command signal to the base station to initiate a speed test on the second link. Operation proceeds from step 806 to step 808. In step 808 the base station receives the run speed test execute command signal and in step 810 the base station starts the speed test and initiates traffic, e.g., speed test traffic, downstream to the wireless extender. Operation proceeds from step 810 to step 811. In step 811 the wireless extender is operated to: receive traffic, determine a speed based on received traffic, determine the speed test has concluded, determine an achieved speed for the speed test for the second link, report the achieved speed for the speed test for the second link to the test server. Operation proceeds from step 811 to step 812.

In step 812 the test server receives the reported determined achieved speed for the second link and in step 814 the test server determines if the speed test for the second link passed or failed based on the reported determined achieved speed. Operation proceeds from step 804 to step 816.

In step 816 if the speed test, performed in step 804, passed then operation proceeds from step 816 to step 817; otherwise, operation proceeds from step 816, via connecting node A 824 to step 826.

In step 817, the system is operated to reduce the transmit power of the base station over second link by 2 dB. Step 817 includes steps 818, 820 and 822. In step 918 the test server sends a command to the base station commanding the base station to reduce its transmit power for the second link by 2 dBs. Operation proceeds from step 820 to step 822. In step 822 the base station reduces its transmit power for the second link by 2 dBs. Operation proceeds from step 817 to the input of step 804, in which the system is operated to run another speed test between the base station and the wireless extender, at reduced power with respect to the last speed test, and to evaluate the results.

Returning to step 826, in step 826 the test server determines that the second link transmit power margin has been assessed. Operation proceeds from step 826 to step 828. In step 828 the system is operated to increase the transmit power of the base station over second link by 2 dBs. Step 828 includes step 830 and step 832. In step 830 the test server sends a command to the base station, said command commanding the base station to increase its transmit power for the second link (back haul) by 2 dBs. Operation proceeds from step 830 to step 832. In step 832 the base station receives the command and increases transmit power for the second link (back haul) by 2 dBs in response to the received command. Operation proceeds from step 828 to step 834.

In step 834 the test server determines that current setting of transmit power of base station over second link is the optimal power setting. Operation proceeds from step 834 to step 836, in which the test server determines if the current setting of the transmit power of the base station for the second link is greater than the DFS maximum transmit power. Operation proceeds from step 836 to step 838. In step 838, if the transmit power of the base station for the second link is greater than DFS maximum transmit power, then operation proceeds from step 838 to step 840; in which the test server blacklists DFS channels. In step 838, if the transmit power of the base station for the second link is not greater than DFS maximum transmit power, then operation proceeds from step 838 to step 842; in which the test server whitelists DFS channels. Operation proceeds from step 840 or step 842 to step 844.

In step 844 the test server stores, e.g., in a database in a cloud system, the determined optimal transmit power setting for the second link and information indicating whether the DFS channels have been blacklisted or whitelisted. Operation proceeds from step 844 to step 846.

In step 846 the test server sends a message communicating the determined optimal transmit power setting for the second link and information indicating whether the DFS channels have been blacklisted or whitelisted to the mobile handset. Operation proceeds from step 846 to step 848.

In step 848 the mobile handset receives the message and presents the determined optimal transmit power for the second link and the information indicating if the DFS channels have been blacklisted or whitelisted to the user of the mobile handset. Operation proceeds from step 848 to return step 850.

FIG. 7 is a drawing of an exemplary test server 900 in accordance with an exemplary embodiment. Exemplary test server 900 is, e.g., test server 108 of cloud system 104 of communications system 100 of FIG. 1. Exemplary test server 900 includes a network interface 902, e.g., an wired or optical interface 902, a processor 904, e.g., a CPU, memory 906, an assembly of hardware components 908, e.g., an assembly of circuits, and an I/O interface 910 coupled together via a bus 909 over which the various elements (902, 904, 906, 908, 910) may interchange data and information. Test server 900 further includes a speaker 920, a display 922, e.g., a touchscreen display, switches 924, a keypad 926, and a mouse 928, coupled to I/O interface 910. Network interface 902 includes a receiver 910 and a transmitter 912, which couple the network interface to other network nodes and/or the Internet. In some embodiments, the receiver 910 and transmitter 912 are included as part of a transceiver 908. Memory 906 includes an assembly of components 914, e.g., an assembly of software components, data/information 916 and a wireless, e.g., WiFi, test application (APP) 918. In some embodiments, the wireless test app 918 is includes as part of assembly of components 914.

FIG. 8 is a drawing of an exemplary wireless extender 1000, e.g., a WiFi extender, in accordance with an exemplary embodiment. Exemplary wireless extender 1000 is, e.g., wireless extender 114 of communications system 100 of FIG. 1. Exemplary wireless extender 1000 includes a network interface 1002, e.g., an wired or optical interface, wireless interface 1004, a processor 1006, e.g., a CPU, an assembly of hardware components 1008, e.g., an assembly of circuits, and an I/O interface 1010, and memory 1012 coupled together via a bus 1009 over which the various elements (1002, 1004, 1006, 1008, 1010, 1012) may interchange data and information. Wireless extender 1000 further includes a speaker 1054, a display 1056, e.g., a touchscreen display, switches 1058, a keypad 1060, and a mouse 1062, coupled to I/O interface 1010.

Network interface 1002 includes a receiver 1022 and a transmitter 1024, which couple the network interface 1002 to other network nodes and/or the Internet. In some embodiments, the receiver 1022 and transmitter 1024 are included as part of a transceiver 1020. Wireless interfaces 1004 includes a 1st wireless interface 1026, e.g., a front haul WiFi interface, and a second wireless interface 1028, e.g. a backhaul wireless interface. 1st wireless interface 1026 includes a wireless receiver 1032 coupled to one or more receive antennas (receive antenna 1 1032, . . . , receive antenna M1 1034) via which the wireless extender 1000 may receive wireless signals from a mobile handset, e.g., mobile handset 116, and other user devices, e.g., other mobile devices, e.g., other mobile devices which may not include testing capability. 1st wireless interface 1026 includes a wireless transmitter 1036 coupled to one or more transmit antennas (transmit antenna 1 1038, . . . , receive antenna N1 1040) via which the wireless extender 1000 may transmit wireless signals to a mobile handset, e.g., mobile handset 116, and other user devices, e.g., other mobile devices, e.g., other mobile devices which may not include testing capability. In some embodiments, the wireless receiver 1030 and the wireless transmitter 1036 are included as part of a transceiver 1026.

2nd wireless interface 1028 includes a wireless receiver 1042 coupled to one or more receive antennas (receive antenna 1 1044, . . . , receive antenna M2 1034) via which the wireless extender 1000 may receive wireless signals from a base station, e.g., base station 112. 2nd wireless interface 1028 includes a wireless transmitter 1048 coupled to one or more transmit antennas (transmit antenna 1 1050, . . . , receive antenna N2 1052) via which the wireless extender 1000 may transmit wireless signals to a base station, e.g., base station 112. In some embodiments, the wireless receiver 1042 and the wireless transmitter 1048 are included as part of a transceiver 1028.

In some embodiments, the same antenna or antennas may be, and sometimes are, used by receiver 1030 and transmitter 1036. In some embodiments, the same antenna or antennas may be, and sometimes are, used by receiver 1042 and transmitter 1048. In some embodiments, antenna used by 1st wireless interface 1026 may be, and sometimes is, used by second wireless interface 1028.

Memory 1012 includes an assembly of components 1014, e.g., an assembly of software components, data/information 1016 and a wireless, e.g., WiFi, test application (APP) 1018. In some embodiments, the wireless test app 1018 is includes as part of assembly of components 1014.

FIG. 9 is a drawing of an exemplary base station 1100, e.g., a WiFi base station, in accordance with an exemplary embodiment. Exemplary base station 1100 is, e.g., base station 112 of communications system 100 of FIG. 1. Exemplary base station 1100 includes a network interface 1105, e.g., an wired or optical interface, wireless interface 1104, a processor 1106, e.g., a CPU, an assembly of hardware components 1108, e.g., an assembly of circuits, and an I/O interface 1110, and memory 1112 coupled together via a bus 1109 over which the various elements (1105, 1104, 1106, 1108, 1110, 1112) may interchange data and information. Base station 1100 further includes a speaker 1152, a display 11154, e.g., a touchscreen display, switches 1156, a keypad and/or keyboard 1158, and a mouse 1159, coupled to I/O interface 1110.

Network interface 1105 includes a receiver 1178 and a transmitter 1180, which couple the network interface 1105 to other network nodes and/or the Internet. In some embodiments, the receiver 1178 and transmitter 1180 are included as part of a transceiver 1184. Wireless interface 1104 includes a wireless receiver 1138 coupled to one or more receive antennas (receive antenna 1 1039, . . . , receive antenna M 1141) via which the base station 1100 may receive wireless signals from wireless extenders, e.g., wireless extender 114, and/or user equipment devices. Wireless interface 1104 further includes a wireless transmitter 1140 coupled to one or more transmit antennas (transmit antenna 1 1143, . . . , receive antenna N 1145) via which the base station 1100 may transmit wireless signals to wireless extenders, e.g., wireless extender 114, and/or user equipment devices. In some embodiments, the wireless receiver 1138 and the wireless transmitter 1140 are included as part of a transceiver 1124. In some embodiments, the same antenna or antennas may be, and sometimes are, used by receiver 1138 and transmitter 1140.

Memory 1112 includes an assembly of components 1114, e.g., an assembly of software components, data/information 1116 and a wireless, e.g., WiFi, test application (APP) 1118. In some embodiments, the wireless test app 1118 is includes as part of assembly of components 1114.

FIG. 9 is a drawing of an exemplary base station 1100, e.g., a WiFi base station, in accordance with an exemplary embodiment. Exemplary base station 1100 is, e.g., base station 112 of communications system 100 of FIG. 1. Exemplary base station 1100 includes a network interface 1105, e.g., an wired or optical interface, wireless interface 1104, a processor 1106, e.g., a CPU, an assembly of hardware components 1108, e.g., an assembly of circuits, and an I/O interface 1110, and memory 1112 coupled together via a bus 1109 over which the various elements (1105, 1104, 1106, 1108, 1110, 1112) may interchange data and information. Base station 1100 further includes a speaker 1152, a display 11154, e.g., a touchscreen display, switches 1156, a keypad and/or keyboard 1158, and a mouse 1159, coupled to I/O interface 1110.

Network interface 1105 includes a receiver 1178 and a transmitter 1180, which couple the network interface 1105 to other network nodes and/or the Internet. In some embodiments, the receiver 1178 and transmitter 1180 are included as part of a transceiver 1184. Wireless interface 1104 includes a wireless receiver 1138 coupled to one or more receive antennas (receive antenna 1 1039, . . . , receive antenna M 1141) via which the base station 1100 may receive wireless signals from wireless extenders, e.g., wireless extender 114, and/or user equipment devices. Wireless interface 1104 further includes a wireless transmitter 1140 coupled to one or more transmit antennas (transmit antenna 1 1143, . . . , receive antenna N 1145) via which the base station 1100 may transmit wireless signals to wireless extenders, e.g., wireless extender 114, and/or user equipment devices. In some embodiments, the wireless receiver 1138 and the wireless transmitter 1140 are included as part of a transceiver 1124. In some embodiments, the same antenna or antennas may be, and sometimes are, used by receiver 1138 and transmitter 1140.

Memory 1112 includes an assembly of components 1114, e.g., an assembly of software components, data/information 1116 and a wireless, e.g., WiFi, test application (APP) 1118. In some embodiments, the wireless test app 1118 is includes as part of assembly of components 1114.

FIG. 10 is a drawing of an exemplary mobile handset 1200, e.g., a mobile wireless test tool, e.g., a mobile WiFi test tool or a mobile device, e.g., a smart phone, wireless tablet or wireless notepad, with a wireless, e.g., WiFi, test application (APP), in accordance with an exemplary embodiment. Exemplary mobile handset 1200 is, e.g., mobile handset 116 of communications system 100 of FIG. 1. Exemplary mobile handset 1200 includes a network interface 1205, e.g., an wired or optical interface, wireless interfaces 1204, a processor 1206, e.g., a CPU, an assembly of hardware components 1208, e.g., an assembly of circuits, and an I/O interface 1210, and memory 1212 coupled together via a bus 1209 over which the various elements (1205, 1204, 1206, 1208, 1210, 1212) may interchange data and information. Mobile handset 1200 further includes a microphone 1250, a camera 1251, a speaker 1252, a display 1254, e.g., a touchscreen display, switches 1256, a keypad 1258, and a mouse 1259, coupled to I/O interface 1210.

Network interface 1205 includes a receiver 1278 and a transmitter 1280, which couple the network interface 1205 to other network nodes and/or the Internet. In some embodiments, the receiver 1278 and transmitter 1280 are included as part of a transceiver 1284. Wireless interfaces 1204 includes a WiFi interface 1224 and a cellular 1225. WiFi interface 1224 includes a wireless receiver 1238 coupled to one or more receive antennas (receive antenna 1 1239, . . . , receive antenna M1 1241) via which the mobile handset 1200 may receive WiFi wireless signals from a wireless extender or a WiFi base station. WiFi interface 1224 further includes a wireless transmitter 1240 coupled to one or more transmit antennas (transmit antenna 1 1243, . . . , transmit antenna N1 1245) via which the mobile handset 1200 may transmit wireless WiFi signals to a wireless extender or WiFi base station. In some embodiments, the wireless receiver 1238 and the wireless transmitter 1240 are included as part of a transceiver.

Cellular interface 1225 includes a wireless cellular receiver 1268 coupled to one or more receive antennas (receive antenna 1 1269, . . . , receive antenna M1 1271) via which the mobile handset 1200 may receive cellular wireless signals from a cellular base station. Cellular interface 1225 further includes a cellular wireless transmitter 1270 coupled to one or more transmit antennas (transmit antenna 1 1273, . . . , transmit antenna N1 1275) via which the mobile handset 1200 may transmit wireless cellular signals to a cellular base station. In some embodiments, the wireless receiver 1268 and the wireless transmitter 1270 are included as part of a transceiver.

In some embodiments, the same antenna or antennas may be, and sometimes are, used by receiver 1238 and transmitter 1240. In some embodiments, the same antenna or antennas may be, and sometimes are, used by receiver 1268 and transmitter 1270. In some embodiments, an antenna used by WiFi wireless interface 1224 may be, and sometimes is, used by the cellular wireless interface 1225.

Memory 1012 includes an assembly of components 1014, e.g., an assembly of software components, data/information 1016 and a wireless, e.g., WiFi, test application (APP) 1018. In some embodiments, the wireless test app 1018 is includes as part of assembly of components 1014.

FIG. 11 is a drawing of an exemplary graphical user interface (GUI) 1300 included in a mobile handset, in accordance with an exemplary embodiment. GUI 1300 is, e.g., displayed on touch screen display 1254 of mobile handset 1200. GUI 1300 displays control buttons and information to the user, e.g., test technician, of mobile handset 1200 and receives input from the user. Exemplary GUI 1300 includes a start system analysis button 1302, a first link (front haul) analysis region 1304, a second link (back haul) analysis region 1306, an end-to-end connection analysis region 1308, and a notification area or window 1310. First link analysis region 1304 includes a wireless extender to mobile handset (first link) test initiate button 1312, a speed test (first link) test button 1314, a SLAM (first link) test button 1316 and a re-run analysis (first link) test button 1318. Second link analysis region 1306 includes a base station to wireless extender (second link) test initiate button 1320, a speed test (second link) test button 1322, a SLAM (second link) test button 1324 and a re-run analysis (second link) test button 1326. End to end connection analysis region 1308 includes an end-to-end connection (test server to mobile handset) test initiate button 1328, a speed test (end-to-end connection) test button 1330, and a re-run analysis (end-to-end connection) test button 1332. Notification region or window 1310 is used to display notifications to the user of mobile handset 1300, e.g. a link or connection has been verified, a link or connection has failed verification, and/or recommendations to the user of mobile handset 1300, e.g., move the wireless extender to a new closer, e.g., closer to the base station, restart a particular test, etc.

In some embodiments, test results and/or test process information are reported in the region (1304, 1306, 1308) of the GUI 1300 corresponding to the link or connection (first link, second link, or end-to end connection) being tested. In other embodiments, the test results and/or test process information are reported in notification area 1310 along with information identifying the particular link or connection undergoing test.

FIG. 12, comprising the combination of FIG. 12A, FIG. 12B, FIG. 12C, FIG. 12D and FIG. 12E, is a drawing of an assembly of components 1400, comprising Part A 1401, Part B 1403, Part C 1405, Part D 1407 and Part E 1409, in accordance with an exemplary embodiment. Exemplary assembly of components 1400, may be, and sometimes is, included in a test server, e.g., test server 108 or test server of FIG. 1 or test server 900 of FIG. 7, in accordance with an exemplary embodiment. Assembly of components 1400 can be, and in some embodiments is, used in test server 108 and/or test server 900. The components in the assembly of components 1400 can, and in some embodiments are, implemented fully in hardware within the processor 904, e.g., as individual circuits. The components in the assembly of components 1400 can, and in some embodiments are, implemented fully in hardware within the assembly of hardware components 908, e.g., as individual circuits corresponding to the different components. In other embodiments some of the components are implemented, e.g., as circuits, within the processor 904 with other components being implemented, e.g., as circuits within assembly of components 908, external to and coupled to the processor 904. As should be appreciated the level of integration of components on the processor and/or with some components being external to the processor may be one of design choice. Alternatively, rather than being implemented as circuits, all or some of the components may be implemented in software and stored in the memory 906 of the test server 900, with the components controlling operation of test server 900 to implement the functions corresponding to the components when the components are executed by a processor, e.g., processor 904. In some such embodiments, the assembly of components 1400 is included in the memory 906 as assembly of components 914. In still other embodiments, various components in assembly of components 1400 are implemented as a combination of hardware and software, e.g., with another circuit external to the processor providing input to the processor 904 which then under software control operates to perform a portion of a component's function. While processor 904 is shown in the FIG. 9 embodiment as a single processor, e.g., computer, it should be appreciated that the processor 904 may be implemented as one or more processors, e.g., computers.

When implemented in software the components include code, which when executed by the processor 904, configure the processor 904 to implement the function corresponding to the component. In embodiments where the assembly of components 1400 is stored in the memory 906, the memory 906 is a computer program product comprising a computer readable medium comprising code, e.g., individual code for each component, for causing at least one computer, e.g., processor 904, to implement the functions to which the components correspond.

Completely hardware based or completely software based components may be used. However, it should be appreciated that any combination of software and hardware, e.g., circuit implemented components, may be used to implement the functions. As should be appreciated, the components illustrated in FIG. 12 control and/or configure the test server 900 or elements therein such as the processor 904, to perform the functions of corresponding steps illustrated and/or described in the method of one or more of the flowcharts, signaling diagrams and/or described with respect to any of the Figures. Thus the assembly of components 1400 includes various components that perform functions of corresponding one or more described and/or illustrated steps of an exemplary method, e.g., steps of the method of flowchart 200 of FIG. 2, steps of the method of flowchart 500 of FIG. 3, steps of the flowchart 600 of FIG. 4, steps of the method of flowchart 700 of FIG. 5, steps of the flowchart 800 of FIG. 6, and/or described or shown with respect to any of the other figures, e.g., steps which are performed by a test server.

Assembly of components 1400 includes a component 1402 configured to operate the test server to receive a system analysis initiate signal and to perform configuration operation in response to the received signal, a component 1404 configured to operate the test server to receive a run first link analysis command signal send from the mobile handset, a component 1406 configured to operate the test server to receive a run speed test command signal from the mobile handset, e.g., requesting a speed test on the first link, a component 1408 configured to operate the test server to send a run speed test command signal to a wireless extender to initiate a speed test on the first link, a component 1410 configured to operate the test server to receive a reported determined achieved speed for the first link, a component 1412 configured to operate the test server to determine if the achieved speed for the first link is greater than or equal to the expected speed tier for the first link, a component 1414 configured to control operation as a function of the determination if the achieved speed for the first link is greater than or equal to the expected speed tier for the first link, a component 1416 configured to operate the test server to determine that the first link has been verified, a component 1418 configured to operate the test server to send a SLA link achievability method (SLAM) determination execute command to the wireless extender commanding the wireless extender to perform SLAM on the first link, a component 1420 configured to operate the test server to send the mobile handset a message indicating that the first link has been verified, a component 1422 configured to operate the test server to: i) receive the SLAM determination for the first link and ii) send the SLAM determination for the first link to the mobile handset, a component 1424 configured to control operation as a function of the determination if the physical link, e.g., first link, supports the speed tier. a component 1426 configured to operate the test serve to determine if there is traffic on the network, e.g., over the first link, a component 1428 configured to control operation as a function of the determination if there is traffic on the network, e.g., on the first link, and a component 1430 configured to operate the test server to send a recommendation to mobile handset to relocate the wireless extender toward the base station. Assembly of components 1400 further includes a component 1431 configured to operate the test server to send a channel change command to the wireless extender to change the operating channel for the first link, a component 1432 configured to operate the test server to: i) receive said channel change information, ii) store said channel change information, and, in some embodiments, iii) send said channel change information to the mobile handset, a component 1434 configured to operate the test server to send a command to the wireless extender to remove high throughput contributors from the network.

Assembly of components 1436 further includes a component 1436 configured to operate the test server to perform steps of an optimal power level determination method for the first link, e.g. perform steps of the method of FIG. 4. Component 1436 includes a component 1438 configured to operate the test server to control the wireless extender to set transmit power, e.g., for first link transmission, to an optimal level based on speed test results at different wireless extender transmit power levels, and a component 1440 configured to operate the test server to blacklist or whitelist DFS channels based on a determined optimal level and a DFS maximum transmit power level.

Assembly of components 1400 further includes a component 1442 configured to operate the test server to receive a run second link analysis command signal, a component 1444 configured to operate the test server to receive a run speed test command signal from the mobile handset requesting a speed test on the second link, a component 1446 configured to operate the test server to send a run speed test execute command signal to a base station to initiate a speed test on the second link, a component 1448 configured to operate the test server to receive a reported determined achieved speed for the second link, a component 1450 configured to operate the test server to send the reported determined achieved speed for the second link to the mobile handset, a component 1452 configured to operate the test server to determine if the achieved speed for the second link is greater than or equal to the expected speed for the second link, a component 1453 configured to control operation as a function of the determination if the achieved speed for the second link is greater than or equal to the expected speed tier for the second link, a component 1454 configured to operate the test server to determine that the second link has been verified, a component 1455 configured to operate the test server to send a SLA link achievability method (SLAM) determination execute command to the base station commanding the base station to perform SLAM on the second link, a component 1456 configured to operate the test server to dens the mobile handset a message indicating that the second link has been verified, a component 1457 configured to operate the test server to: i) receive the SLAM determination for the second link and ii) send the SLAM determination for the second link to the mobile handset, a component 1458 configured to control operation as function of the determination whether the physical link (second link) supports the speed tier, a component 1459 configured to operate the test server to determine if there is traffic on the network, e.g., over the second link, a component 1460 configured to control operation as a function of the determination if there is traffic on the network, e.g., over the second link, a component 1461 configured to operate the test server to send a channel change command to the base station to change the operating channel for the second link, a component 1462 configured to operate the test server to: i) receive said channel change information, ii) store said channel change information and iii) send said channel change information to the mobile handset, a component 1463 configured to operate the test server to send a recommendation to the mobile handset to relocate the wireless extender toward the base station, a component 1464 configured to operate the test server to send a command to the base station to remove high throughput contributors from the network.

Assembly of components 1400 further includes a component 1465 configured to operate the test server to perform steps of an optimal power level determination method for second link, e.g., perform steps of the method of FIG. 6. Component 1465 includes a component 1466 configured to operate the test serve to control the base station to set transmit power, e.g. for the second link, to an optimal level based on speed test results at different base station transmit power levels and a component 1467 configured to operate the test server to blacklist or whitelist DFS channels based on the determined optimal level and a DFS maximum transmit power level.

Assembly of components 1400 further includes a component 1468 configured to operate the test server to receive a run end-to-end analysis command signal, a component 1469 configured to operate the test server to receive an end-to-end speed test command signal, a component 1470 configured to operate the test server to start the end-to end speed test and initiate traffic, e.g., speed test traffic, downstream directed to the mobile handset, a component 1471 configured to operate the test server to receive the reported determined achieved speed for the end to end connection, a component 1472 configured to operate the test server to determine if the speed test passed or failed based on the reported determined achieved speed or the end-to-end connection and an end-to-end pass/fail threshold, and a component 1473 configured to control operation as a function of the determine of the end-to-end speed test passed or failed.

Assembly of component 1400 further includes a component 1474 configured to operate the test server to decide to run a speed test between the test server and the base station, e.g. in response to a determination that the end-to-end speed test failed, a component 1475 configured to operate the test server to initiate the speed test between the test server and the base station and to send traffic, e.g., speed test traffic to the base station, a component 1476 configured to operate the test serer to received a reported achieved speed for the speed test for the connection between the test server and the base station, a component 1477 configured to operate the test server to report the achieved speed for the connection between the test server and the base station to the mobile handset, a component 1478 configured to operate the test server to determine if the speed test for the connection between the test server and the base station passed or failed based on the reported achieved speed and a pass/fail threshold value for the connection between the test server and the base station, a component 1479 configured to control operation as a function of the determination if the speed test for the connection between the base test server and the base station passed or failed, a component 1480 configured to operate the test server to contact internal backend systems to mitigate, and a component 1481 configured to operate the test server to re-check values.

FIG. 13 is a drawing of an assembly of components 1500 in accordance with an exemplary embodiment. Exemplary assembly of components 1500, may be, and sometimes is, included in a wireless extender, e.g., a WiFi extender, in accordance with an exemplary embodiment. Assembly of components 1500 can be, and in some embodiments is, used in wireless extender 114, e.g., a WiFi extender, of FIG. 1 and/or wireless extender 1000, e.g., a WiFi extender, of FIG. 8. The components in the assembly of components 1500 can, and in some embodiments are, implemented fully in hardware within the processor 1006, e.g., as individual circuits. The components in the assembly of components 1500 can, and in some embodiments are, implemented fully in hardware within the assembly of hardware components 1008, e.g., as individual circuits corresponding to the different components. In other embodiments some of the components are implemented, e.g., as circuits, within the processor 1006 with other components being implemented, e.g., as circuits within assembly of components 1008, external to and coupled to the processor 1006. As should be appreciated the level of integration of components on the processor and/or with some components being external to the processor may be one of design choice. Alternatively, rather than being implemented as circuits, all or some of the components may be implemented in software and stored in the memory 1012 of the wireless extender 1000, with the components controlling operation of wireless extender 1000 to implement the functions corresponding to the components when the components are executed by a processor, e.g., processor 1006. In some such embodiments, the assembly of components 1500 is included in the memory 1012 as assembly of components 1014. In still other embodiments, various components in assembly of components 1500 are implemented as a combination of hardware and software, e.g., with another circuit external to the processor providing input to the processor 1006 which then under software control operates to perform a portion of a component's function. While processor 1006 is shown in the FIG. 8 embodiment as a single processor, e.g., computer, it should be appreciated that the processor 1006 may be implemented as one or more processors, e.g., computers.

When implemented in software the components include code, which when executed by the processor 1006, configure the processor 1006 to implement the function corresponding to the component. In embodiments where the assembly of components 1500 is stored in the memory 1012, the memory 1012 is a computer program product comprising a computer readable medium comprising code, e.g., individual code for each component, for causing at least one computer, e.g., processor 1006, to implement the functions to which the components correspond.

Completely hardware based or completely software based components may be used. However, it should be appreciated that any combination of software and hardware, e.g., circuit implemented components, may be used to implement the functions. As should be appreciated, the components illustrated in FIG. 13 control and/or configure the wireless extender 1000 or elements therein such as the processor 1006, to perform the functions of corresponding steps illustrated and/or described in the method of one or more of the flowcharts, signaling diagrams and/or described with respect to any of the Figures. Thus the assembly of components 1500 includes various components that perform functions of corresponding one or more described and/or illustrated steps of an exemplary method, e.g., steps of the method of flowchart 200 of FIG. 2, steps of the method of flowchart 500 of FIG. 3, steps of the flowchart 600 of FIG. 4, steps of the method of flowchart 700 of FIG. 5, steps of the flowchart 800 of FIG. 6, and/or described or shown with respect to any of the other figures, e.g., steps which are performed by a wireless extender.

Assembly of components 1500 includes a component 1502 configured to operate the wireless extender to receive a run speed test execute command signal, a component 1504 configured to operate the wireless extender to start the speed test and initiate traffic, e.g., speed test traffic, downstream to the mobile handset, a component 1506 configured to operate the wireless extender to receive the SLAM execute command, and a component 1508 configured to operate the wireless extender to perform a SLAM determination for the first link, e.g., to perform the method of FIG. 3. Component 1508 includes a component 1510 configured to operate the wireless extender to determine one of: i) the physical link does not support the speed tier or ii) the physical link does support the speed tier.

Assembly of components 1500 further includes a component 1512 configured operate the wireless extender to send the SLAM determination for the first link to the test server, a component 1514 configured to operate the wireless extender to i) receive a channel change command, ii) perform a channel scan, iii) select a more desirable channel to operate on, and iv) change to the selected channel, a component 1516 configured to operate the wireless extender to send channel change information to the test server, a component 1518 configured to operate the wireless extender to receive a command to remove high throughput traffic contributors from the network, e.g., with regard to the first link, and to remove high throughput contributors from the network, e.g., with regard to the first link.

Assembly of components 1500 further includes a component 1520 configured to operate the wireless extender to perform steps of an optimal power level determination method for the first link, e.g., perform steps of the method of FIG. 4 which are performed by the wireless extender, and a component 1522 configured to operate the wireless extender to perform steps of an optimal power level determination method for the second link, e.g., perform steps of the method of FIG. 6 which are performed by the wireless extender. Assembly of components 1500 further includes a component 1946 configured to operate the wireless extender to transmit to the mobile handset using the first link transmit power level.

FIG. 14 is a drawing of an assembly of components 1600 in accordance with an exemplary embodiment. Exemplary assembly of components 1600, may be, and sometimes is, included in a base station, e.g., a WiFi base station, in accordance with an exemplary embodiment. Assembly of components 1600 can be, and in some embodiments is, used in base station 112, e.g., a WiFi base station, of FIG. 1 and/or base station 1200, e.g., a WiFi base station, of FIG. 9. The components in the assembly of components 1600 can, and in some embodiments are, implemented fully in hardware within the processor 1106, e.g., as individual circuits. The components in the assembly of components 1600 can, and in some embodiments are, implemented fully in hardware within the assembly of hardware components 1108, e.g., as individual circuits corresponding to the different components. In other embodiments some of the components are implemented, e.g., as circuits, within the processor 1106 with other components being implemented, e.g., as circuits within assembly of components 1108, external to and coupled to the processor 1106. As should be appreciated the level of integration of components on the processor and/or with some components being external to the processor may be one of design choice. Alternatively, rather than being implemented as circuits, all or some of the components may be implemented in software and stored in the memory 1112 of the base station 1100, with the components controlling operation of base station 1100 to implement the functions corresponding to the components when the components are executed by a processor, e.g., processor 1106. In some such embodiments, the assembly of components 1600 is included in the memory 1112 as assembly of components 1114. In still other embodiments, various components in assembly of components 1600 are implemented as a combination of hardware and software, e.g., with another circuit external to the processor providing input to the processor 1106 which then under software control operates to perform a portion of a component's function. While processor 1106 is shown in the FIG. 9 embodiment as a single processor, e.g., computer, it should be appreciated that the processor 1106 may be implemented as one or more processors, e.g., computers.

When implemented in software the components include code, which when executed by the processor 1106, configure the processor 1106 to implement the function corresponding to the component. In embodiments where the assembly of components 1600 is stored in the memory 1112, the memory 1112 is a computer program product comprising a computer readable medium comprising code, e.g., individual code for each component, for causing at least one computer, e.g., processor 1106, to implement the functions to which the components correspond.

Completely hardware based or completely software based components may be used. However, it should be appreciated that any combination of software and hardware, e.g., circuit implemented components, may be used to implement the functions. As should be appreciated, the components illustrated in FIG. 14 control and/or configure the base station 1100 or elements therein such as the processor 1106, to perform the functions of corresponding steps illustrated and/or described in the method of one or more of the flowcharts, signaling diagrams and/or described with respect to any of the Figures. Thus the assembly of components 1600 includes various components that perform functions of corresponding one or more described and/or illustrated steps of an exemplary method, e.g., steps of the method of flowchart 200 of FIG. 2, steps of the method of flowchart 500 of FIG. 3, steps of the flowchart 600 of FIG. 4, steps of the method of flowchart 700 of FIG. 5, steps of the flowchart 800 of FIG. 6, and/or described or shown with respect to any of the other figures, e.g., steps which are performed by a base station.

Assembly of components 1600 includes a component 1602 configured to operate the base station to receive a run speed test execute command signal, a component 1604 configured to operate the base station to start the speed test and initiate traffic, e.g., speed test traffic, downstream to the wireless extender, a component 1606 configured to operate the base station to receive the SLAM execute command, and a component 1608 configured to operate the base station to perform a SLAM determination for the second link, e.g., to perform the method of FIG. 5. Component 1608 includes a component 1610 configured to operate the base station to determine one of: i) the physical link does not support the speed tier or ii) the physical link does support the speed tier. Assembly of components 1600 further includes a component 1612 configured operate the base station to send the SLAM determination for the second link to the test server, a component 1614 configured to operate the base station to i) receive a channel change command for the second link, ii) perform a channel scan, iii) select a more desirable channel to operate on, and iv) change to the selected channel, a component 1616 configured to operate the base station to send channel change information to the test server, a component 1618 configured to operate the base station to receive a command to remove high throughput traffic contributors from the network, e.g., with regard to the second link, and to remove high throughput contributors from the network, e.g., with regard to the second link, in response to the received command.

Assembly of components 1600 further includes a component 1620 configured to operate the base station to perform steps of an optimal power level determination method for the first link, e.g., perform steps of the method of FIG. 4 which are performed by the base station, and a component 1622 configured to operate the base station to perform steps of an optimal power level determination method for the second link, e.g., perform steps of the method of FIG. 6 which are performed by the base station, a component 1624 configured to operate the base station to: receive traffic, determine the speed between the test server and the base station has concluded, determine an achieved speed for the speed test for the test server to base station connection, and a component 1624 configured to operate the base station to report the determined achieved speed for the connection between the test server and the base station to the test server. Assembly of component 1600 further includes a component 1990 configured to operate the base station to transmit to the wireless extender using the second link transmit power level.

FIG. 15, comprising the combination of FIG. 15A, FIG. 15B and FIG. 15C, is a drawing of an assembly of components 1700, comprising Part A 1701, Part B 1703 and Part C 1705, in accordance with an exemplary embodiment. Exemplary assembly of components 1700, may be, and sometimes is, included in a mobile handset, in accordance with an exemplary embodiment. Assembly of components 1700 can be, and in some embodiments is, used in mobile handset 116 of FIG. 1 and/or mobile handset 1200 of FIG. 10. The components in the assembly of components 1600 can, and in some embodiments are, implemented fully in hardware within the processor 1206, e.g., as individual circuits. The components in the assembly of components 1600 can, and in some embodiments are, implemented fully in hardware within the assembly of hardware components 1208, e.g., as individual circuits corresponding to the different components. In other embodiments some of the components are implemented, e.g., as circuits, within the processor 1206 with other components being implemented, e.g., as circuits within assembly of components 1208, external to and coupled to the processor 1206. As should be appreciated the level of integration of components on the processor and/or with some components being external to the processor may be one of design choice. Alternatively, rather than being implemented as circuits, all or some of the components may be implemented in software and stored in the memory 1212 of the mobile handset 1200, with the components controlling operation of mobile handset 1200 to implement the functions corresponding to the components when the components are executed by a processor, e.g., processor 1206. In some such embodiments, the assembly of components 1600 is included in the memory 1212 as assembly of components 1214. In still other embodiments, various components in assembly of components 1600 are implemented as a combination of hardware and software, e.g., with another circuit external to the processor providing input to the processor 1206 which then under software control operates to perform a portion of a component's function. While processor 1206 is shown in the FIG. 10 embodiment as a single processor, e.g., computer, it should be appreciated that the processor 1206 may be implemented as one or more processors, e.g., computers.

When implemented in software the components include code, which when executed by the processor 1206, configure the processor 1206 to implement the function corresponding to the component. In embodiments where the assembly of components 1600 is stored in the memory 1212, the memory 1212 is a computer program product comprising a computer readable medium comprising code, e.g., individual code for each component, for causing at least one computer, e.g., processor 1206, to implement the functions to which the components correspond.

Completely hardware based or completely software based components may be used. However, it should be appreciated that any combination of software and hardware, e.g., circuit implemented components, may be used to implement the functions. As should be appreciated, the components illustrated in FIG. 14 control and/or configure the mobile handset 1200 or elements therein such as the processor 1206, to perform the functions of corresponding steps illustrated and/or described in the method of one or more of the flowcharts, signaling diagrams and/or described with respect to any of the Figures. Thus the assembly of components 1600 includes various components that perform functions of corresponding one or more described and/or illustrated steps of an exemplary method, e.g., steps of the method of flowchart 200 of FIG. 2, steps of the method of flowchart 500 of FIG. 3, steps of the flowchart 600 of FIG. 4, steps of the method of flowchart 700 of FIG. 5, steps of the flowchart 800 of FIG. 6, and/or described or shown with respect to any of the other figures, e.g., steps which are performed by a mobile handset.

Assembly of components 1700 includes a component 1702 configured to operate a mobile handset to receive user input to initiate a system analysis method, a component 1706 configured to operate the mobile handset to send a system analysis test initiate signal to a test server, a component 1706 configured to operate a mobile handset to receive user input requesting analysis of a first link, said first link being between a wireless extender and the mobile handset, a component 1708 configured to operate the mobile handset to send a run first link analysis command signal to the test server, a component 1710 configured to operate the mobile handset to receive user input requesting a speed test on the first link, a component 1712 configured to operate the mobile handset to send a run speed test command signal to the test server to request a speed test on the first link. Assembly of components 1700 further includes a component 1714 configured to operate the mobile handset to: receive traffic, perform speed test measurements based on the received traffic, determine the speed test has concluded, determine an achieved speed for the speed test for the first link, report the achieved speed for the speed test for the first link to the test server, and display the achieved speed for the speed test for the first link to the user of the mobile handset, a component 1716 configured to operate the mobile handset to: i) receive a message indicating that the first link has been verified and ii) present the user of the mobile handset a notification that the first link has been verified, a component 1718 configured to operate the mobile handset to: receive a SLAM determination for the first link and ii) display the SLAM determination for the first link to the user of the mobile handset, a component 1720 configured to operate the mobile handset to: i) receive a recommendation to relocate the wireless extender, e.g., toward the base station, and ii) present the recommendation to relocate the wireless extender, e.g., toward the base station, to the user of the mobile handset.

Assembly of components 1700 further includes a component 1722 configured to operate the mobile handset to display the status of the channel change to the user of the mobile handset, a component 1724 configured to operate the mobile handset to display the progress of the removal of high throughput contributors, e.g., with regard to the first link, to the user of the mobile handset, and a component 1726 configured to operate the mobile handset to perform steps of an optimal power level determination method for the first link, e.g., perform the steps of the method of FIG. 4, which are performed by the mobile handset.

Assembly of components 1700 further includes a component 1728 configured to operate the mobile handset to receive user input requesting analysis of a second link, said second link being between a base station a wireless extender, a component 1730 configured to operate the mobile handset to send a run second link analysis command signal to the test server, a component 1732 configured to operate the mobile handset to receive user input requesting a speed test on the second link, a component 1734 configured to operate the mobile handset to send a run speed test command signal to the test server to request a speed test on the second link. Assembly of components 1700 further includes a component 1736 configured to operate the mobile handset to: i) receive the determined achieved speed for the second link, and ii) display the achieved speed for the speed test for the second link to the user of the mobile handset, a component 1738 configured to operate the mobile handset to: i) receive a message indicating that the second link has been verified and ii) present the user of the mobile handset a notification that the second link has been verified, a component 1740 configured to operate the mobile handset to: receive a SLAM determination for the second link and ii) display the SLAM determination for the second link to the user of the mobile handset, a component 1742 configured to operate the mobile handset to: i) receive a recommendation to relocate the wireless extender, e.g., toward the base station, and ii) present the recommendation to relocate the wireless extender, e.g., toward the base station, to the user of the mobile handset.

Assembly of components 1700 further includes a component 1744 configured to operate the mobile handset to receive channel change information corresponding to the second link and display the status of the channel change to the user of the mobile handset, a component 1746 configured to operate the mobile handset to display the progress of the removal of high throughput contributors, e.g., with regard to the second link, to the user of the mobile handset, and a component 1748 configured to operate the mobile handset to perform steps of an optimal power level determination method for the second link, e.g., perform the steps of the method of FIG. 6, which are performed by the mobile handset.

Assembly of components 1700 further includes a component 1750 configured to operate the mobile handset to receive user input requesting an end to end connection analysis, said end to end connection analysis being between said test server and said mobile handset, said end to end connection including said first and second links, a component 1752 configured to operate the mobile handset to send a run end to end connection analysis command signal to the test server, a component 1754 configured to operate the mobile handset to receive user input requesting a speed test on the end to end connection, a component 1756 configured to operate the mobile handset to send a run speed test command signal to the test server commanding the test server to run and end to end speed test. Assembly of components 1700 further includes a component 1758 configured to operate the mobile handset to: i) receive traffic as part of the end to end speed test, determine a speed based on the received traffic, determine that the speed test for the end to end connection has concluded, determine and achieved speed for the speed test for the end to end connection, report the determined achieved speed for the speed test for the end to end connection to the test server, and display the achieved speed for the speed test for the end to end connection to the user of the mobile handset.

Assembly of components 1700 further includes a component 1760 configured to operate the mobile handset to receive a message communicating system analysis is complete, a component 1762 configured to operate the mobile handset to display an indication to the use r of the mobile handset that the system analysis is complete, and a component 1764 configured to operate the mobile handset to receive the reported achieved speed for the speed test for the connection between the test server and the base station and to display the achieved speed for the connection between the test server and the base station to the user of the mobile handset.

FIG. 16, comprising the combination of FIG. 16A, FIG. 16B and FIG. 16C, is a flowchart 1800 of an exemplary method of implementing a communications system in accordance with an exemplary embodiment. Operation of the exemplary method starts in step 1802 in which the communications system is powered on and initialized. Operation proceeds from step 1802 to step 1804.

In step 1804 a test server, e.g., test server 108, sends a command to a wireless extender, e.g., wireless extender 114, at a first customer premises, e.g. customer premises 102, to perform a speed test on a first link between said wireless extender and a mobile handset, e.g., mobile handset 116, said speed test determining an achieved data rate, e.g. speed, for the first link. Operation proceeds from step 1804 to step 1806.

In step 1806 the test server determines if the achieved rate for the first link determined by the speed test on the first link between the wireless extender and the mobile handset supports a minimum expected communications data rate, e.g., speed in bits per second, for a first speed tier, said first speed tier being a wireless communications speed level to be supported by the first link. For example, in step 1806 the test server determines if the achieved speed for the first link is greater than or equal to the expected minimum data rate for the first speed tier. Step 1806 includes steps 1810 and 1812, one of which is performed during an iteration of step 1806. In step 1810 the test server determines that the first link does not support the minimum expected rate for the first speed tier. In step 1812 the test server determines that the first link does support the minimum expected rate for the first speed tier. Operation proceeds from step 1806 to step 1814.

In step 1814 the test server takes action with respect to the first link based on whether or not the first link supports the minimum expected communications data rate for the first speed tier. Step 1814 includes steps 1816, 1818, 1820 and 1828. In step 1818, if the determination is that the first link does not support the minimum expected rate for the first speed tier, then operation proceeds from step 1816 to step 1818. In step 1818, if the determination is that the first link does support the minimum expected rate for the first speed tier, then operation proceeds from step 1816 to step 1820.

In step 1818 the test server takes remedial action. Step 1818 includes steps 1822, 1824 and 1826. One or more or all of steps 1822, 1824 and 1826 are performed during an iteration of step 1818. In step 1822 the test server sends a command to the wireless extender to remove traffic from the first link. In step 1824, the test server signals the wireless extender to change the channel used for the first link. For example, the channel used for the first link is changed by changing frequencies, bandwidth, modulation and coding scheme, number of spatial streams, transmission times, tone hopping patterns and/or codes used to implement the channel being used for the first link. In step 1826 the test server sends a message to the mobile handset to cause the mobile handset to display a message in a display to the user of the mobile handset to move the wireless extender closer to the base station. Operation proceeds from step 1818 to step 1828. In step 1828 the test server initiates retesting of the first link to check that the first link supports the minimum expected data rate.

Returning to step 1820, in step 1820 the test server determines a first link transmit power level, e.g., an extender to mobile handset transmit power level, to be used on the first link. Step 1820 includes steps 1830 and 1832. In step 1830 the test server determines a transmit power level at which the first link fails to satisfy the minimum expected communications data rate for the first speed tier. Operation proceeds from step 1830 to step 1832. in step 1832 the test server set the first link transmit power level to a power level above the power level at which the first link fails to satisfy the minimum first tier speed level, e.g., to a power level a predetermined amount, e.g., 2 dBs above the determined highest transmit power level at which the first link first fails to satisfy the first minimum expected communications rate thus resulting in the transmit power being set slightly above the power level where the first data rate will be satisfied but near the data rate at which the first data rate will fail to be satisfied. Operation proceeds from step 1820, via connecting node A 1834 to step 1836.

In step 1836 the test server identifies dynamic frequency selection (DFS) channels which have a maximum permitted transmit power below the first link transmit power level. Operation proceeds from step 1836 to step 1838. In step 1838 DFS channels having a maximum permitted transmit power level below the first link transmit power level are added, e.g., by the test server, to a first DFS channel blacklist stored in memory, said first DFS channel blacklist listing DFS channels which are not to be used by the first link. Operation proceeds from step 1838 to step 1840.

In step 1840 the test server identifies dynamic frequency selection (DFS) channels which have a maximum permitted transmit power equal to or above the first link transmit power level. Operation proceeds from step 1840 to step 1842. In step 1842 DFS channels having a maximum permitted transmit power level equal to or above the first link transmit power level are added, e.g., by the test server, to a first DFS channel whitelist stored in memory, said first DFS channel whitelist listing DFS channels which are available for use by the first link. Operation proceeds from step 1842 to step 1844.

In step 1844 the test server communicates the determined first link transmit power level and one or both of the first link DFS channel blacklist and first link DFS channel whitelist to the wireless extender for use in configuring the first link.

Operation proceeds from step 1844 to step 1846. In step 1846 the wireless extender transmits to the mobile handset using the first link transmit power level. Operation proceeds from step 1846, via connecting node B 1848, to step 1850.

In step 1850 the test server sends a command to a base station, e.g., base station 112, at a first customer premises, e.g. customer premises 102, to perform a speed test on a second link between said base station said wireless extender, said speed test determining an achieved data rate, e.g., speed for the second link. Operation proceeds from step 1850 to step 1852.

In step 1852 the test server determines if the achieved rate for the second link determined by the speed test on the second link between the base station and the wireless extender supports a minimum expected communications data rate for said first speed tier. Step 1852 includes steps 1854 and 1856, one of which is performed during an iteration of step 1852. In step 1854 the test server determines that the second link does not support the minimum expected rate for the first speed tier. In step 1858 the test server determines that the second link does support the minimum expected rate for the first speed tier. Operation proceeds from step 1852 to step 1858.

In step 1858 the test server takes action with respect to the second link based on whether or not the second link supports the minimum expected communications data rate for the first speed tier. Step 1858 includes steps 1860, 1862, 1872 and 1864. In step 1860, if the determination is that the second link does not support the minimum expected rate for the first speed tier, then operation proceeds from step 1860 to step 1862. In step 1860, if the determination is that the second link does support the minimum expected rate for the first speed tier, then operation proceeds from step 1860 to step 1864.

In step 1862 the test server takes remedial action with respect to the second link. Step 1862 includes steps 1866, 1868 and 1870. One or more or all of steps 1866, 1868 and 1870 are performed during an iteration of step 1862. In step 1866 the test server sends a command to the base station to remove traffic from the second link. In step 1868, the test server signals the base station to change the channel used for the second link. In step 1870 the test server sends a message to the mobile handset to cause the mobile handset to display a message in a display to the user of the mobile handset to move the wireless extender closer to the base station. Operation proceeds from step 1866 or 1868 to step 1872. In step 1872 the test server initiates retesting of the second link in an attempt to verify that the second link supports the minimum expected communications data rate. Operation proceeds from step 1870 to step 1873, in which retesting of both the first and second link are performed to determine if they support the minimum expected communications data rate after the wireless extender has been moved.

Returning to step 1864, in step 1864 the test server determines a second link transmit power level, e.g., a base station to extender transmit power level, to be used on the second link. Step 1864 includes steps 1874 and 1876. In step 1874 the test server determines a transmit power level at which the second link fails to satisfy the minimum expected communications data rate for the first speed tier. Operation proceeds from step 1874 to step 1876. in step 1876 the test server sets the second link transmit power level to a power level above the power level at which the second link fails to satisfy the minimum expected communications data rate for the first tier speed level, e.g., the test server sets the power level to a power level a predetermined amount, e.g. 2 dBs, above the determined transmit power at which the second link fails to satisfy the first minimum expected communications rate thus resulting in the transmit power level being set slightly above where the first tier data rate will be satisfied but near the rate at which the first tier data rate will fail to be satisfied. Operation proceeds from step 1864, via connecting node C 1878 to step 1880.

In step 1880 the test server identifies dynamic frequency selection (DFS) channels which have a maximum permitted transmit power below the second link transmit power level. Operation proceeds from step 1880 to step 1882. In step 1882 DFS channels having a maximum permitted transmit power level below the second link transmit power level are added, e.g., by the test server, to a second DFS channel blacklist stored in memory, said second DFS channel blacklist listing DFS channels which are not to be used by the second link. Operation proceeds from step 1882 to step 1884.

In step 1884 the test server identifies dynamic frequency selection (DFS) channels which have a maximum permitted transmit power equal to or above the second link transmit power level. Operation proceeds from step 1884 to step 1886. In step 1886 DFS channels having a maximum permitted transmit power level equal to or above the second link transmit power level are added, e.g., by the test server, to a second DFS channel whitelist stored in memory, said second DFS channel whitelist listing DFS channels which are available for use by the second link. Operation proceeds from step 1886 to step 1888.

In step 1888 the test server communicates the determined second link transmit power level and one or both of the second link DFS channel blacklist and second link DFS channel whitelist to the base station for use in configuring the second link. Operation proceeds from step 1888 to step 1890. In step 1890 the base station transmits to the wireless extender using the second link transmit power level.

FIG. 17, comprising the combination of FIG. 17A, FIG. 17B, FIG. 17C and FIG. 17D, is a drawing of an assembly of components 1900, comprising the combination of Part A 1901, Part B 1903, Part C 1905 and Part D 1907, which may be included in a test server, in accordance with an exemplary embodiment. Exemplary assembly of components 1900, may be, and sometimes is, included in a test server, e.g., test server 108 or test server of FIG. 1 or test server 900 of FIG. 7, in accordance with an exemplary embodiment. Assembly of components 1900 can be, and in some embodiments is, used in test server 108 and/or test server 900. The components in the assembly of components 1900 can, and in some embodiments are, implemented fully in hardware within the processor 904, e.g., as individual circuits. The components in the assembly of components 1900 can, and in some embodiments are, implemented fully in hardware within the assembly of hardware components 908, e.g., as individual circuits corresponding to the different components. In other embodiments some of the components are implemented, e.g., as circuits, within the processor 904 with other components being implemented, e.g., as circuits within assembly of components 908, external to and coupled to the processor 904. As should be appreciated the level of integration of components on the processor and/or with some components being external to the processor may be one of design choice. Alternatively, rather than being implemented as circuits, all or some of the components may be implemented in software and stored in the memory 906 of the test server 900, with the components controlling operation of test server 900 to implement the functions corresponding to the components when the components are executed by a processor, e.g., processor 904. In some such embodiments, the assembly of components 1900 is included in the memory 906 as assembly of components 914. In still other embodiments, various components in assembly of components 1400 are implemented as a combination of hardware and software, e.g., with another circuit external to the processor providing input to the processor 904 which then under software control operates to perform a portion of a component's function. While processor 904 is shown in the FIG. 9 embodiment as a single processor, e.g., computer, it should be appreciated that the processor 904 may be implemented as one or more processors, e.g., computers.

When implemented in software the components include code, which when executed by the processor 904, configure the processor 904 to implement the function corresponding to the component. In embodiments where the assembly of components 1900 is stored in the memory 906, the memory 906 is a computer program product comprising a computer readable medium comprising code, e.g., individual code for each component, for causing at least one computer, e.g., processor 904, to implement the functions to which the components correspond.

Completely hardware based or completely software based components may be used. However, it should be appreciated that any combination of software and hardware, e.g., circuit implemented components, may be used to implement the functions. As should be appreciated, the components illustrated in FIG. 17 control and/or configure the test server 900 or elements therein such as the processor 904, to perform the functions of corresponding steps illustrated and/or described in the method of one or more of the flowcharts, signaling diagrams and/or described with respect to any of the Figures. Thus the assembly of components 1900 includes various components that perform functions of corresponding one or more described and/or illustrated steps of an exemplary method, e.g., steps of the method of flowchart 1800 of FIG. 17, steps of the method of flowchart 200 of FIG. 2, steps of the method of flowchart 500 of FIG. 3, steps of the flowchart 600 of FIG. 4, steps of the method of flowchart 700 of FIG. 5, steps of the flowchart 800 of FIG. 6, and/or described or shown with respect to any of the other figures, e.g., steps which are performed by a test server. In some embodiments a test server, e.g., test server 108 or test server of FIG. 1 and/or test server 900 of FIG. 7 includes assembly of components 1900 of FIG. 17 and assembly of components 1400 of FIG. 12.

Assembly of components 1900 includes a component 1904 configured to operate a test server to send a command to a wireless extender at a first customer premises to perform a speed test on a first link between the wireless extender and a mobile handset, said speed test determining an achieved data rate for the first link, and a component 1906 configured to operate the test server to determine if the achieved rate for the first link determined by the speed test on the first link between the wireless extender and the mobile handset supports a minimum expected communications data rate for a first speed tier, said first speed tier being a wireless communications speed level to be supported by the first link. Component 1906 includes a component 1910 configured to determine that the first link does not support the minimum expected rate for the first speed tier, and a component 1912 configured to determine that the first link does support the minimum expected rate for the first speed tier.

Assembly of components 1900 further includes a component 1914 configured to take action with respect to the first link based on whether or not the first link supports the minimum expected communications data rate for the first speed tier. Component 1914 includes a component 1916 configured to control operation as a function of the determination whether or not the first link supports the minimum expected rate for the first speed tier, a component 1918 configured to operate the test server to take remedial action, e.g., in response to a determination that the first link does not support the minimum expected rate for the first speed tier, an a component 1920 configured to determine a first link transmit power level to be used on the first link, e.g. in response to a determination that the first link does support the minimum expected rate for the first speed tier. Component 1918 includes a component 1922 configured to send a command to the wireless extender to remove traffic from the first link, a component 1924 configured to signal the wireless extender to change the channel used for the first link, and a component 1926 configured to send a message to the mobile handset to cause the mobile handset to display a message or indication in a display to the user of the mobile handset to move the wireless extender closer to the base station. Assembly of components 1900 further includes a component 1928 configured to operate the test server to initiate the retesting of the first link to check that the first link supports the minimum expected communications data rate, e.g., following the taking of remedial action, e.g., by one or more of components 1922, 1924 and/or 1926.

Component 1920 includes a component 1930 configured to determine a transmit power level at which the first link fails to satisfy the minimum expected communications data rate for the first speed tier and a component 1932 configured to set the first link transmit power level to a power level above the power level at which the first link fails to satisfy the minimum expected speed tier level, e.g., 2 dBs above.

Assembly of components 1900 further includes a component 1936 configured to identify dynamic frequency selection (DFS) channels which have maximum permitted transmit power below the first link transmit power level, a component 1938 configured to add DFS channels having a maximum permitted transmit power level below the first link transmit power level to a first DFS channel blacklist stored in memory, said first DFS channel blacklist listing DFS channels which are not to be used by said first link, a component 1940 configured to identify dynamic frequency selection (DFS) channels which have maximum permitted transmit power equal to or above the first link transmit power level, and a component 1942 configured to add DFS channels having a maximum permitted transmit power level equal to or above the first link transmit power level to a first DFS channel whitelist stored in memory, said first DFS channel whitelist listing DFS channels which are available for use by said first link. Assembly of components 1900 further includes a component 1944 configured to operate the test server to communicate the determined first link transmit power and one or both of the first link DFS channel blacklist and the first DFS channel whitelist to the wireless extender for use in configuring the wireless extender.

Assembly of components 1900 further includes a component 1950 configured to operate the test server to send a command to a base station at a first customer premises to perform a speed test on a second link between the base station and the wireless extender, said speed test determining an achieved data rate for the second link, and a component 1952 configured to operate the test server to determine if the achieved rate for the second link determined by the speed test on the second link between the base station and the wireless extender supports the minimum expected communications data rate for a first speed tier. Component 1952 includes a component 1954 configured to determine that the second link does not support the minimum expected rate for the first speed tier, and a component 1956 configured to determine that the second link does support the minimum expected rate for the first speed tier.

Assembly of components 1900 further includes a component 1958 configured to take action with respect to the second link based on whether or not the second link supports the minimum expected communications data rate for the first speed tier. Component 1958 includes a component 1960 configured to control operation as a function of the determination whether or not the second link supports the minimum expected rate for the first speed tier, a component 1962 configured to operate the test server to take remedial action, e.g., in response to a determination that the second link does not support the minimum expected rate for the first speed tier, an a component 1964 configured to determine a second link transmit power level to be used on the second link, e.g. in response to a determination that the second link does support the minimum expected rate for the first speed tier. Component 1962 includes a component 1966 configured to send a command to the wireless extender to remove traffic from the second link, a component 1968 configured to signal the wireless extender to change the channel used for the second link, and a component 1970 configured to send a message to the mobile handset to cause the mobile handset to display a message or indication in a display to the user of the mobile handset to move the wireless extender closer to the base station. Assembly of components 1900 further includes a component 1972 configured to operate the test server to initiate the retesting of the second to check that the second link supports the minimum expected communications data rate, e.g., following the taking of remedial action, e.g., where the remedial action is one or both of: sending a command to the base station remove traffic from the second link or signaling the base station to change the channel used for the second link, and a component 1973 configured to retest both the first and second links, e.g., sequentially, to determine if they support the minimum expected data rate for the first speed tier, after the wireless extender has been moved, e.g., moved closer to the base station in response to the remedial action of component 1970.

Component 1964 includes a component 1974 configured to determine a transmit power level at which the second link fails to satisfy the minimum expected communications data rate for the first speed tier and a component 1976 configured to set the second link transmit power level to a power level above the power level at which the second link fails to satisfy the minimum expected speed tier level, e.g., 2 dBs above.

Assembly of components 1900 further includes a component 1980 configured to identify dynamic frequency selection (DFS) channels which have maximum permitted transmit power below the second link transmit power level, a component 1982 configured to add DFS channels having a maximum permitted transmit power level below the second link transmit power level to a second DFS channel blacklist stored in memory, said second DFS channel blacklist listing DFS channels which are not to be used by said second link, a component 1984 configured to identify dynamic frequency selection (DFS) channels which have maximum permitted transmit power equal to or above the second link transmit power level, and a component 1986 configured to add DFS channels having a maximum permitted transmit power level equal to or above the second link transmit power level to a second DFS channel whitelist stored in memory, said second DFS channel whitelist listing DFS channels which are available for use by said second link. Assembly of components 1900 further includes a component 1988 configured to operate the test server to communicate the determined second link transmit power and one or both of the second link DFS channel blacklist and the second DFS channel whitelist to the base station for use in configuring the base station.

Various aspects and/or features of some embodiments of the present invention are discussed below. The RSSI level, typically used for making a wireless extender placement determination, is calculated from a beacon, transmitted by the base station, which is transmitted at full power/low MCS. However, it may be desirable for data may be transmitted from the base station to the wireless extender at a higher MCS. In order to use the highest modulation rate possible, the PA will typically need to back off its power level from the full power level. This is why RSSI, based on a beacon signal at full power/low MCS, is not enough to know range, if different MCS levels are the be used for data transmission.

Typically different wireless transmission devices, e.g., different wireless WiFi extenders or different WiFi base stations, have different maximum rates and/or have different fall off characteristics.

The rate vs range performance will vary depending upon the following: vender/model/chipset; RSSI level; RF interference level (SINR) for WiFi extender; RF interference level (SINR) for WiF base station; physical path loss, e.g., physical path loss due to walls, furniture, etc.; and physical distance between the WiFi extender and the WiFi base station. There is no "distance" vs. speed that works in a real house.

Various embodiments, in accordance with the present invention, are directed to extender placement, e.g., WiFi extender placement, at a customer premises, e.g., a home site or a business site, including a base station, e.g. a WiFi base station. In some embodiments of the present invention, the following steps are automated: 1) independent link analysis leveraging agents, e.g., test apps, at the wireless extender, at the base station, and at a test server, e.g., a test server in a cloud system; 2) use of power control to find the margin of each radio link, e.g., front haul radio link between the wireless extender and a mobile handset, and a back haul radio link between the wireless base station and the wireless extender, and blacklisting/whitelisting DFS channels; and 3) provide service level agreement (SLA) for speed tier link analysis. In some embodiments of the present invention the methods and/or apparatus, in accordance with the present invention, are used to find the sweet spot, e.g., ideal location, to locate a wireless extender, e.g., a WiFi extender, at the customer premises, said sweet spot being close enough for high enough throughput, e.g., to satisfy SLA, and far enough to cover the whole, or a large portion of the, home and to isolate two or more access points and their clients, e.g., access points corresponding to adjacent homes in the neighborhood.

In various embodiments, in accordance with a feature of some embodiments of the present invention, transmission power is adjusted at the wireless extender, e.g., WiFi extender, and/or at the base station, e.g., WiFi base station, based on determined margins which were during installation testing, e.g., automated installation testing.

In some embodiments, power control can be, and sometimes is, used to lower the transmission power levels while maintaining high throughput region for the wireless extender, e.g., WiFi extender, and/or base station, e.g., WiFi base station.

In accordance with a feature of some embodiments of the present invention, the system analysis used to determine wireless extender placement and determine configuration information, e.g., configuration information of the wireless extender and base station, uses software link-analysis agents, e.g., test apps, on a wireless extender, e.g. WiFi extender, a base station, e.g., WiFi base station, a test server, e.g., a test server in a cloud system, and/or a mobile handset, e.g. a wireless, e.g., WiFi, test tool or a user equipment device, e.g., a mobile user customer device with WiFi. In various embodiments, the software link analysis agents, e.g., test apps, support one or more or all of: RSSI measurements, rate testing over wireless links, SLA evaluation for links, traffic reduction on a link, channel changing for a link, power margin measurements for a link, transmission power level setting, whitelisting/blacklisting of DFS channels in view of a determined transmission power level for a link, reporting and displaying of results and/or recommendations, e.g., a recommendation to relocate a wireless extender, and processing of user input, e.g., test operator input to start an automated test.

In some embodiments, a technician, located at an edge of the home, presses a button, e.g., on a GUI interface of a mobile handset, which is a WiFi test tool, to start automated ecosystem analysis. This phase of testing checks to see if the WiFi extender coverage is adequate to the edge of home-independent of backhaul (WiFi base station to WiFi extender) performance, e.g., this phase of automated testing measures the link (front haul link (WiFi extender to mobile handset)) from the wireless extender to a possible client location and determines if the desired rate, e.g., in accordance with the SLA, has been achieved during the rate testing. If problems are detected, e.g., the desired data rate corresponding to the rate tier in the SLA for the customer premises, is not achieved, a remediation action is performed including: i) changing channels for the link, ii) reducing traffic on the link, or iii) notifying the operator of the wireless handset to move the location of the wireless extender, e.g., closer to the base station. Following the remediation action, the wireless link between the wireless extender and the base station is retested, and if the speed test passes, then the power margin is assessed, e.g., via a sequence of power backoffs and rate tests until failure occurs, the transmission power level for the wireless extender is set to a determined minimal acceptable level for the link, and DFS channels are whitelisted and/or blacklisted based on the determined transmission power setting for the link.

Then, the automated system processed to check if the location of the wireless extender supports adequate backhaul for the link between the WiFi base station and the wireless extender. In this phase of the testing the link between the WiFi base station and the WiFi extender is tested independent of the internet speed. This phase of automated testing measures the link (back haul link (WiFi base station to WiFi extender)) and determines if the desired rate has been achieved during the rate testing. If problems are detected, e.g., the desired data rate is not achieved, a remediation action is performed including: i) changing channels for the link, ii) reducing traffic on the link, or iii) notifying the operator of the wireless handset to move the location of the wireless extender, e.g., closer to the base station. Following the remediation action, retested is performed.

If the remediation calls for relocation of the wireless extender, then the front haul link testing is repeated, followed by back haul link re-testing. However, if the remediation calls for changing channels or reducing traffic on the link between the base station and wireless extender, then following the remediation, the link between the wireless base station and the wireless extender is retested to see if it satisfies the speed requirements. If the speed test passes, then the power margin for the link between the base station and wireless extender is assessed, e.g., via a sequence of power backoffs and rate tests until failure occurs, the transmission power level for the base station is set to a determined minimal acceptable level for the link, and DFS channels are whitelisted and/or blacklisted based on the determined transmission power setting for the link between the base station and wireless extender.

Once the testing determines that the front haul link (wireless extender to mobile handset) and back haul link (wireless base station to wireless extender) are acceptable in terms of data rate and have been configured for transmission power levels, e.g. optimal transmission power levels, then an end-to end performance test, e.g., an end-to-end rate test, over an end-to end connection path, is performed from the test server to the mobile handset, to verify that operation is acceptable, said end to end connection path including: i) a link between the test server and the base station, which traverses the Internet and, in some embodiments, a cable modem/PON, ii) the wireless link between the base station and the wireless extender, and iii) the wireless link between the wireless extender and the mobile handset.

Current systems lack the ability to isolate each link between the elements in the network. Various embodiments implemented in accordance with one or more features of the present invention allow a technician to detect flaws in the system with a higher accuracy than known techniques.

In a residential/SMB deployment, there are three (3) independent links: i) a WiFi extender to edge-of network (EON) device link, sometime referred to as front haul link; ii) a WiFi extender back to Wi-Fi base station—wired or wireless link, sometimes referred to as a backhaul link; and iii) a WiFi base station to internet—cable/optical, wireline link. In some embodiments, in accordance with the present invention, the methods and apparatus can, and sometimes do detect, with regard to the Wi-Fi to internet connection, one or more of: provisioned speeds are improperly configured, issues with infrastructure, and issues with backend network capability. In some embodiments, in accordance with the present invention, the methods and apparatus can, and sometimes do detect, with regard to the Wi-Fi base station to WiFi router connection, one or more of: issues with in-band interference, issues with backhaul signal strength, and issues with channel conditions. In some embodiments, in accordance with the present invention, the methods and apparatus can, and sometimes do detect, with regard to the Wi-Fi extender to EON device, one or more of: issues with in-band interference, issues with overall coverage, and issues with channel conditions.

Current art troubleshooting techniques only evaluate two channel characteristics, throughput and signal strength. In accordance with some embodiments of the present invention, additional analytics can be, and sometimes are, gathered by the WiFi base station and WiFi extender that can help identify problematic channel conditions. Various features of the current invention are directed to physical layer analysis, e.g., performing a SLAM determination to determine whether or not a physical link supports a speed tier.

RSSI can be, and sometimes is, evaluated to determine what is the power measurement of an RF signal. RSSI measurements can be, and sometimes are, used to detect: i) that link endpoints are too far from each other, and ii) destructive interference. Problems with RSSI may result in: i) lower data rates, ii) lower MCS rates, and/or iii) lower SS.

Frequency can be, and sometimes is, evaluated to determine what frequency is being used for a link, e.g., 2.4 GHz or 5 GHz. Different frequencies of operation have different characteristics. Frequency measurements and/or signal measurement at different frequencies, e.g., different frequencies of interest, can be, and sometimes are, used to detect: Ii) in-band destructive interference, ii) in-band congestion; and/or iii) device limitations. Various frequency related effects include: i) 2.4 GHz has lower rate but increased signal penetration; ii) 5 GHz has higher theoretical data rate but decreased signal penetration; iii) 2.4 GHZ will operate using 802.11n; and iv) 5 GHZ will operate using either 802.11n or 902.211ac.

The standard in use can be, and sometimes is, evaluated, e.g., whether the IEEE standard is 802.22n or 802.22ac. Different standards may correspond to different operating frequencies, and there may be, and sometimes are, device limitations with regard to which standards are supported. 802.11n has a lower data rate than 902.11ac.

The modulation and coding scheme (MCS) information can be, and sometimes is, evaluated, e.g., determine what is the primary MCS rate. Problems with MCS can cause RSSI issues and/or destructive interference. Lower MCS rates have lower data rates.

Spatial Stream information can be, and sometimes is, evaluated, e.g., determine what is the primary number of SS. Problems with SS can cause RSSI issues and/or destructive interference. Lower number of SS have lower data rates.

Bandwidth can be, and sometimes is, evaluated, e.g., evaluate to determine what is the primary bandwidth. Problems with bandwidth can cause co-channel destructive interference. Reduced bandwidth related to lower rates.

In various embodiments, the following parameters: frequency, standard, MCS, spatial stream, and bandwidth, corresponding to a device, e.g., a WiFi extender or a WiFi base station and/or a physical link, e.g., a physical link between the WiFi extender and an EON device or between a WiFi base station and a WiFi extender, are evaluated to determine if the physical link supports the bit rate of the speed tier based on the SLA corresponding to the customer premises.

In some embodiments implemented in accordance with the present invention, DFS channels are whitelisted and/or blacklisted. If the exemplary method, in accordance with the present invention, determines that the power needed to support DFS channels is available, the DFS channels will be whitelisted and available for use. If the exemplary method, in accordance with the present invention, determines that the power needed to support DFS channels is not available, the DFS channels will be blacklisted and not available for use. This technique of avoids stranding clients due to power level reduction in DFS channels.

Methods and apparatus, in accordance with some embodiments of the present invention, allow a service provider, who manages WiFi base stations and/or WiFi extenders, to reduce the amount of truck rolls to a customer premises, thereby reducing overall costs.

Methods and apparatus, in accordance with some embodiments of the present invention, provide the technician and/or customer with a better understanding of extender placement. Methods and apparatus, in accordance with some embodiments of the present invention, may and sometimes do one or more of the following: i) reduce the number of extenders needed at a customer premises, ii) provide an understanding of speed balance between the links, iii) provide an understanding of power range for maximum throughput, iv) provide SLA and margin for the placement; v) enable DFS channels when coverage allows; vi) provide one step independent link analysis; and vii) facilitate robustness of each link for each speed tier.

Dynamic Frequency Selection (DFS) is a spectrum-sharing mechanism that allows wireless LANs (WLANs) to coexist with radar systems. It automatically selects a frequency that does not interfere with certain radar systems while operating in the 5 GHz band. DFS is a feature of ETSI BRAN HIPERLAN/2 and IEEE Standard 802.11h.

Numbered List of Exemplary Method Embodiments:

Method Embodiment 1 A method of implementing a communications system, the method comprising: operating (1804) a test server (108) to send a command to a wireless extender (114) at a first customer premises (102) to perform a speed test on a first link between said wireless extender and a mobile handset (116), said speed test determining an achieved data rate (e.g., speed) for the first link; operating (1806) the test server (108) to determine if the achieved data rate for the first link (122) determined by the speed test on the first link between said wireless extender and said mobile handset supports a minimum expected communications data rate (e.g., speed in bits per second) for a first speed tier (e.g., determine if the achieved speed for the first link is greater than or equal to the expected minimum data rate for the first speed tier), said first speed tier being a wireless communications speed level to be supported by said first link; and taking action (1814) with respect to the first link based on whether or not the first link supports the minimum expected communications data rate for the first speed tier.

Method Embodiment 2 The method of Method Embodiment 1, wherein the first link is determined not to support the minimum expected communications data rate for the first speed tier; and wherein said step of taking action (1814) with respect to the first link includes: in response to determining that the first link does not support the first speed tier, operating the test server to i) take (1818) remedial action (e.g., change channel used on first link, eliminate traffic on link or initiate moving of extender closer to base station) and ii) initiate (1828) retesting (step which is loop back after some change) of the first link to check that the first link supports the minimum expected communications data rate.

Method Embodiment 3 The method of Method Embodiment 2, wherein operating (1818) the test server to take remedial action includes one or more of: sending (1822) a command to the wireless extender to remove traffic from the first link; or signaling (1824) the wireless extender to change the channel used for the first link (e.g., by changing frequencies, bandwidth, speed-tier, modulation and coding scheme, number of spatial streams, transmission times, tone hopping patterns and/or codes used to implement the channel being used for the first link).

Method Embodiment 4 The method of Method Embodiment 2, wherein operating the test server to take remedial action includes one or more of includes one or more of: sending (1822) a command to the wireless extender to remove traffic from the first link; signaling (1824) the wireless extender to change the channel (e.g., by changing frequencies, bandwidth, speed-tier, modulation and coding scheme, number of spatial streams, transmission times, tone hopping patterns and/or codes used to implement the channel being used for the first link); or sending (1826) a message to said mobile handset to cause the mobile handset to display a message in a display of to the user of the handset to move the extender closer to the base station.

Method Embodiment 5 The method of Method Embodiment 1, wherein the first link is determined to support the minimum expected communications data rate for the first speed tier; and wherein said step of taking action (1818) includes: in response to determining that the first link supports the first speed tier, operating (1820) the test server to determine a first link transmit power level (e.g. an extender to mobile handset transmit power level) to be used on the first link.

Method Embodiment 6 The method of Method Embodiment 5, wherein operating (1820) the test server to determine a first link transmit power level (e.g. an extender to mobile handset transmit power level) to be used on the first link includes: determining (1830) a transmit power level at which the first link fails to satisfy the minimum expected communications data rate for the first speed tier; and setting (1832) the first link transmit power level to a power level above the determined power level at which the first link fails to satisfy the minimum first tier speed level (e.g. to a power level a predetermined amount, e.g., 2 dB, above the determined highest transmit power level at which the first link first fails to satisfy the first minimum expected communications rate thus resulting in the transmit power being set slightly above the power level where the first data rate will be satisfied but near the rate at which the first data rate will fail to be satisfied).

Method Embodiment 7 The method of Method Embodiment 5, further comprising: operating (1836) the test server to identify Dynamic Frequency Selection (DFS) channels which have a maximum permitted transmit power below the first link transmit power level; and adding (1838) DFS channels having a maximum permitted transmit power below the first link transmit power level to a first DFS channel black list stored in memory, said first DFS channel blacklist listing DFS channels which are not to be used by said first link.

Method Embodiment 8 The method of Method Embodiment 7, further comprising: operate (1840) the test server to identify DFS channels which have a maximum permitted transmit power equal to or above the first link transmit power level; and adding (1842) identified DFS channels having a maximum permitted transmit power equal to or above the transmit power to the first link to a first link DFS channel whitelist stored in memory, said first link DFS channel whitelist listing DFS channels which are available for use by said first link.

Method Embodiment 9 The method of Method Embodiment 8, further comprising: operating (1844) the server to communicate the determined first link transmit power and one or both of the first link DFS channel black list and first link DFS channel white list to the wireless extender for use in configuring the first link.

Method Embodiment 10 The method of Method Embodiment 9, further comprising: operating (1846) the wireless extender to transmit to the mobile handset using said first link transmit power level.

Method Embodiment 11 The method of Method Embodiment 1, further comprising: operating (1850) the test server (108) to send a command to a base station at the first customer premises (102) to perform a speed test on a second link extending between said base station and said wireless extender, said speed test determining an achieved data rate (e.g., speed) for the second link; operating (1852) the test server (108) to determine if the achieved data rate for the second link (122) determined by the speed test on the second link between said base station and said wireless extender supports the minimum expected communications data rate (e.g., speed indicated by test results in bits per second is greater than or equal to the minimum expected communications data rate as expressed in bits per second) for the first speed tier; and taking (1858) action based on whether or not or not the second link supports the minimum expected communications data rate.

Method Embodiment 12 The method of Method Embodiment 11, wherein the second link is determined not to have been verified to support the first speed tier; and wherein said step of taking (1858) action with respect to the second link includes: in response to determining that the second link does not support the first speed tier, operating the test server to i) take (1862) remedial action with respect to the second link (e.g., change channel used on second link, eliminate traffic on second link or initiate moving of extender closer to base station) and ii) initiate (1872) retesting (step which is loop back after some change) of the second link in an attempt to verify that the second link supports the minimum expected communications data rate.

Method Embodiment 13 The method of Method Embodiment 11, wherein operating (1862) the test server to take remedial action with respect to the second link includes one or more of: sending (1866) a command to the base station to remove traffic from the second link; or signaling (1868) the base station to change the channel used for the second link (e.g., by changing frequencies, bandwidth, speed-tier, modulation and coding scheme, number of spatial streams, transmission times, tone hopping patterns and/or codes used to implement the channel being used for the second link).

Method Embodiment 14 The method of Method Embodiment 12, wherein operating (1862) the test server to take remedial action includes one or more of includes one or more of: sending (1866) a command to the base station to remove traffic from the second link; signaling (1868) the base station to change the channel (e.g., by changing frequencies, bandwidth, speed-tier, modulation and coding scheme, number of spatial streams, transmission times, tone hopping patterns and/or codes used to implement the channel being used for the second link); or sending (1870) a message to said mobile handset to cause the mobile handset to display a message on the display of to mobile handset the user of the handset to move the extender closer to the base station.

Method Embodiment 15 The method of Method Embodiment 14, further comprising: retesting (1873) both the first link and the second link to determine if they support the minimum expected communications data rate after the extender has been moved.

Method Embodiment 16 The method of Method Embodiment 1, wherein the second link is determined to support the minimum expected communications data rate; and wherein said step of taking action (1858) includes: operating (1864) the test server to determine a second link transmit power level (e.g. a base station to extender transmit power level) to be used on the second link.

Method Embodiment 17 The method of Method Embodiment 16, wherein operating (1864) the test server to determine a second link transmit power level to be used on the second link includes: determining (1874) a transmit power level at which the second link fails to support the minimum expected communications data rate for the first speed tier; and setting (1876) the second link transmit power level to a power level above the determined power level at which the second link fails to support the minimum expected communications data rate (e.g. to a power level a predetermined amount, e.g., 2 dB, above the determined transmit power level at which the second link first fails to satisfy the first minimum expected communications rate thus resulting in the transmit power for the second link being set slightly above the power level where the first data rate will be satisfied but near the rate at which the first data rate will fail to be satisfied on the second link).

Method Embodiment 18 The method of Method Embodiment 16, further comprising: operating (1880) the test server to identify Dynamic Frequency Selection (DFS) channels which have a maximum permitted transmit power below the second link transmit power level; and adding (1882) DFS channels having a maximum permitted transmit power below the second link transmit power level to a second DFS channel black list stored in memory, said second DFS channel blacklist listing DFS channels which are not to be used by said second link.

Method Embodiment 19 The method of Method Embodiment 18, further comprising: operating (1884) the test server to identify DFS channels which have a maximum permitted transmit power equal to or above the second link transmit power level; and adding (1886) identified DFS channels having a maximum permitted transmit power equal to or above the transmit power to the second link to a second link DFS channel white list stored in memory, said second link DFS channel white list listing DFS channels which are available for use by said second link.

Method Embodiment 20 The method of Method Embodiment 19, further comprising: operating (1888) the test server to send said second link transmit power level and one or both of said second link DFS channel blacklist and said second link DFS channel white list to said base station for use in configuring said second link.

Method Embodiment 21 The method of Method Embodiment 20, further comprising: operating (1890) the base station to transmit to said wireless extender using said second link transmit power level.

Method Embodiment 22 The method of Method Embodiment 1, wherein said wireless extender is a WiFi wireless extender.

Method Embodiment 23 The method of Method Embodiment 11, wherein said wireless extender is a WiFi wireless extender extender and wherein said base station is a WiFi base station.

Numbered List of Exemplary System Embodiments:

System Embodiment 1 A communications system comprising: a test server including a first processor, said first processor being configured to: operate (1804) the test server (108) to send a command to a wireless extender (114) at a first customer premises (102) to perform a speed test on a first link between said wireless extender and a mobile handset (116), said speed test determining an achieved data rate (e.g., speed) for the first link; determine if the achieved data rate for the first link (122) determined by the speed test on the first link between said wireless extender and said mobile handset supports a minimum expected communications data rate (e.g., speed in bits per second) for a first speed tier (e.g., determine if the achieved speed for the first link is greater than or equal to the expected minimum data rate for the first speed tier), said first speed tier being a wireless communications speed level to be supported by said first link; and take action (1814) with respect to the first link based on whether or not the first link supports the minimum expected communications data rate for the first speed tier.

System Embodiment 2 The communications system of System Embodiment 1, wherein said first processor is configured to: i) take (1818) remedial action (e.g., change channel used on first link, eliminate traffic on link or initiate moving of extender closer to base station) and ii) initiate (1828) retesting (step which is loop back after some change) of the first link to check that the first link supports the minimum expected communications data rate, in response to determining that the first link does not support the first speed tier, as part of being configured to take action (1814) with respect to the first link.

System Embodiment 3 The communications system of System Embodiment 2, wherein said first processor is configured to operate the test server to perform one or more of: i) sending (1822) a command to the wireless extender to remove traffic from the first link; or ii) signaling (1824) the wireless extender to change the channel used for the first link (e.g., by changing frequencies, bandwidth, speed-tier, modulation and coding scheme, number of spatial streams, transmission times, tone hopping patterns and/or codes used to implement the channel being used for the first link), as part of being configured to operate (1818) the test server to take remedial action.

System Embodiment 4 The communications system of System Embodiment 2, wherein said first processor is configured to operate the test server to perform one or more of: sending (1822) a command to the wireless extender to remove traffic from the first link; signaling (1824) the wireless extender to change the channel (e.g., by changing frequencies, bandwidth, speed-tier, modulation and coding scheme, number of spatial streams, transmission times, tone hopping patterns and/or codes used to implement the channel being used for the first link); or sending (1826) a message to said mobile handset to cause the mobile handset to display a message in a display of to the user of the handset to move the extender closer to the base station, as part of being configured to operate the test server to take remedial action.

System Embodiment 5 The communications system of System Embodiment 1, wherein said first processor is configured to determine a first link transmit power level (e.g. an extender to mobile handset transmit power level) to be used on the first link, in response to determining that the first link supports the first speed tier, as part of being configure to taking action.

System Embodiment 6 The communications system of System Embodiment 5, wherein said first processor is configured to: determine (1830) a transmit power level at which the first link fails to satisfy the minimum expected communications data rate for the first speed tier; and set (1832) the first link transmit power level to a power level above the determined power level at which the first link fails to satisfy the minimum first tier speed level (e.g. to a power level a predetermined amount, e.g., 2 dB, above the determined highest transmit power level at which the first link first fails to satisfy the first minimum expected communications rate thus resulting in the transmit power being set slightly above the power level where the first data rate will be satisfied but near the rate at which the first data rate will fail to be satisfied), as part of being configured to operate (1820) the test server to determine a first link transmit power level (e.g. an extender to mobile handset transmit power level) to be used on the first link.

System Embodiment 7 The communications system of System Embodiment 5, wherein said first processor is further configured to: operate (1836) the test server to identify Dynamic Frequency Selection (DFS) channels which have a maximum permitted transmit power below the first link transmit power level; and add (1838) DFS channels having a maximum permitted transmit power below the first link transmit power level to a first DFS channel black list stored in memory, said first DFS channel blacklist listing DFS channels which are not to be used by said first link.

System Embodiment 8 The communications system of System Embodiment 7, wherein said first processor is further configured to: identify (1840) DFS channels which have a maximum permitted transmit power equal to or above the first link transmit power level; and add (1842) identified DFS channels having a maximum permitted transmit power equal to or above the transmit power to the first link to a first link DFS channel whitelist stored in memory, said first link DFS channel whitelist listing DFS channels which are available for use by said first link.

System Embodiment 9 The communications system of System Embodiment 8, wherein said first processor is further configured to: operate (1844) the test server to communicate the determined first link transmit power and one or both of the first link DFS channel blacklist and first link DFS channel whitelist to the wireless extender for use in configuring the first link.

System Embodiment 10 The communications system of System Embodiment 9, further comprising: said wireless extender, said wireless extender including a second processor, and wherein said second processor is configured to operate (1846) the wireless extender to transmit to the mobile handset using said first link transmit power level.

System Embodiment 11 The communications system of System Embodiment 1, wherein said first processor is further configured to: operate (1850) the test server (108) to send a command to a base station at the first customer premises (102) to perform a speed test on a second link extending between said base station and said wireless extender, said speed test determining an achieved data rate (e.g., speed) for the second link; determine (1852) if the achieved data rate for the second link (122) determined by the speed test on the second link between said base station and said wireless extender supports the minimum expected communications data rate (e.g., speed indicated by test results in bits per second is greater than or equal to the minimum expected communications data rate as expressed in bits per second) for the first speed tier; and take (1858) action based on whether or not or not the second link supports the minimum expected communications data rate.

System Embodiment 12 The communications system of System Embodiment 11, wherein said first processor is configured to: i) take (1862) remedial action with respect to the second link (e.g., change channel used on second link, eliminate traffic on second link or initiate moving of extender closer to base station) and ii) initiate (1872) retesting (step which is loop back after some change) of the second link in an attempt to verify that the second link supports the minimum expected communications data rate, in response to determining that the second link does not support the first speed tier, as part of being configured to take action.

System Embodiment 13 The communications system of System Embodiment 11, wherein said first processor is configured to operate the test server to perform one or more of: sending (1866) a command to the base station to remove traffic from the second link; or signaling (1868) the base station to change the channel used for the second link (e.g., by changing frequencies, bandwidth, speed-tier, modulation and coding scheme, number of spatial streams, transmission times, tone hopping patterns and/or codes used to implement the channel being used for the second link), as part of being configured to operate (1862) the test server to take remedial action with respect to the second link.

System Embodiment 14 The communications system of System Embodiment 12, wherein said first processor is configured to operate the test server to perform one or more of: sending (1866) a command to the base station to remove traffic from the second link; signaling (1868) the base station to change the channel (e.g., by changing frequencies, bandwidth, speed-tier, modulation and coding scheme, number of spatial streams, transmission times, tone hopping patterns and/or codes used to implement the channel being used for the second link); or sending (1870) a message to said mobile handset to cause the mobile handset to display a message on the display of to mobile handset the user of the handset to move the extender closer to the base station, as part of being configured to operate (1862) the test server to take remedial action.

System Embodiment 15 The communications system of System Embodiment 14, wherein said first processor is further configured to control retesting (1873) of both the first link and the second link to determine if they support the minimum expected communications data rate after the extender has been moved.

System Embodiment 16 The communications system of System Embodiment 1, wherein said first processor is configured to: determine a second link transmit power level (e.g. a base station to extender transmit power level) to be used on the second link, in response to a determination that the second link supports the minimum expected communications data rate, as part of being configured to take action with regard to the second link.

System Embodiment 17 The communications system of System Embodiment 16, wherein said first processor is configured to: determine (1874) a transmit power level at which the second link fails to support the minimum expected communications data rate for the first speed tier; and set (1876) the second link transmit power level to a power level above the determined power level at which the second link fails to support the minimum expected communications data rate (e.g. to a power level a predetermined amount, e.g., 2 dB, above the determined transmit power level at which the second link first fails to satisfy the first minimum expected communications rate thus resulting in the transmit power for the second link being set slightly above the power level where the first data rate will be satisfied but near the rate at which the first data rate will fail to be satisfied on the second link), as part of being configured to determine a second link transmit power level to be used on the second link.

System Embodiment 18 The communications system of System Embodiment 16, wherein said first processor is further configured to: identify (1880) Dynamic Frequency Selection (DFS) channels which have a maximum permitted transmit power below the second link transmit power level; and add (1882) DFS channels having a maximum permitted transmit power below the second link transmit power level to a second DFS channel black list stored in memory, said second DFS channel blacklist listing DFS channels which are not to be used by said second link.

System Embodiment 19 The communications system of System Embodiment 18, wherein said first processor is further configured to: identify DFS channels which have a maximum permitted transmit power equal to or above the second link transmit power level; and add (1886) identified DFS channels having a maximum permitted transmit power equal to or above the transmit power to the second link to a second link DFS channel whitelist stored in memory, said second link DFS channel whitelist listing DFS channels which are available for use by said second link.

System Embodiment 20 The communications system of System Embodiment 19, wherein said first processor is further configured to: operate (1888) the test server to send said second link transmit power level and one or both of said second link DFS channel blacklist and said second link DFS channel whitelist to said base station for use in configuring said second link.

System Embodiment 21 The communications system of System Embodiment 20, further comprising a base station including a second processor, said second processor being configured to operate (1890) the base station to transmit to said wireless extender using said second link transmit power level.

System Embodiment 22 The system of System Embodiment 1, wherein said wireless extender is a WiFi wireless extender.

System Embodiment 23 The system of System Embodiment 11, wherein said wireless extender is a WiFi wireless extender and wherein said base station is a WiFi base station.

The techniques of various embodiments may be implemented using software, hardware and/or a combination of software and hardware. Various embodiments are directed to apparatus, e.g., test servers, wireless extenders such as WiFi extenders, base stations such as WiFi base stations, mobile handsets, user equipment devices, IP edge devices, servers, network nodes, and/or network equipment devices. Various embodiments are also directed to methods, e.g., method of controlling and/or operating test servers, wireless extenders, base stations, mobile handsets, UE devices, IP edge devices, servers, network nodes, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as test server, wireless extender, base station, mobile handset device, are configured to perform the steps of the methods described as being performed by the test server, wireless extender, base station, mobile handset device. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., the test server, wireless extender, base station, mobile handset device, with a processor which includes a component corresponding to each of the steps of the various described methods performed by the device in which the processor is included. In some but not all embodiments a device, e.g., the test server, wireless extender, base station, mobile handset device, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a test server, wireless extender, base station, mobile handset device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a test server, a wireless extender, a base station, a mobile handset device or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method, the method comprising:
operating a test server to test a first link using a plurality of different transmission power levels, said testing determining for each of the different transmission power levels a corresponding data rate that is supported by the first link;
determining, based on said testing, a transmission power level to be used on the first link; and
creating a black list of channels, said black list of channels being a list of channels which are not to be used for said first link based on i) said determined transmission power level and ii) transmission power constraints limiting the transmission power which can be used on the channels included in said black list of channels.

2. The method of claim 1, further comprising:
communicating the black list of channels to a wireless device.

3. The method of claim 2, wherein said wireless device is a wireless extender.

4. The method of claim 2, wherein said transmission power level to be used on the first link is a transmission power level supporting a data rate corresponding to a service level to be supported by said first link.

5. The method of claim 4, wherein determining, based on said testing, the transmission power level to be used on the first link includes:
determining a transmit power level at which the first link fails to satisfy a minimum expected communications data rate corresponding to the service level to be supported by said first link.

6. The method of claim 5, wherein determining, based on said testing, the transmission power level to be used on the first link further includes:
setting the first link transmit power level to a power level above the determined power level at which the first link fails to satisfy the minimum expected communications data rate corresponding to the service level to be supported by said first link.

7. The method of claim 2, further comprising:
creating a white list of channels, said white list of channels being a list of channels which are available for said first link based on said determined transmission power level, each individual listed channel on said white list of channels being allowed to use said determined transmission power level without violating a power transmission constraint applicable to the individual listed channel.

8. The method of claim 7, further comprising:
communicating the white list of channels to the wireless device.

9. The method of claim 8, wherein said black list of channels and said white list of channels include Dynamic Frequency Selection (DFS) channels, a DFS channel having a corresponding maximum permitted transmit power.

10. The method of claim 9, wherein DFS channels on the black list of channels have lower maximum transmit power levels than DFS channels on said white list of channels.

11. A test server in a communications network, the test server comprising:
a memory; and
a processor configured to control the test server to:
test a first link using a plurality of different transmission power levels, said testing determining for each of the different transmission power levels a corresponding data rate that is supported by the first link;
determine, based on said testing, a transmission power level to be used on the first link; and
create a black list of channels, said black list of channels being a list of channels which are not to be used for said first link based on i) said determined transmission power level and ii) transmission power constraints limiting the transmission power which can be used on the channels included in said black list of channels.

12. The test server of claim 11, further comprising:
a transmitter which is controlled by the processor to:
communicate the black list of channels to a wireless device.

13. The test server of claim 12, wherein said wireless device is a wireless extender.

14. The test server of claim 12, wherein said transmission power level to be used on the first link is a transmission power level supporting a data rate corresponding to a service level to be supported by said first link.

15. The test server of claim 14, wherein the processor, as part of being configured to determine, based on said testing, the transmission power level to be used on the first link, is configured to:
determine a transmit power level at which the first link fails to satisfy a minimum expected communications data rate corresponding to the service level to be supported by said first link.

16. The test server of claim 15, wherein the processor, as part of being configured to determine, based on said testing, the transmission power level to be used on the first link, is further configured to:
set the first link transmit power level to a power level above the determined power level at which the first link fails to satisfy the minimum expected communications data rate corresponding to the service level to be supported by said first link.

17. The test server of claim 16, wherein the processor is further configured to:
create a white list of channels, said white list of channels being a list of channels which are available for said first link based on said determined transmission power level, each individual listed channel on said white list of channels being allowed to use said determined transmission power level without violating a power transmission constraint applicable to the individual listed channel.

18. The test server of claim 17, wherein said processor is further configured to:
control the transmitter to communicate the white list of channels to the wireless device.

19. The test server of claim 18,
wherein said black list of channels and said white list of channels include Dynamic Frequency Selection (DFS) channels, a DFS channel having a corresponding maximum permitted transmit power; and
wherein DFS channels on the black list of channels have lower maximum transmit power levels than DFS channels on said white list of channels.

20. A non-transitory computer readable medium including processor executable instructions which when executed by a processor of a test server control the test server to:
test a first link using a plurality of different transmission power levels, said testing determining for each of the different transmission power levels a corresponding data rate that is supported by the first link;
determine, based on said testing, a transmission power level to be used on the first link; and create a black list of channels, said black list of channels being a list of channels which are not to be used for said first link based on i) said determined transmission power level and ii) transmission power constraints limiting the transmission power which can be used on the channels included in said black list of channels.

\* \* \* \* \*